US011514696B2

(12) United States Patent
Tsuji et al.

(10) Patent No.: US 11,514,696 B2
(45) Date of Patent: Nov. 29, 2022

(54) DISPLAY DEVICE, DISPLAY METHOD, AND COMPUTER-READABLE RECORDING MEDIUM

(71) Applicants: Shigekazu Tsuji, Tokyo (JP); Ayako Okumura, Kanagawa (JP)

(72) Inventors: Shigekazu Tsuji, Tokyo (JP); Ayako Okumura, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 17/118,918

(22) Filed: Dec. 11, 2020

(65) Prior Publication Data

US 2021/0182546 A1 Jun. 17, 2021

(30) Foreign Application Priority Data

Dec. 17, 2019 (JP) ............................ JP2019-227591
Dec. 2, 2020 (JP) ............................ JP2020-200247

(51) Int. Cl.

| | |
|---|---|
| ***G06V 30/32*** | (2022.01) |
| ***G06F 3/04883*** | (2022.01) |
| ***G06F 40/242*** | (2020.01) |
| *G06V 30/10* | (2022.01) |

(52) U.S. Cl.

CPC ........ *G06V 30/387* (2022.01); *G06F 3/04883* (2013.01); *G06F 40/242* (2020.01)

(58) Field of Classification Search

CPC .. G06F 3/0481; G06F 40/242; G06F 3/04883; G06V 30/387; G06K 9/00436

See application file for complete search history.

(56) References Cited

U.S. PATENT DOCUMENTS 6,323,859 B1 * 11/2001 Gantt ...................... G06T 19/20 345/419
6,462,733 B1 * 10/2002 Murakami .............. G06F 3/033 345/184
7,720,316 B2 * 5/2010 Shilman ............... G06V 30/387 382/311
8,174,522 B2 * 5/2012 Watanabe ............... G06F 30/00 345/59
9,355,090 B2 * 5/2016 Goldsmith .......... G06F 3/04883
2003/0099398 A1 * 5/2003 Izumi ................. G06V 30/1423 382/186
2004/0017946 A1 * 1/2004 Longe ................. G06F 3/04883 382/185
2009/0059264 A1 3/2009 Tsuji
2009/0109188 A1 * 4/2009 Ohshita ................... G06F 3/018 345/173
2009/0295750 A1 * 12/2009 Yamazaki ........... G06F 3/04886 345/173

(Continued)

FOREIGN PATENT DOCUMENTS

JP H06-251203 9/1994
JP 2000-076302 3/2000

*Primary Examiner* — Nicholas Augustine

(74) *Attorney, Agent, or Firm* — IPUSA, PLLC

(57) ABSTRACT

A display device includes a circuitry configured to perform a search for a plurality of image candidates in an image transformation dictionary part, based on handwritten data, and a display configured to display the plurality of image candidates obtained by the search. At least a portion of the plurality of image candidates displayed on the display represents a different person or an object.

10 Claims, 91 Drawing Sheets

(56) References Cited

U.S. PATENT DOCUMENTS

| | | | | |
|---|---|---|---|---|
| 2011/0058733 | A1* | 3/2011 | Inoue | G06K 9/6217 382/154 |
| 2012/0113007 | A1* | 5/2012 | Koch | G06F 3/017 345/168 |
| 2012/0117506 | A1* | 5/2012 | Koch | G06F 3/04886 345/173 |
| 2013/0273968 | A1* | 10/2013 | Rhoads | H04W 4/50 455/556.1 |
| 2013/0304604 | A1* | 11/2013 | Hoffman | G06Q 30/0621 705/26.5 |
| 2014/0210759 | A1* | 7/2014 | Toriyama | G06F 40/242 345/173 |
| 2014/0229143 | A1* | 8/2014 | Cohen-Or | G06T 17/10 703/1 |
| 2014/0317575 | A1* | 10/2014 | Ullmann | G06T 19/20 715/852 |
| 2014/0363083 | A1* | 12/2014 | Xia | G06F 40/166 382/189 |
| 2020/0125575 | A1* | 4/2020 | Ghoshal | G06F 40/247 |

* cited by examiner

FIG.7

| | EXAMPLES OF DEFINED CONTROL ITEMS | EXAMPLES OF DEFINED CONTROL DATA |
|---|---|---|
| 401 | SELECTABLE CANDIDATE DISPLAY TIMER | TimerValue="500 ms" |
| 402 | SELECTABLE CANDIDATE DISPLAY DELETE TIMER | TimerValue="5000 ms" |
| 403 | HANDWRITTEN OBJECT RECTANGULAR REGION | Horizontal="50%" Vertical="80%" |
| 404 | ESTIMATED WRITING DIRECTION/CHARACTER SIZE DETERMINATION CONDITION | MinDiff="10 mm" MinTime="1000 ms" DefDir="Horizontal" |
| 405 405a | SMALL CHARACTER | FontStyle="MINCHO" FontSize="25 mm" |
| 405 405b | MEDIUM CHARACTER | FontStyle="MINCHO" FontSize="50 mm" |
| 405 405c | LARGE CHARACTER | FontStyle="GOTHIC" FontSize="100 mm" |
| 406 | STRIDING LINE DETERMINATION CONDITION | MinLenLongSide="100 mm" MaxLenShortSide="50 mm" MinOverlapRate="80%" |
| 407 | ENCLOSURE LINE DETERMINATION CONDITION | MinOverLapRate="100%" |

FIG.8

EXAMPLES OF HANDWRITING RECOGNITION DICTIONARY DATA

| BEFORE CONVERSION | AFTER CONVERSION | PROBABILITY |
|---|---|---|
| ぎ | 議 | 0.55 |
| ぎ | 技 | 0.45 |
| ぎし | 技士 | 0.55 |
| ぎし | 技師 | 0.45 |
| ぎじ | 疑似 | 0.30 |
| ぎじ | 議事 | 0.25 |
| ぎじ | 擬似 | 0.20 |
| ぎじ | ギジ | 0.15 |

FIG.9

EXAMPLES OF CHARACTER STRING CONVERSION DICTIONARY DATA

| BEFORE CONVERSION | AFTER CONVERSION | PROBABILITY |
|---|---|---|
| 議 | 議事録 | 0.95 |
| 技 | 技量試 | 0.85 |
| 技士 | 技士会 | 0.65 |
| 技師 | 技師長 | 0.75 |
| ぎじ | 議事録 | 0.95 |
| ぎじ | 技術士 | 0.85 |
| ぎじ | 技術 | 0.75 |
| 擬似 | 擬似相関 | 0.55 |
| 擬似 | 擬似的 | 0.50 |
| 擬似 | 擬似乱数 | 0.40 |

FIG.10

EXAMPLES OF PREDICTIVE CONVERSION DICTIONARY DATA

| BEFORE CONVERSION | AFTER CONVERSION | PROBABILITY |
|---|---|---|
| 議事録 | 議事録の送付先 | 0.65 |
| 技量試 | 技量試を決裁 | 0.75 |
| 技士 | 技士会連合会 | 0.95 |
| 技術 | 技師エンジニア | 0.85 |
| 技術 | 技術雑誌社 | 0.65 |
| 擬似 | 擬似体験 | 0.45 |
| 擬似 | 擬似逆行列 | 0.35 |

FIG.11
| | INDEX | IMAGE |
|---|---|---|
| 751 | アスコルビン酸 | 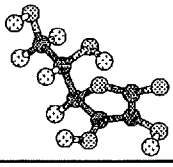 |
| 752 | アスパラギン酸 | 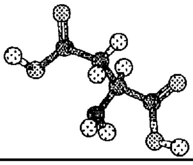 |
| 753 | アセチレン | 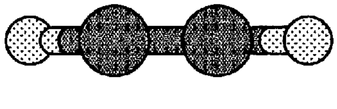 |
| 754 | アセトアルデヒド | 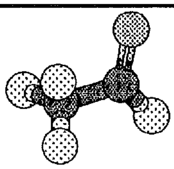 |
| 755 | アラニン | 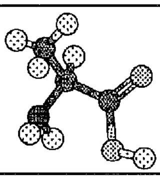 |

FIG.12A

| | EXAMPLES OF OPERATION COMMAND DEFINITION DATA (FOR CASE WHERE THERE IS NO SELECTED OBJECT) |
|---|---|
| 701 | Name="議事録テンプレートを読み込む" String="議事録" String="テンプレート"<br>Command="ReadFile https://%username%:%password%@server.com/template/minutes.pdf" |
| 702 | Name="議事録フォルダーに保存する" String="議事録" String="保存"<br>Command="WriteFile https://%username%:%password%@server.com/minutes/%machinename%_%yyyy-mm-dd%.pdf" |
| 703 | Name="印刷する" String="印刷" String="プリント"<br>Command="PrintFile https://%username%:%password%@server.com/print/%machinename%-"%yyyy-mm-dd%.pdf" |
| 709 | Name="細ペン" String="細" String="ペン" Command="ChangPen fine" |
| 710 | Name="太ペン" String="太" String="ペン" Command="ChangePen bold" |
| 711 | Name="マーカー" String="マーカー" String="ペン" Command="ChangePen marking" |
| 712 | Name="テキスト方向を揃える" String="テキスト" String="向き" String="方向"<br>Command="AlignTextDirection" |
| 713 | Name="手書きサイン登録する" String="サイン" String="登録" Command="RegistSignature" |
| 714 | Name="手書きサインインする" String=%signature% Command="Signin" |
| 715 | Name="手書きサインアウトする" String="サイン" String="アウト" Command="Signout" |
| 716 | Name="設定変更する" String="設定" String="変更" Command="ConfigSettings" |

FIG.12B

| EXAMPLES OF SYSTEM DEFINITION DATA |
| --- |
| username="taro.tokkyo" |
| password="x2PDHTyS" |
| machinename="My-Machine" |

| | EXAMPLES OF OPERATION COMMAND DEFINITION DATA (FOR CASE WHERE THERE IS SELECTED OBJECT) |
|---|---|
| 707 | Name="消去" Group="Edit" Command="Delete" |
| | Name="移動" Group="Edit" Command="Move" |
| | Name="回転" Group="Edit" Command="Rotate" |
| | Name="選択" Group="Edit" Command="Select" |
| 708 | Name="太く" Group="Decorate" Command="Thick" |
| | Name="細く" Group="Decorate" Command="Thin" |
| | Name="大きく" Group="Decorate" Command="Large" |
| | Name="小さく" Group="Decorate" Command="Small" |
| | Name="下線" Group="Decorate" Command="Underline" |

FIG.14

| EXAMPLES OF USER DEFINITION DATA | |
|---|---|
| 717 | AccountId="1" AccountUsername="鈴木" AccountPassword="" SignatureId="1" username="ichiro.suzuki" password="DG9wEvda" machinename="whiteboard" |
| 718 | Name="名前" Data=%AccountName% |
| | Name="パスワード" Data=%AccountPassword% |
| | Name="フォルダーユーザー名" Data=%username% |
| | Name="フォルダーパスワード" Data=%password% |
| | Name="フォルダーファイル名" Data=%machinename% |

FIG.15

| EXAMPLES OF HANDWRITTEN SIGNATURE DATA |
| --- |
| SignatureId="1" Data="xx,xx,xx,xx,...,xx" |
| SignatureId="2" Data="xx,xx,xx,xx,...,xx" |

FIG.16

| | EXAMPLES OF HANDWRITTEN INPUT STORAGE DATA |
|---|---|
| 801 | DataId="1" Type="Stroke" PenId="1" Color="Black" Width="1 px" Pattern="Solid" Angle="0 dig" StartPoint="x1,y1" StartTime="yyyy-mm-ddThh:mm:ss.sss+09:00" EndPoint="xn,yn" EndTime="yyyy-mm-ddThh:mm:ss.sss+09:00" Point="x1,y1,x2,y2,x3,y3,...,yn,yn" Pressure="p1,p2,p3,...pn" |
| 802 | DataId="2" Type="Stroke" PenId="1" Color="Black" Width="1 px" Pattern="Solid" Angle="0 dig" AccountID="1" StartPoint="x1,y1" StartTime="yyyy-mm-ddThh:mm:ss.sss+09:00" EndPoint="xn,yn" EndTime="yyyy-mm-ddThh:mm:ss.sss+09:00" Point="x1,y1,x2,y2,x3,y3,...,yn,yn" Pressure="p1,p2,p3,...pn" |
| 803 | DataId="3" Type="Group" PenId="2" Color="Black" Width="1 px" Pattern="Solid" Angle="90 dig" StartPoint="x1,y1" StartTime="yyyy-mm-ddThh:mm:ss.sss+09:00" EndPoint="xn,yn" EndTime="yyyy-mm-ddThh:mm:ss.sss+09:00" DataId="1" DataId="2" |
| 804 | DataId="4" Type="Text" PenId="3" Color="Black" Width="10 px" Pattern="Solid" Angle="180 dig" StartPoint="x1,y1" StartTime="yyyy-mm-ddThh:mm:ss.sss+09:00" EndPoint="xn,yn" EndTime="yyyy-mm-ddThh:mm:ss.sss+09:00" FontName="IPA Gothic" FontSize="50.0 pt" Text="What you dream" |
| 805 | DataId="5" Type="Text" PenId="4" Color="Black" Width="1 px" Pattern="Solod" Angle="270 dig" AccountID="1" StartPoint="x1,y1" StartTime="yyyy-mm-ddThh:mm:ss.sss+09:00" EndPoint="xn,yn" EndTime="yyyy-mm-ddThh:mm:ss.sss+09:00" FontName="IPA Gothic" FontSize="10.0 pt" Text="I want to be an innovator" |

FIG.17A

| | EXAMPLES OF CONTROL DATA |
|---|---|
| 901 | PenId="1" Color="Black" Width="1 px" Pattern="Solid"" Angle="0 dig" AccountID="1" |
| 902 | PenId="2" Color="Black" Width="1 px" Pattern="Solid" Angle="90 dig" |
| 903 | PenId="3" Color="Black" Width="10 px" Pattern="Solid" Angle="180 dig" |
| 904 | PenId="4" Color="Black" Width="10 px" Pattern="Dot" Angle="270 dig" |

562

| | | |
|---|---|---|
| 名前 | 鈴木 | 562a |
| パスワード | | 562b |
| フォルダーユーザー名 | ichiro.suzuki | 562c |
| フォルダーパスワード | ******** | 562d |
| フォルダーファイル名 | whiteboard | 562e |
| 登録または取消 | ここに✓または×を書いてください | 562f |

FIG.47
| INDEX | IMAGE | GROUP ID |
|---|---|---|
| アスコルビン酸 | 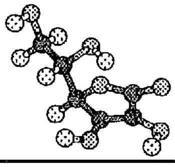 | A |
| アスパラギン酸 | 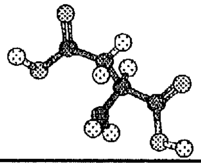 | A |
| アセチレン | 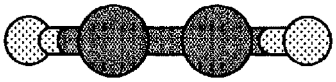 | B |
| アセトアルデヒド | 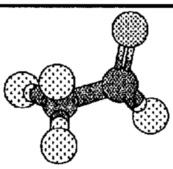 | C |
| アラニン | 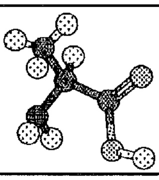 | C |

FIG.48
| INDEX | IMAGE | HANDWRITTEN DATA |
|---|---|---|
| アスコルビン酸 | 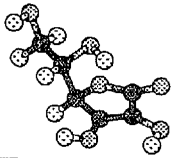 | アスコルビン酸 |
| アスパラギン酸 | 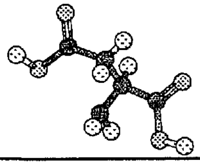 | アスパラギン酸 |
| アセチレン | 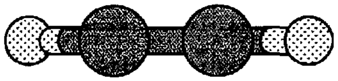 | アセチレン |
| アセトアルデヒド | 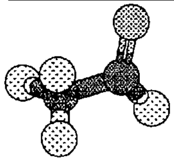 | アセトアルデヒド |
| アラニン | 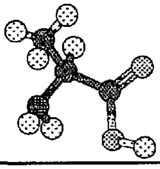 | アラニン |

FIG.50

| BEFORE CONVERSION | AFTER CONVERSION | PROBABILITY |
|---|---|---|
| a | a | 0.90 |
| a | o | 0.10 |

FIG.51

| BEFORE CONVERSION | AFTER CONVERSION | PROBABILITY |
|---|---|---|
| a | a b | 0.55 |
| a | A I | 0.45 |
| a b | ability | 0.55 |
| a g | agenda | 0.30 |

FIG.52

| BEFORE CONVERSION | AFTER CONVERSION | PROBABILITY |
|---|---|---|
| agenda | agenda list | 0.55 |
| agenda | agenda template | 0.30 |
| I | I am | 0.55 |
| This | This is | 0.45 |
| You | You are | 0.55 |
| There | There are | 0.30 |

FIG.53
| | INDEX | IMAGE |
|---|---|---|
| 751 | Ascorbic acid | 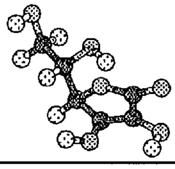 |
| 752 | Aspartic acid | 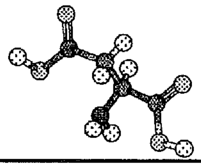 |
| 753 | Acetylene | 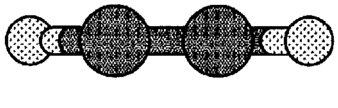 |
| 754 | Acetaldehyde | 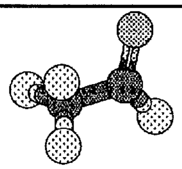 |
| 755 | Alanine | 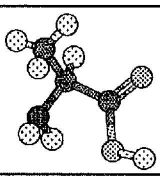 |

FIG.54A

| | EXAMPLES OF OPERATION COMMAND DEFINITION DATA (FOR CASE WHERE THERE IS NO SELECTED OBJECT) |
|---|---|
| 701 | Name="load agenda template" String="agenda" String="template" Command="ReadFile https://%username%:%password%@server.com/template/minutes.pdf" |
| 702 | Name="save agenda folder" String="agenda" String="save" Command="WriteFile https://%username%:%password%@server.com/minutes/%machinename%_%yyyy-mm-dd%.pdf" |
| 703 | Name="print" String="print" Command="PrintFile https://%username%:%password%@server.com/print/%machinename%-"%yyyy-mm-dd%.pdf" |
| 709 | Name="Black pen" String="black" String="pen" Command="ChangePen Black" |
| 710 | Name="Red pen" String="red" String="pen" Command="ChangePen Red" |
| 711 | Name="Blue pen" String="blue" String="pen" Command="ChangePen Blue" |
| 712 | Name="Align text direction" String="text" String="direction" Command="AlignTextDirection" |
| 713 | Name="Register handwritten signature" String="sign" String="regist" Command="RegistSignature" |
| 714 | Name="Hand sign in" String="sign" String="login" String=%signature% Command="Signin" |
| 715 | Name="Hand sign out" String="sign" String="logout" Command="Signout" |
| 716 | Name="Change settings" String="set" String="setting" Command="ConfigSettings" |

FIG.54B

| | EXAMPLES OF SYSTEM DEFINITION DATA |
|---|---|
| 704 | username="Bob" |
| 705 | password="x2PDHTyS" |
| 706 | machinename="My-Machine" |

FIG.55

| | |
|---|---|
| | EXAMPLES OF OPERATION COMMAND DEFINITION DATA (FOR CASE WHERE THERE IS SELECTED OBJECT) |
| 707 | Name="Delete" Group="Edit" Command="Delete" |
| | Name="Move" Group="Edit" Command="Move" |
| | Name="Rotate" Group="Edit" Command="Rotate" |
| | Name="Select" Group="Edit" Command="Select" |
| 708 | Name="Thick" Group="Decorate" Command="Thick" |
| | Name="Thin" Group="Decorate" Command="Thin" |
| | Name="Large" Group="Decorate" Command="Large" |
| | Name="Small" Group="Decorate" Command="Small" |
| | Name="Underline" Group="Decorate" Command="Underline" |

FIG.56

| | EXAMPLES OF USER DEFINITION DATA |
|---|---|
| 717 | AccountId="1" AccountUsername="Bob" AccountPassword="" SignatureId="1" username="ichiro.suzuki" password="DG9wEvda" machinename="whiteboard" |
| 718 | Name="name" Data=%AccountName% |
| | Name="password" Data=%AccountPassword% |
| | Name="Folder Username" Data=%username% |
| | Name="Folder Password" Data=%password% |
| | Name="Folder FileName" Data=%machinename% |

562

| | | |
|---|---|---|
| NAME | Bob | 562a |
| password | | 562b |
| folder user name | Bob | 562c |
| folder password | ******** | 562d |
| folder file name | whiteboard | 562e |
| register or cancel | Write ✓ mark when registering and × mark when canceling | 562f |

FIG.77
| Index | Image | Group ID |
|---|---|---|
| Ascorbic acid | 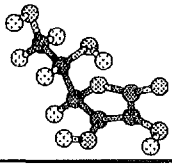 | A |
| Aspartic acid | 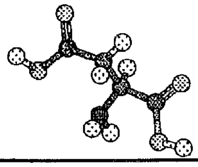 | A |
| Acetylene | 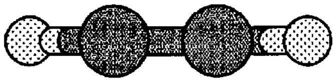 | B |
| Acetaldehyde | 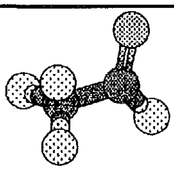 | C |
| Alanine | 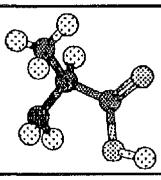 | C |

FIG.78
| INDEX | IMAGE | HANDWRITTEN DATA |
|---|---|---|
| Ascorbic acid | 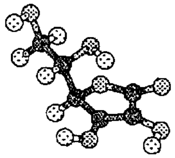 | Ascorbic acid |
| Aspartic acid | 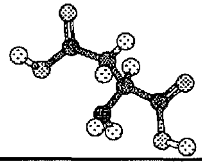 | Aspartic acid |
| Acetylene | 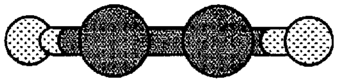 | acetylene |
| Acetaldehyde | 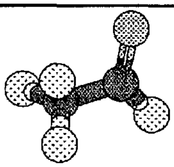 | Acetaldehyde |
| Alanine | 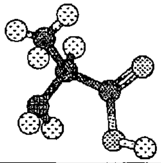 | Alanine |

DISPLAY DEVICE, DISPLAY METHOD, AND COMPUTER-READABLE RECORDING MEDIUM

CROSS REFERENCE TO RELATED APPLICATIONS

The present application is based upon and claims priority to Japanese Patent Applications No. 2019-227591, filed on Dec. 17, 2019, and No. 2020-200247, filed on Dec. 2, 2020, the entire contents of which are incorporated herein by reference.

BACKGROUND OF THE INVENTION

1. Field of the Invention

The present disclosure relates to a display device, a display method, and a computer-readable recording medium.

2. Description of the Related Art

Display devices for displaying data handwritten on a touchscreen panel using a pen or finger are known. The display devices having a relatively large touchscreen panel may be arranged in a conference room or the like, and may be used by a plurality of users, as the electronic whiteboard or the like.

In some display devices, the handwritten data may be recognized and converted into text (Japanese Kana and Kanji characters), as described in Japanese Unexamined Patent Application Publication No. H06-251203, for example. According to the technique proposed in Japanese Unexamined Patent Application Publication No. H06-251203, the handwritten input character string is registered in a personal dictionary, in correspondence with a result of a conversion process performed on the input character string in the past using a Kana Kanji conversion dictionary. When the handwritten character string is input from a tablet, the personal dictionary is searched for the input character string, before performing the conversion process using the Kana Kanji conversion dictionary.

However, the conventional display devices can only display characters, as the selectable candidates. In general, the display devices display strokes that are handwritten by the user, as they are, or displays the conversion candidates of the characters based on the strokes. Hence, whether or not the displayed strokes or characters are appropriate, can only be judged from the characters. However, in the case of long terms, easily mistaken terms, terms having similar terms, or technical terms, the user may erroneously select unintended characters. When the candidate is erroneously selected, the display device may display the characters that are different from those of the person or object intended by the user.

SUMMARY

According to one aspect of the embodiments, a display device includes a circuitry configured to perform a search for a plurality of image candidates in an image transformation dictionary part, based on handwritten data; and a display configured to display the plurality of image candidates obtained by the search, wherein at least a portion of the plurality of image candidates displayed on the display represents a different person or an object.

Other features of the embodiments will be apparent from the following detailed description when read in conjunction with the accompanying drawings.

BRIEF DESCRIPTION OF THE DRAWINGS

FIG. 7 is a diagram illustrating an example of defined control data.

FIG. 8 is a diagram illustrating an example of dictionary data of a handwriting recognition dictionary part.

FIG. 9 is a diagram illustrating an example of dictionary data of a character string conversion dictionary part.

FIG. 10 is a diagram illustrating an example of dictionary data of a predicted conversion dictionary part.

FIG. 11 is a diagram illustrating an example of image dictionary data of an image transformation dictionary part.

FIG. 12A and FIG. 12B are diagrams illustrating an example of operation command definition data and system definition data stored in an operation command definition part.

FIG. 13 is a diagram illustrating an example of the operation command definition data when a selected object selected by a handwritten object is present.

FIG. 14 is a diagram illustrating an example of user definition data stored in the operation command definition part.

FIG. 15 is a diagram illustrating an example of handwritten signature data stored in a handwritten signature data storage part.

FIG. 16 is a diagram illustrating an example of handwritten input storage data stored in a handwritten input storage part.

FIG. 17A and FIG. 17B are diagrams for explaining pen ID control data stored in a pen ID control data storage part.

FIG. 47 is a diagram for explaining a configuration example of an image transformation dictionary part.

FIG. 48 is a diagram illustrating an example of the image transformation dictionary part including handwritten data.

FIG. 50 is a diagram illustrating an example of dictionary data of the handwriting recognition dictionary part used for the English conversion.

FIG. 51 is a diagram illustrating an example of the dictionary data of the character string conversion dictionary part used for the English conversion.

FIG. 52 illustrates an example of the dictionary data of the predicted conversion dictionary part used for the English conversion.

FIG. 53 illustrates an example of the image dictionary data included in the image transformation dictionary part used for the English conversion.

FIG. 54A and FIG. 54B are diagrams illustrating an example of the operation command definition data for a case where no selected object is present when performing the English conversion.

FIG. 55 is a diagram illustrating an example of the operation command definition data for a case where a selected object is present when performing the English conversion.

FIG. 56 is a diagram illustrating an example of the user definition data used for the English conversion.

FIG. 64B is present, respectively.

FIG. 77 is a diagram for explaining an association of images in the image transformation dictionary part.

FIG. 78 is a diagram illustrating an example of the image transformation dictionary part searched using the handwritten data.

DESCRIPTION OF THE EMBODIMENTS

Figure 1:
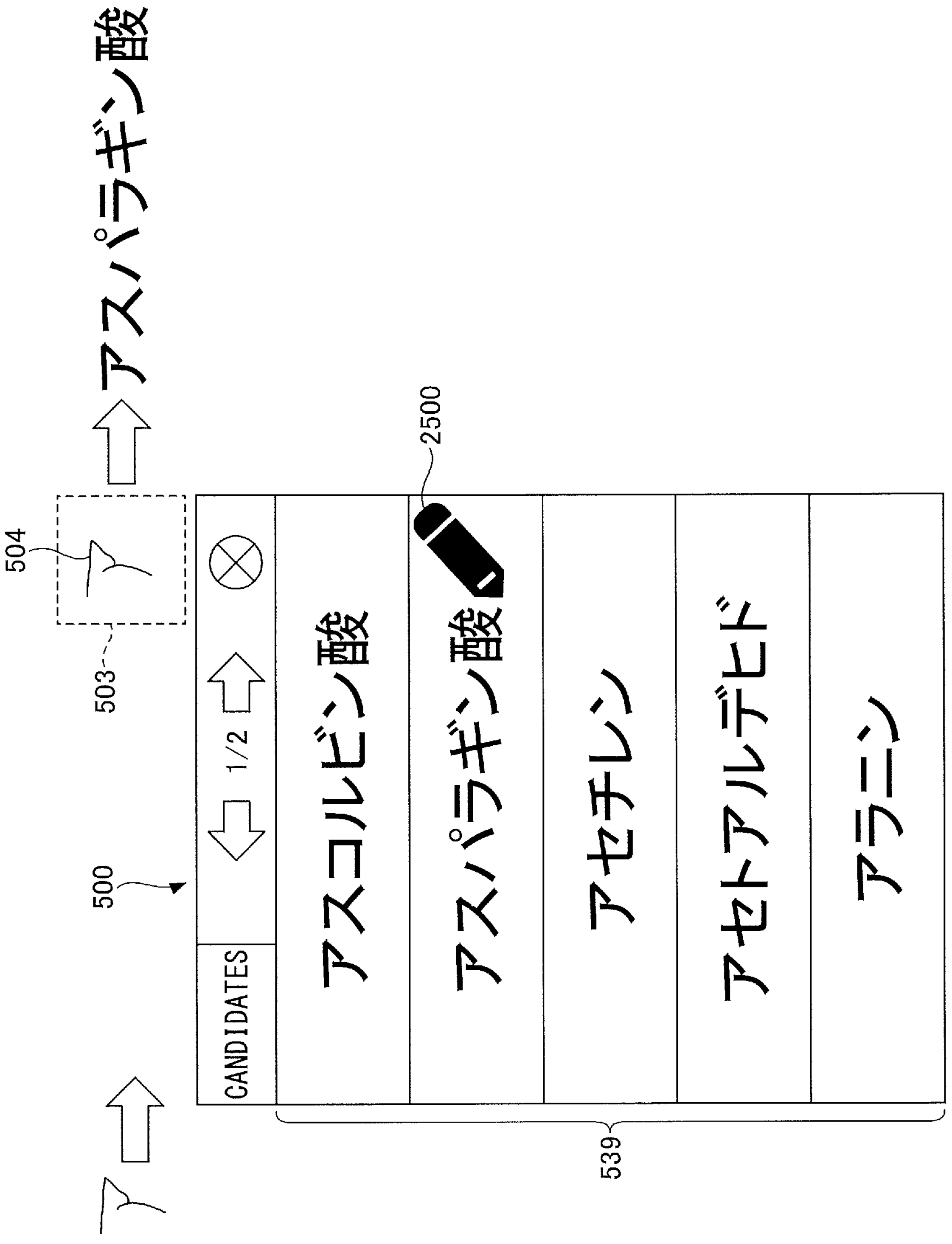
FIG. 1 is a diagram for explaining an example of a character display not intended by a user.

Embodiments will hereinafter be described with reference to the drawings. In drawings, the same constituent elements are designated by the same reference numerals, and a repeated description of the same constituent elements may be omitted.

One object of the embodiments is to provide a display device capable of displaying information other than characters, as the selectable candidates.

Hereinafter, a display device, a display method employed by the display device, and a computer-readable recording medium according to the embodiments of the present invention will be described with reference to the drawings.

First Embodiment

<Utilized Scenes>

The display device may be utilized in various scenes or situations, including conferences, for example, and displays information according to the scene. For example, a researcher in industry or local government may handwrite treatments using chemicals, and a physician in medical practice may handwrite drugs to be prescribed and present the drugs to nurses. In addition, in school, a teacher may handwrite particular examples of things that will be taught in class, while a presenter in industry may handwrite product names and concepts so as to introduce the products.

In the Japanese language, there are Hiragana characters, Katakana characters, and Kanji characters, instead of alphabets. A Japanese word or term may be spelled by one or more Hiragana characters, Katakana characters, Kanji characters, or a combination of at least two of such Japanese characters (hereinafter also simply referred to as "characters" or "character string" unless otherwise indicated). Further, Japanese text data may have one of two orientations, and the Japanese characters may be written in a horizontal direction from left to right, or in a vertical direction from top to bottom.

However, the user may handwrite or select characters that differ from the characters indicating the intended person or object. FIG. 1 is a diagram for explaining an example of a character display not intended by the user. For example, the user may handwrite the Katakana character "ア" pronounced "ə" and illustrated at the top left in FIG. 1, which is also illustrated as a handwritten object 504 within a handwritten object rectangular area display 503 illustrated at the top right in FIG. 1, with the intention of selecting the Japanese term for "ascorbic acid", but may erroneously select the Japanese term for "aspartic acid" from among the character string candidates because the first two characters and the last two characters for these two Japanese terms are the same and these two Japanese terms look similar at first glance. Because the Japanese term for "ascorbic acid" is also displayed as the candidate in the example illustrated in FIG. 1, the user is less likely to erroneously select the Japanese term for "aspartic acid", but if the Japanese term for "ascorbic acid" is not displayed as one of the candidates, the user is more likely to erroneously select a similar Japanese term.

In addition, at conferences or the like, for example, the user may erroneously handwrite a product name that differs from the intended product name. In such a case, because the intended product name is not displayed as the selectable candidate to begin with, the user is more likely to erroneously select the product name that is different from the intended product name, from the selectable candidates having product names similar to the intended product name as in the example illustrated in FIG. 1.

As described above, when only the characters are displayed as the selectable candidates, it may be difficult for the user to notice that the user has selected the person or object other than the intended person or object, regardless of whether or not the intended term is displayed as the selectable candidate.

Overview of Display Device According to Embodiment

Accordingly, a display device 2 according to this embodiment, which will be described later in conjunction with FIG. 4A through FIG. 4C, displays not only the characters, but also images, such as photographs, illustrations, or the like, as the selectable candidates for the term that is being handwritten by the user. In this case, the user can more easily select the intended information, and reduces the possibility of the user erroneously selecting information that is different from the intended information of the person or object. Hence, the display device 2 can display the correct information.

Figure 2:
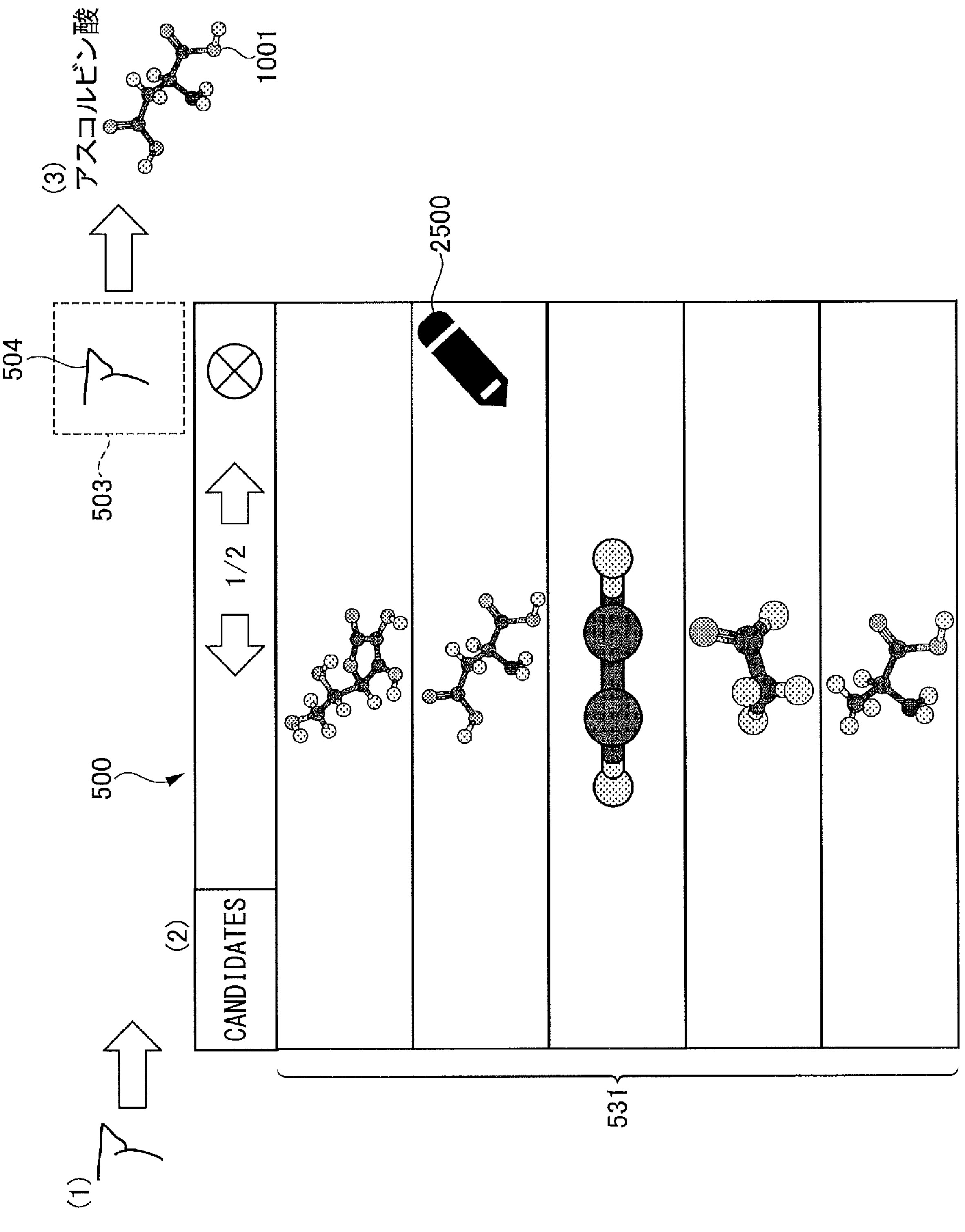
FIG. 2 is a diagram illustrating an example of a plurality of image candidates displayed on a display device.

FIG. 2 is a diagram illustrating an example of a plurality of image candidates displayed on the display device 2. FIG. 2 illustrates images of molecular structure models as an example.

In FIG. 2, the user handwrites the Katakana character "ア" pronounced "ə" and illustrated at the top left in FIG. 1, which is the first Katakana character of the intended Japanese term "アスパラギン酸" for "aspartic acid", in step (1).

In response to the handwritten first Katakana character, the display device 2 displays image candidates 531 of the Japanese terms that begin with this first Katakana character, in step (2). That is, even while the user is handwriting this first Katakana character, the display device 2 displays the image candidates 531, such as graphics, illustrations, photographs, or the like that fit a character string at this stage of the handwriting. FIG. 2 illustrates the example in which the molecular structure models of ascorbic acid, aspartic acid, acetylene, acetaldehyde, and alanine are displayed. Hence, the plurality of image candidates 531 displayed on an operation guide 500 represent different persons or objects.

When the user selects one of the image candidates 531, the display displays a selected image 1001 together with the characters representing the person or object of the selected image, in step (3). In this example, the selected image 1001 represents the molecular structure model of the intended aspartic acid, and the Japanese term for this intended aspartic acid is also displayed by a combination (or character string) of Katakana and Kanji characters. Alternatively, the display device 2 may display only the selected image, or only the characters representing the selected image.

Because the display device 2 according to this embodiment displays the images of the selectable candidates, it is easier for the user to select the intended person or object, and reduce incorrect information that is displayed. In addition, because the selected image can also be displayed, it is possible to display the information in a visually understandable manner.

Moreover, in a case where the display device 2 displays similar images as the selectable candidates, there is a possibility for the user to erroneously select the image of the person or object not intended by the user. In this case, the display device 2 displays at least the image candidates 531 as illustrated in FIG. 2, so as to reduce the possibility for the user to erroneously select the image candidate 531 of the person or object not intended by the user.

It is possible to connect a Personal Computer (PC) to the display device 2, and display the images to be displayed by the PC on the display device 2, but this arrangement may be troublesome or time-consuming. On the other hand, according to this embodiment, the image candidates can easily be displayed while arbitrary characters are being handwritten, and when the image is displayed after the image candidate is selected, it is possible to display the information in a more visually understandable manner compared to the case where only the characters are displayed.

Terminologies

An input device (or input means) may encompass any device (or means) that enables designating coordinates and handwriting on a touchscreen panel. Examples of the input device include pens, user's fingers or hands, rod-shaped members, or the like. In addition, the input device may enable input by eye tracking using the user's line-of-sight. Handwritten data may encompass data of a locus of a series coordinate points that are displayed when the user continuously moves the input device on the touchscreen panel. A stroke may encompass a series of operations in which the user presses the input device (or input means) against the touchscreen panel, continuously moves the input device in the pressed state, and disengages and separates the input device or input means) from the touchscreen panel. The data handwritten by the stroke may be referred to as stroke data. The handwritten data may include one or more stroke data. Handwritten input indicates the input of the handwritten data by the user.

The image candidates may encompass images of selectable candidates. The image is a generic term for computer-generated figures, photographs, or the like, and may also be simply referred to as an image or graphics. Simply put, the image candidates are non-text information other than characters.

Representing a different person or object may encompass cases where a plurality of images relate to photographs of different people or the appearance of different products. Constituent elements of a substance include molecules and atoms, but nucleons, quanta, or the like ultimately constituting these elements are referred to as particles of matter. In a case where the matter has a molecular structure, this embodiment is particularly useful when each image represents an isomer. Although isomers have the same molecular formula, bonding states and spatial arrangements of the atoms differ among the isomers, and thus, the isomers are compounds exhibiting different properties.

<Example of Appearance of Pen>

Figure 3:
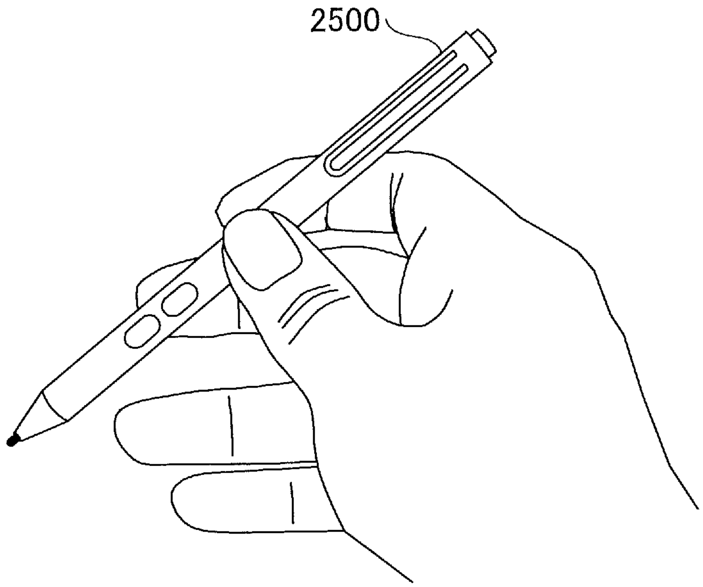
FIG. 3 is a perspective view illustrating an example of a pen.

FIG. 3 illustrates a perspective view of an example of a pen 2500. In the example illustrated in FIG. 3, the pen 2500 is a multi-function pen. The pen 2500, which has a built-in power supply and is capable of transmitting commands to the display device 2, may be referred to as an active pen, as opposite to a pen having no built-in power supply, which may be referred to as a passive pen. The pen 2500 illustrated in FIG. 3 has one physical switch on a pen tip (or working end) thereof, one physical switch on a pen tail thereof, and two physical switches on a side surface thereof. The pen tip of the pen 2500 is allocated for writing, the pen tail of the pen 2500 is allocated for deleting, and the side surface of the pen 2500 is allocated for user functions. In this embodiment, the pen 2500 further includes a non-volatile memory that stores a pen ID that is unique to the pen 2500 and different from the pen IDs of other pens.

Operating procedures of the display device 2 to be performed by the user can be reduced by using the pen with switches. The pen with switches mainly refer to the active pens. However, passive pens having no built-in power supply can generate power using only an LC circuit according to electromagnetic induction, and thus, the active pens may encompass the electromagnetic induction type passive pens. Other examples of the pen with switches, other than the electromagnetic induction type passive pens, include optical type pens, infrared type pens, electrostatic capacitance type pens, or the like.

A hardware configuration of the pen 2500 may be similar to that of a pen which includes a communication function and a microcomputer and employs a general control method. The pen 2500 may be an electromagnetic induction type, an active electrostatic coupling type, or the like. In addition, the pen 2500 may include functions such as a pen pressure detection function, a pen tilt detection function, a pen hover function that displays a cursor before the pen touches the touchscreen panel, or the like.

<Overall Configuration of Display Device>

An overall configuration of the display device 2 according to this embodiment will be described with reference to FIG. 4A through FIG. 4D. FIG. 4A through FIG. 4C are diagrams illustrating the overall configurations of the display device 2, and FIG. 4D is a diagram illustrating a user U holding the pen 2500. FIG. 4A illustrates an example of the display device 2 which is used as an electronic whiteboard having a horizontally elongated shape and hanging on a wall.

Figure 4A:
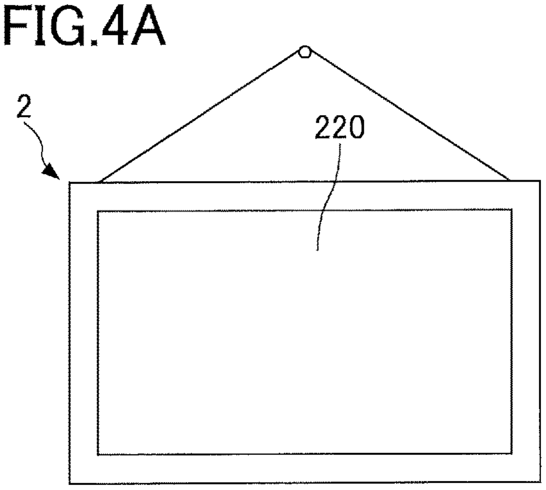
FIG. 4A, FIG. 4B, FIG. 4C, and FIG. 4D are diagrams illustrating an example of an overall configuration of the display device.

As illustrated in FIG. 4A, a display 220 is provided at an upper portion of the display device 2. The user U, illustrated in FIG. 4D, can handwrite (also referred to as input or draw) characters or the like on the display 220 using the pen 2500.

Figure 4B:
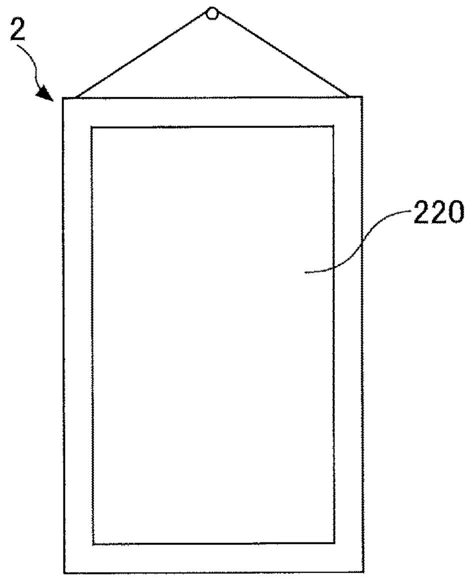
Figure 4D:
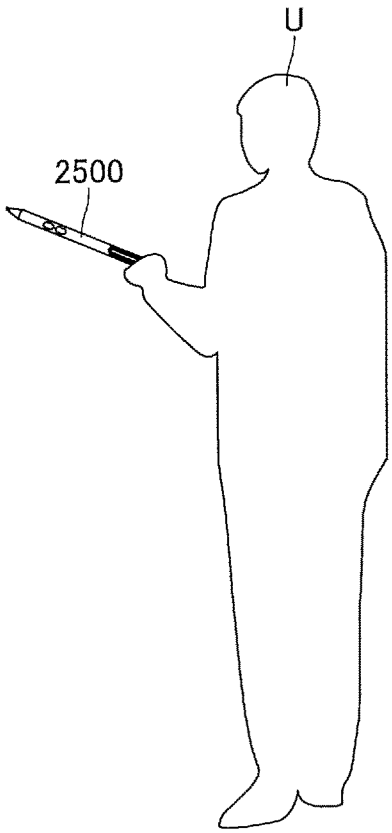

FIG. 4B illustrates an example of the display device 2 which is used as an electronic whiteboard having a vertically elongated shape and hanging on the wall.

Figure 4C:
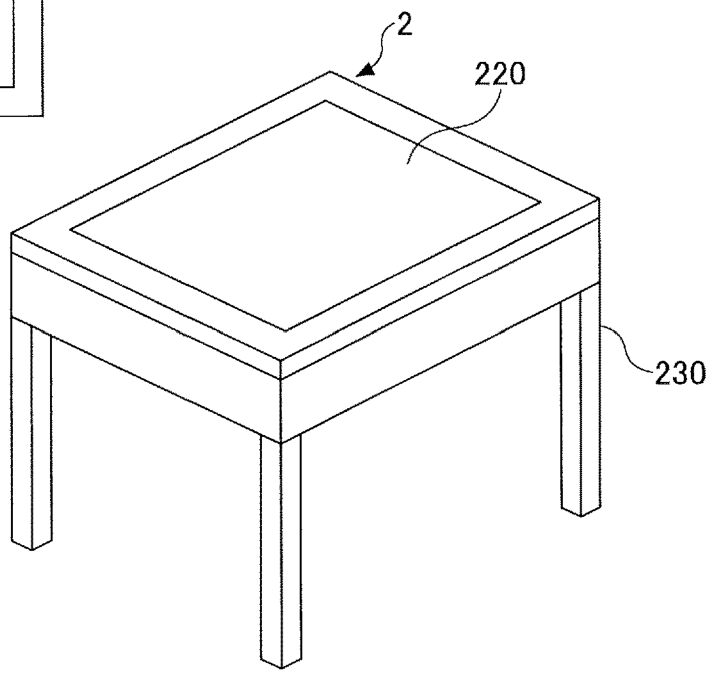

FIG. 4C illustrates an example of the display device 2 which is placed flat on a desk 230. Because the display device 2 has a thickness of approximately 1 cm, it is unnecessary to adjust the height of the desk 230 even if the display device 2 is placed flat on the desk 230, which may be an ordinary or general-purpose desk. In this example, the user U can easily move around the desk 230.

<Hardware Configuration of Display Device>

Figure 5:
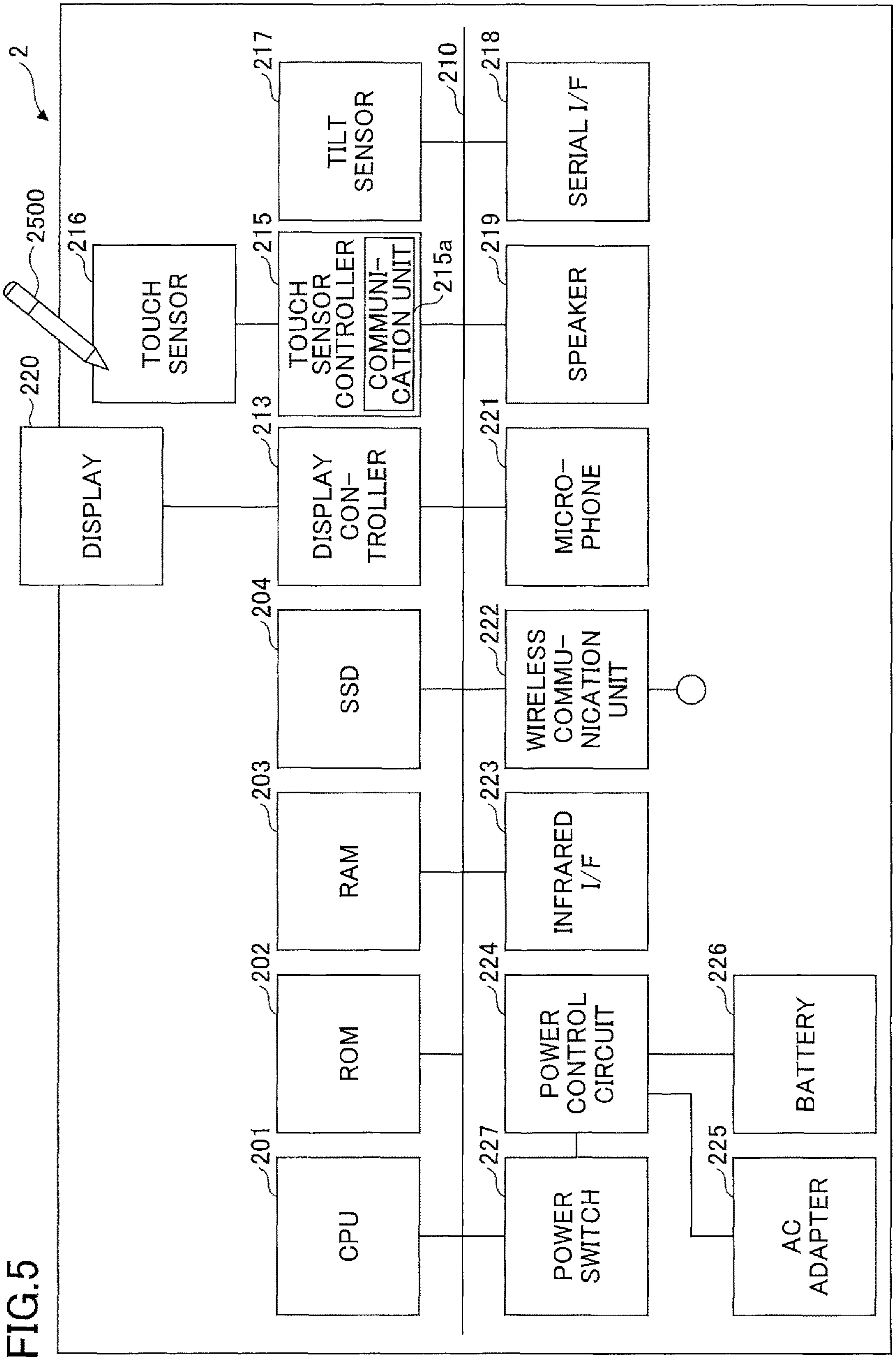
FIG. 5 is a diagram illustrating an example of a hardware configuration of the display device.

Next, a hardware configuration of the display device 2 will be described with reference to FIG. 5. The display device 2 may have the configuration of an information processing device or a computer, as illustrated in FIG. 5. FIG. 5 is a diagram illustrating an example of the hardware configuration of the display device 2. As illustrated in FIG. 5, the display device 2 includes a Central Processing Unit (CPU) 201, a Read Only Memory (ROM) 202, a Random Access Memory (RAM) 203, and a Solid State Drive (SSD) 204.

The CPU 201 of the display device 2 controls the overall operation of the display device 2. The ROM 202 stores one or more programs used to drive the CPU 201, such as an Initial Program Loader (IPL) or the like. The RAM 203 is used as a work area of the CPU 201. The SSD 204 stores various data, and one or more programs for the display device 2. Of course, the ROM 202 and the RAM 203 may store various data.

The one or more programs may be stored in a suitable non-transitory computer-readable recording medium. A recording medium forming the non-transitory computer-readable recording medium is not particularly limited, and may include the ROM 202, the RAM 203, the SSD 204, or the like described above.

The display device 2 further includes a display controller 213, a touch sensor controller 215, a touch sensor 216, the display 220, a power switch 227, a tilt sensor 217, a serial interface 218, a speaker 219, a microphone 221, a wireless communication device 222, an infrared interface (I/F) 223, a power control circuit 224, an AC adapter 225, and a battery 226.

The display controller 213 controls and manages screen display for outputting an output image to the display 220 or the like. The touch sensor 216 detects a touch of an object, such as the pen 2500, the user's hand, or the like (that is, the input device) on the display 220, that is, the contact between the input device and the display 220. The touch sensor 216 also receives the pen ID from the pen 2500 upon detecting the touch of the pen 2500.

The touch sensor controller 215 controls processes of the touch sensor 216. The processes of the touch sensor 216 include inputting coordinates and detecting the coordinates. The method of inputting the coordinates and detecting the coordinates may be an optical method, for example, in the case of the optical type touch sensor 216. According to the optical method, two light emitting and receiving devices provided located at both ends on an upper side of the display 220 emit a plurality of infrared rays parallel to the display 220 from respective light emitting elements, and receive, by respective light receiving elements, the infrared rays reflected by a reflecting member provided in a periphery of the display 220 and returned via optical paths identical to those of the infrared rays emitted by the respective light emitting elements. The touch sensor 216 outputs position information of the infrared rays emitted by the two light emitting and receiving devices and blocked by the object, to the touch sensor controller 215, and the touch sensor controller 215 identifies the coordinate position, that is, a contact position where the object makes contact with the display 220. In addition, the touch sensor controller 215 includes a communication unit 215*a*, and is capable of making wireless communication with the pen 2500. A commercial pen may be used as the pen 2500 when making the communication according to a standard such as Bluetooth (registered trademark), for example. When one or more pens 2500 are preregistered in the communication unit 215*a*, the communication can be performed without requiring the user to make the connection setting for enabling the pen 2500 to communicate with the display device 2.

The power switch 227 turns the power of the display device 2 ON or OFF. The tilt sensor 217 detects a tilt angle of the display device 2. The tilt sensor 217 is mainly used to detect whether the display device 2 is used in the set-up state illustrated in FIG. 4A, FIG. 4B, or FIG. 4C, and a thickness of the characters or the like may be changed automatically according to the set-up state.

The serial interface 218 forms a communication interface with respect to an external Universal Serial Bus (USB) or the like. The serial interface 218 is used to input external information, for example. The speaker 219 is used for audio output, and the microphone 221 is used for audio input. The wireless communication device 222 communicates with a terminal carried by the user, and relays a connection to the Internet, for example. The wireless communication device 222 may communicate via a standard such as Wi-Fi (registered trademark), Bluetooth (registered trademark), or the like, but the communication standard employed by the wireless communication device 222 is not particularly limited. The wireless communication device 222 forms an access point, and a connection can be made to the access point when the user sets a Service Set Identifier (SSID) and a password that are acquired to the terminal carried by the user.

The following two access points (a) and (b) can be prepared for the wireless communication device 222.

Access point (a)→Internet

Access point (b)→Company network→Internet

The access point (a) may be for external users who cannot access the internal network, but can utilize the Internet. The access point (b) is for company users who can utilize the company (or internal) network and the Internet.

The infrared I/F 223 detects a display device 2 arranged adjacent thereto. The infrared I/F 223 can detect only the display device 2 arranged adjacent thereto by taking advantage of the linearity of the infrared ray. One infrared I/F 223 can be provided on each side of the display device 2, so that it is possible to detect the directions in which other display devices 2 are arranged adjacent to the display device 2. The adjacent display device 2 may display handwritten information (handwritten information of another page when an area of one display 220 is regarded as one page) that is handwritten in the past.

The power control circuit 224 controls the AC adapter 225 and the battery 226, which are power supplies for the display device 2. The AC adapter 225 converts the alternating current (AC) shared by the commercial power supply into direct current (DC).

In a case where the display 220 is the so-called electronic paper, the display 220 consumes little or no power to maintain the image after the image is rendered, and thus, the display 220 may be driven by the battery 226. Accordingly, it is possible to use the display device 2 for an application such as digital signage even at a location, such as outdoors, where a connection to the power supply is difficult.

The display device 2 further includes a bus line 210. The bus line 210 may be an address bus, a data bus, or the like for electrically connecting each of the constituent elements of the display device 2, such as the CPU 201 or the like illustrated in FIG. 5.

The touch sensor 216 is not limited to the optical type, but may be formed by an electrostatic capacitance type touchscreen panel which identifies the contact position by detecting a change in electrostatic capacitance. The touch sensor 216 may be a resistive film type touchscreen panel which identifies the contact position by detecting a voltage change across two opposing resistive films. The touch sensor 216 may be an electromagnetic induction type touchscreen panel which identifies the contact position by detecting an electromagnetic induction that is generated when the object contacts the touchscreen panel (or display). Thus, the touch sensor 216 may use various detection means. The touch sensor 216 may be of a type that does not require an electronic pen to detect the presence or absence of the touch by the pen tip. In this case, the user's fingertips, pen-shaped bars, or the like may be used for the touch operations. The pen 2500 does not necessarily need to have the elongated pen shape.

<Functions of Display Device>

Figure 6A:
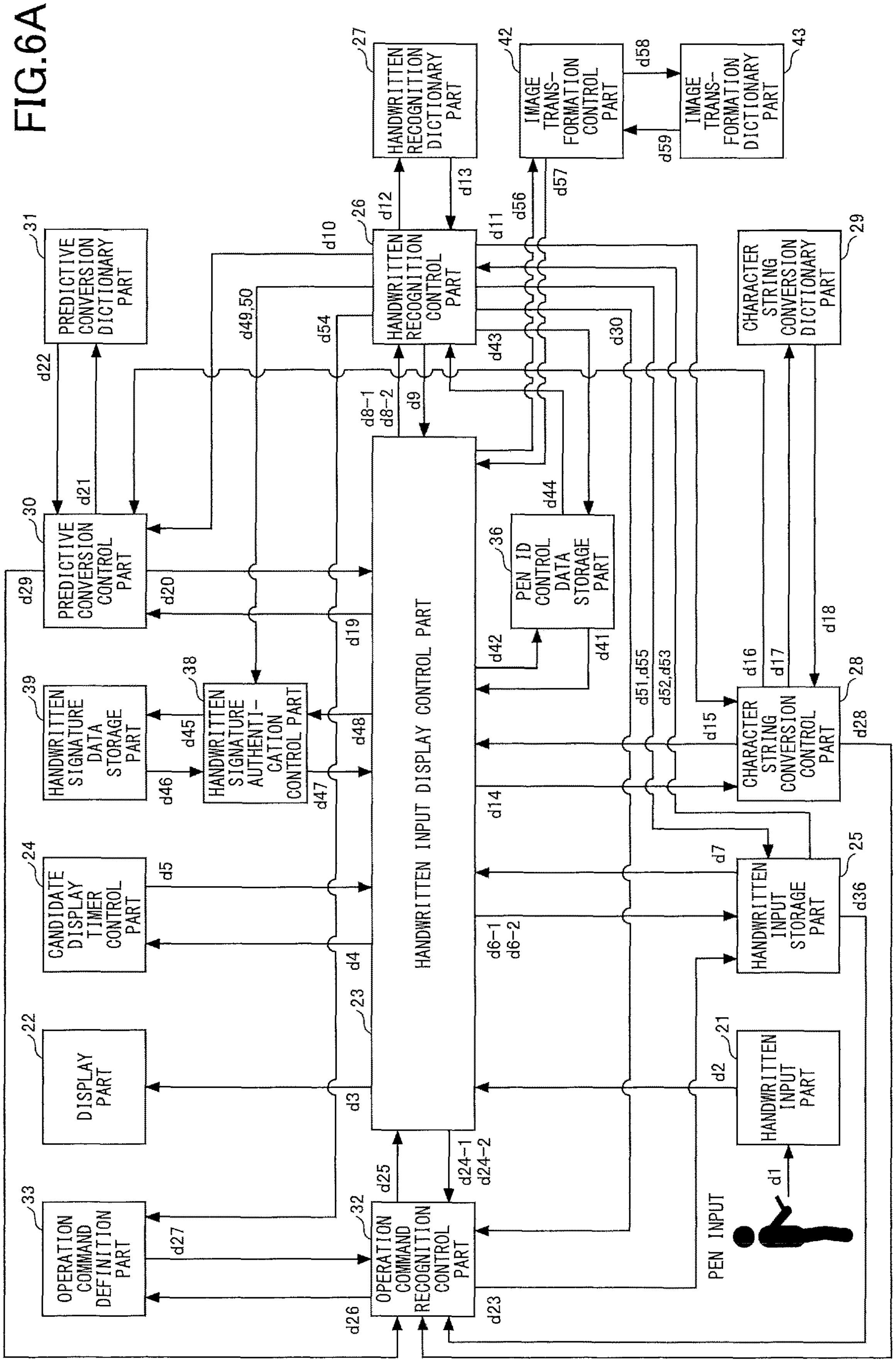
FIG. 6A and FIG. 6B are diagrams for explaining functions of the display device and the pen.

Next, functions of the display device 2 and the pen 2500 will be described, with reference to FIG. 6A and FIG. 6B. FIG. 6A is a functional block diagram illustrating an example of the functions of the display device 2. The display device 2 includes a handwritten input part 21, a display part 22, a handwritten input display control part 23, a candidate display timer control part 24, a handwritten input storage part 25, a handwriting recognition control part 26, a handwriting recognition dictionary part 27, a character string conversion control part 28, a character string conversion dictionary part 29, a predictive conversion control part 30, a predictive conversion dictionary part 31, an operation command recognition control part 32, an operation command definition part 33, a pen ID control data storage part 36, a handwritten signature authentication control part 38, and a handwritten signature data storage part 39. Each function of the display device 2 is a function or means implemented in one of the constituent elements illustrated in FIG. 5 when the constituent elements perform an operation in response to the command from the CPU 201 according to the program loaded from the SSD 204 to the RAM 203 and executed by the CPU 201.

The handwritten input part 21 is implemented by the touch sensor 216 or the like. The handwritten input part 21 receives the handwritten input from the user, and the pen ID. The handwritten input part 21 converts a user's pen input d1 into pen operation data d2 (pen up, pen down, or pen coordinate data) with the pen ID, and transmits the pen operation data d2 to the handwritten input display control part 23. The pen coordinate data is transmitted periodically as discrete values, and the coordinates between the discrete values are calculated and complemented.

The display part 22 is implemented by the display 220 or the like, and displays a handwritten object or an operation menu. The display part 22 converts rendered data d3 written into a video memory by the handwritten input display control part 23, into data according to the characteristics of the display 220, and transmits the converted data to the display 220.

The handwritten input display control part 23 performs an overall control of the handwritten input and display. The handwritten input display control part 23 processes the pen operation data d2 from the handwritten input part 21, and displays the processed pen operation data d2 by transmitting the same to the display part 22. Details of the processes performed on the pen operation data d2 and the display of strokes will be described later in conjunction with FIG. 33 through FIG. 39.

The candidate display timer control part 24 includes a display control timer for the selectable candidates. The candidate display timer control part 24 starts or stops the timer, and generates a timing for starting the display of the selectable candidates, and a timing for deleting the display. The selectable candidates include handwriting recognition character string candidates, language character string candidates, converted character string candidates, predictive converted character string candidates, and operation command candidates, that are selectably displayed on the operation guide which will be described later. The candidate display timer control part 24 receives a timer start request d4 (or a timer stop request, as the case may be) from the handwritten input display control part 23, and transmits a time out event d5 to the handwritten input display control part 23.

The handwritten input storage part 25 includes a storage function that stores user data (handwritten object/character string object). The handwritten input storage part 25 receives user data d6-1 from the handwritten input display control part 23, and stores the user data d6-1 in the handwritten input storage part 25. The handwritten input storage part 25 receives an acquisition request d6-2 from the handwritten input display control part 23, and transmits user data d7 stored in the handwritten input storage part 25. The handwritten input storage part 25 transmits position information d36 of a decided object to the operation command recognition control part 32.

The handwriting recognition control part 26 includes an identification engine for performing on-line handwriting recognition. Unlike the general Optical Character Reader (OCR), characters (not only in Japanese characters but also characters of other languages, such as alphabets in the case of the English language, for example), numbers, symbols (%, $, &, or the like), and graphics (lines, circles, triangles, or the like) are recognized in parallel with the user's pen operation. Various algorithms have been devised for the recognition technique, but a detailed description thereof will be omitted because this embodiment can utilize a conventional recognition technique that is appropriate.

The handwriting recognition control part 26 receives a pen operation data d8-1 from the handwritten input display control part 23, performs a handwriting recognition, and stores a handwriting recognition character string candidate. The handwriting recognition control part 26 stores a language character string candidate, converted from a handwriting recognition character string candidate d12 using the handwriting recognition dictionary part 27. In a case where an acquisition request d8-2 is received separately from the handwritten input display control part 23, the handwriting recognition control part 26 transmits stored handwriting recognition character string candidate and language character string candidate d9 to the handwritten input display control part 23.

The handwriting recognition dictionary part 27 includes dictionary data for the language conversion of the handwriting recognition. The handwriting recognition dictionary part 27 receives a handwriting recognition character string candidate d12 from the handwriting recognition control part 26, converts the handwriting recognition character string candidate d12 into a language character string candidate d13 that is linguistically probable, and transmits the converted language character string candidate d12 to the handwriting recognition control part 26. For example, in the case of the Japanese language, Hiragana characters are converted into Kanji characters or Katakana characters.

The character string conversion control part 28 controls the conversion of the converted character string candidate into a character string. The converted character string is likely generated to include the handwriting recognition character string or the language character string. The character string conversion control part 28 receives handwriting recognition character string and language character string candidate d11 from the handwriting recognition control part 26, converts the handwriting recognition character string and language character string candidate d1 into a converted character string candidate using the character string conversion dictionary part 29, and stores the converted character string candidate. In a case where an acquisition request d14 is received separately from the handwritten input display control part 23, the character string conversion control part 28 transmits a stored converted character string candidate d15 to the handwritten input display control part 23.

The character string conversion dictionary part 29 includes dictionary data for the character string conversion. The character string conversion dictionary part 29 receives handwriting recognition character string and language character string candidate d17 from the character string conversion control part 28, and transmits a converted character string candidate d18 to the character string conversion control part 28.

The predictive conversion control part 30 receives handwriting recognition character string and language character string candidate d10 from the handwriting recognition control part 26. The predictive conversion control part 30 receives a converted character string candidate d16 from the character string conversion control part 28. The predictive conversion control part 30 converts the handwriting recognition character string, the language character string candidate d10, and the converted character string candidate d16 into predicted character string candidates using the predictive conversion dictionary part 31, respectively. A predictive conversion character string is likely generated to include the handwriting recognition character string, the language character string or the converted character string. In a case where an acquisition request d19 is received separately from the handwritten input display control part 23, the predictive conversion control part 30 transmits a predicted character string candidate d20 to the handwritten input display control part 23.

The predictive conversion dictionary part 31 includes dictionary data for the predictive conversion. The predictive conversion dictionary part 31 receives the handwriting recognition character string and language character string candidate, and converted character string candidate d21 from the predictive conversion control part 30, and transmits a predicted character string candidate d22 to the predictive conversion control part 30.

The image transformation control part 42 receives, from the handwritten input display control part 23, the handwriting recognition character string candidate converted by the handwriting recognition control part 26 and the language character string candidate, the converted character string candidate converted by the character string conversion control part 28, and the predicted character string candidate converted by the predictive conversion control part 30 (these character string candidates will be designated by a reference numeral d56). The image transformation control part 42 searches for character string candidates d58 received from the handwritten input display control part 23, starting from a front index of the image transformation dictionary part 43, and receives a matching image candidate d59 from the image transformation dictionary part 43. The image transformation control part 42 transmits a received image candidate d57 to the handwritten input display control part 23.

The operation command recognition control part 32 receives handwriting recognition character string and language character string candidate d30 from the handwriting recognition control part 26. The operation command recognition control part 32 receives a converted character string candidate d28 from the character string conversion control part 28. The operation command recognition control part 32 receives a predicted character string candidate d29 from the predictive conversion control part 30. The operation command recognition control part 32 transmits an operation command conversion request d26 to the operation command definition part 33 for the handwriting recognition character string, the language character string candidate d30, the converted character string candidate d28, and the predicted character string candidate d29, respectively, and receives an operation command candidate d27 from the operation command definition part 33. The operation command recognition control part 32 stores the operation command candidate d27.

In a case where the operation command conversion request d26 partially matches the operation command definition, the operation command definition part 33 transmits the operation command candidate d27 to the operation command recognition control part 32.

In addition, the operation command recognition control part 32 receives pen operation data d24-1 from the handwritten input display control part 23. The operation command recognition control part 32 transmits a position information acquisition request d23 of the decided object that is input and decided in the past, to the handwritten input storage part 25, and stores the decided object specified by the pen operation data, as a selected object (including position information). The operation command recognition control part 32 identifies the selected object that satisfies a predetermined criteria with the position of the pen operation data d24-1. In a case where a acquisition request d24-2 is received separately from the handwritten input display control part 23, the operation command recognition control part 32 transmits stored operation command candidate and identified selected object d25 to the handwritten input display control part 23.

The pen ID control data storage part (or storage means) 36 stores the pen ID control data. Before the handwritten input display control part 23 transmits display data to the display part 22, the pen ID control data storage part 36 transmits pen ID control data d41 to the handwritten input display control part 23. The handwritten input display control part 23 renders display data under an operating condition stored in correspondence with the pen ID. Further, before the handwriting recognition control part 26 executes the handwriting recognition, the pen ID control data storage part 36 transmits angular information d44 of the pen ID control data to the handwriting recognition control part 26, and the handwriting recognition control part 26 rotates the stroke according to the angular information stored in correspondence with the pen ID, to execute the handwriting recognition.

After the handwriting recognition control part 26 recognizes a straight line for setting the angular information when the user handwrites characters or the like, the handwriting recognition control part 26 transmits angular information d43 of the pen ID control data to the pen ID control data storage part 36, to store the angular information d43 in correspondence with the pen ID. In addition, after the handwritten input display control part 23 executes the operation command for setting the angular information, the handwritten input display control part 23 transmits pen ID control data d42 to the pen ID control data storage part 36, to store the execution result of the operation command (the angular information set by the user) in correspondence with the pen ID. Thereafter, the stroke of the pen ID is rotated according to the set angular information, before executing the handwriting recognition.

The handwriting recognition control part 26 transmits stroke data d49, rotated clockwise according to the angular information of the pen ID control data, to the handwritten signature authentication control part 38. Hence, it becomes possible to authenticate the handwritten signature regardless of the user's position (that is, the direction from which the user makes the handwriting with respect to the display device 2).

The handwritten signature data storage part 39 stores the handwritten signature data. When the handwritten signature data storage part 39 receives a handwritten signature data acquisition request d45 from the handwritten signature authentication control part 38, the handwritten signature data storage part 39 transmits handwritten signature data d46 to the handwritten signature authentication control part 38. A format of the handwritten signature data depends on the algorithm used by the handwritten signature authentication control part 38 for the handwritten signature authentication. The data of the handwritten signature data storage part 39 will be described later in conjunction with FIG. 15.

When the stroke data d49 rotated clockwise is received from the handwriting recognition control part 26, the handwritten signature authentication control part 38 transmits a handwritten signature data acquisition request d45 to the handwritten signature data storage part 39, and the handwritten signature data storage part 39 transmits a handwritten signature data d46 to the handwritten signature authentication control part 38.

The handwritten signature authentication control part 38 authenticates the user based on the handwritten signature data. Various algorithms have been devised for the user authentication based on the handwritten signature data, and this embodiment may use a conventional technique that can recognize the handwritten signature data at a recognition rate that does not adversely affect the user authentication from a practical viewpoint. For example, a feature vector including coordinates forming the handwritten signature data, a pen pressure, a stroke time, or the like as elements thereof, may be generated, and the elements may be weighted, as appropriate. Then, a feature vector of the registered handwritten signature data, and the feature vector of a user name or the like handwritten by the user at the time of signing in, may be compared to determine a coincidence level of the compared feature vectors. It may be determined that the user authentication is successful when the coincidence level is greater than or equal to a threshold value, while it may be determined that the user authentication is unsuccessful (that is, failed) when the coincidence level is less than the threshold value.

The handwritten signature authentication control part 38 stores the authentication result of the handwritten signature, which is a compared result of the stroke data d49 and the handwritten signature data d46. In a case where an acquisition request d48 is received separately from the handwritten input display control part 23, the handwritten signature authentication control part 38 transmits a stored authentication result d47 of the handwritten signature to the handwritten input display control part 23. The authentication result of the handwritten signature includes information indicating whether or not the stroke data d49 and the handwritten signature data d46 may be regarded as a match, and in a matching case, SignatureId, which will be described later, and corresponding to the matching handwritten signature data d46.

In a case where the handwriting recognition result of the handwriting recognition control part 26 is adapted to the operation command instructing execution of the handwritten signature registration, the handwriting recognition control part 26 acquires data d52 input to a handwritten signature registration form (a field to which the handwritten signature data is input, as will be described later) from the handwritten input storage part 25. The handwriting recognition control part 26 transmits handwritten signature data d50 of the data d52 to the handwritten signature authentication control part 38. The handwritten signature authentication control part 38 transmits the received handwritten signature data d50 to the handwritten signature data storage part 39, to register the same.

In a case where the handwriting recognition result of the handwriting recognition control part 26 indicates a cancel instruction or registration of the handwritten signature, the handwriting recognition control part 26 transmits a delete request d51 of the handwritten signature registration form to the handwritten input storage part 25, and deletes the handwritten signature registration form from the handwritten input storage part 25.

In a case where the handwriting recognition result of the handwriting recognition control part 26 indicates an execute instruction to change the user definition data, the handwriting recognition control part 26 acquires data d53 input to a user definition data change form from the handwritten input storage part 25. The handwriting recognition control part 26 transmits a changed value d54 of the data d53 to the operation command definition part 33, to change the user definition data. The user definition data will be described later in conjunction with FIG. 14.

In a case where the handwriting recognition result of the handwriting recognition control part 26 indicates a cancel instruction or registration of the user definition data change form, the handwriting recognition control part 26 transmits a delete request d55 of the user definition data change form to the handwritten input storage part 25, and deletes the user definition data change form from the handwritten input storage part 25.

Figure 6B:
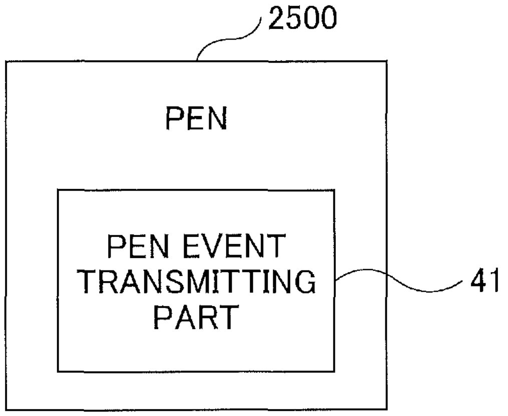

FIG. 6B is a functional block diagram illustrating an example of the functions of the pen 2500. The pen 2500 includes a pen event transmitting part 41. The pen event transmitting part 41 transmits event data of pen up, pen down, and pen coordinates, together with the pen ID, to the display device 2.

<Defined Control Data>

Next, defined control data, used by the display device 2 for various processes, will be described with reference to FIG. 7. FIG. 7 illustrates an example of the defined control data. The example illustrated in FIG. 7 illustrates the control data for each control item.

A selectable candidate display timer 401 defines the time (one example of a first time) until the selectable candidate is displayed, so that the display device 2 does not display the selectable candidate while the handwriting is being made. In FIG. 7 illustrates that the selectable candidate is displayed unless a pen down occurs within a TimerValue=500 [ms] from a pen up. The selectable candidate display timer 401 is stored by the candidate display timer control part 24. The selectable candidate display timer 401 is used at the start of the selectable candidate display timer in step S18-2 illustrated in FIG. 35 which will be described later.

A selectable candidate delete timer 402 defines the time (one example of a second time) until the displayed selectable candidate is deleted, so that the selectable candidate is deleted if the user does not select the selectable candidate. In FIG. 7 illustrates that the selectable candidate display data is deleted unless the selectable candidate is selected within a TimerValue=5000 [ms] from the display of the selectable candidate. The selectable candidate delete timer 402 is stored by the candidate display timer control part 24. The selectable candidate delete timer 402 is used at the start of the selectable candidate display delete timer in step S64 illustrated in FIG. 37 which will be described later.

A handwritten object rectangular region 403 defines a rectangular region which may be regarded as being near the handwritten object. In the example illustrated in FIG. 7, the handwritten object rectangular region 403 expands the rectangular region of the handwritten object in the horizontal direction by 50% of the estimated character size, and expands the rectangular region of the handwritten object in the vertical direction by 80% of the estimated character size. In the example illustrated in FIG. 7, the estimated character size is indicated by a percentage (specified %). However, if the unit is specified as "mm" or the like, the estimated character size may have a fixed length. The handwritten object rectangular region 403 is stored in the handwritten input storage part 25. The estimated character size 405 is used in step S10 illustrated in FIG. 34 which will be described later, to determine an overlapping state of the handwritten object rectangular region and a stroke rectangular region.

An estimated writing direction/character size determination condition 404 defines constants for determining the writing direction and character size measuring direction. In the example illustrated in FIG. 7, the estimated writing direction is determined to be "horizontal writing", and the estimated character size is determined to be the vertical distance, in a case where:

- A difference MinTime between a time when the stroke is first added and a time when the stroke is last added to the handwritten object rectangular region is MinTime=1000 [ms] or greater;
- A difference MinDiff between the horizontal distance (width) and the vertical distance (height) of the handwritten object rectangular region is MinDiff=10 [mm] or greater; and
- The horizontal distance is longer than the vertical distance.

In the case where the horizontal distance is shorter than the vertical distance, the estimated writing direction is determined to be "vertical writing" and the estimated character size is determined to be the horizontal distance. In a case where the above conditions are not satisfied, the estimated writing direction is determined to be "horizontal writing" (DefaultDir="Horizontal"), and the estimated character size is determined to be the longer distance between the horizontal distance and the vertical distance. The estimated writing direction/character size determination condition 404 is stored in the handwritten input storage part 25. The estimated writing direction/character size determination condition 404 is used for acquiring the estimated writing direction in step S59 illustrated in FIG. 37, and for acquiring the character string object font acquisition in step S81 illustrated in FIG. 39, which will be described later.

An estimated character size 405 defines data for estimating the size of the characters or the like. In the example illustrated in FIG. 7, the estimated character size determined by the estimated writing direction/character size determination condition 404 is compared to a small character 405*a* (hereinafter referred to as a minimum font size) of the estimated character size 405 and a large character 405*c* (hereinafter referred to as a maximum font size). In a case where the estimated character size is smaller than the minimum font size, the estimated character size is determined to be the minimum font size. In a case where the estimated character size is larger than the maximum font size, the estimated character size is determined to be the maximum font size. Otherwise, the estimated character size is determined to be the character size of a medium character 405*b*. The estimated character size 405 is stored in the handwritten input storage part 25. The estimated character size 405 is used for acquiring the character string object font in step S81 illustrated in FIG. 39, which will be described later.

More particularly, the handwritten input storage part 25 compares the estimated character size determined by the estimated writing direction/character size determination condition 404 with FontSize of the estimated character size 405, and uses the font having the FontSize closest to the estimated character size. For example, the handwritten input storage part 25 determines the estimated character size to be the "small character" when the estimated character size is 25 [mm] or less (FontSize of the small character), to be the "medium character" when the estimated character size is greater than 25 [mm] and 50 [mm] or less (FontSize of the medium character), and to be the "large character" when the estimated character size is greater than 100 mm (FontSize of the large character). The small character 405*a* uses the 25 mm Ming font (FontStyle="Ming", FontSize="25 mm"), the medium character 405*b* uses the 50 mm Ming font (FontStyle="Ming", FontSize="50 mm"), and the large character 405*c* uses the 100 mm Gothic font (FontStyle="Gothic", FontSize="100 mm"). The number of kinds of font sizes and styles can be incased, by increasing the number of kinds of the estimated character size 405.

A striding line determination condition 406 defines the data used for determining whether or not a plurality of objects are selected. The handwritten object is a single stroke. In the example illustrated in FIG. 7, it is determined that a plurality of objects are selected (selected objects are present), in a case where:

The length of the longer side of the handwritten object is 100 [mm] (MinLenLongSide="100 mm") or greater;

The length of the shorter side of the handwritten object is 50 [mm] (MaxLenShortSide="50 mm") or less; and There is an object which overlaps the handwritten object with an overlap ratio of 80 [%] (MinOverLapRate="80%") or higher along the direction of the longer side and the direction of the shorter side. The operation command recognition control part 32 stores the striding line determination condition 406. The striding line determination condition 406 is used for determining the striding line when determining the selected object in step S50 illustrated in FIG. 36, which will be described later.

An enclosure line determination condition 407 defines the data used for determining whether or not the object is an enclosure line. In the example illustrated in FIG. 7, the operation command recognition control part 32 determines an object, that overlaps the handwritten object and is determined to have the overlap ratio of 100% (MinOverLapRate="100%") or higher along the direction of the longer side and the direction of the shorter side of the handwritten object, as the selected object. The enclosure line determination condition 407 is stored in the operation command recognition control part 32. The enclosure line determination condition 407 is used for determining the enclosure line when determining the selected object in step S50 illustrated in FIG. 36, which will be described later.

The priority may be placed on the determination of either one of the striding line determination condition 406 and the enclosure line determination condition 407. For example, in a case where the striding line determination condition 406 is relaxed (set to a value so as to facilitate selection of the striding line) and the enclosure line determination condition 407 is strict (set to a value so as to enable selection of only the enclosure line), the operation command recognition control part 32 may place the priority on the determination of the enclosure line determination condition 407.

<Example of Dictionary Data>

The dictionary data will be described with reference to FIG. 8 through FIG. 10. FIG. 8 illustrates an example of the dictionary data of the handwriting recognition dictionary part 27. FIG. 9 illustrates an example of the dictionary data of the character string conversion dictionary part 29. FIG. 10 illustrates an example of the dictionary data of the predictive conversion dictionary part 31. Each of these dictionary data illustrated in FIG. 8 through FIG. 8 is used in steps S33 through S42 illustrated in FIG. 36, which will be described later.

In this embodiment, the conversion result of the dictionary data of the handwriting recognition dictionary part 27 illustrated in FIG. 8 will be referred to as a language character string candidate, the conversion result of the dictionary data of the character string conversion dictionary part 29 illustrated in FIG. 9 will be referred to as a converted character string candidate, and the conversion result of the dictionary data of the predictive conversion dictionary part 31 illustrated in FIG. 10 will be referred to as a predicted character string candidate. In addition, each dictionary data "before conversion" refers to the character string used for the search in the dictionary data, each dictionary data "after conversion" refers to the character string after conversion and corresponding to the character string used for the search, and "probability" refers to the probability of the selection that will be made by the user. The probability may be calculated from the result of the user's selection of each character string made in the past. Accordingly, the probability may be calculated for each user. Various algorithms have been devised for the probability calculation technique, but a detailed description thereof will be omitted because this embodiment can utilize a conventional probability calculation technique that is appropriate. This embodiment may display the character string candidates in a descending order of the selected probability according to the estimated writing direction.

The dictionary data of the handwriting recognition dictionary part 27 illustrated in FIG. 8 indicates that the handwritten Hiragana character "ぎ" before the conversion and pronounced "gi" has a 0.55 probability of being converted into a Kanji character "議" (which may mean "talk" or "consult" in English) after the conversion and also pronounced "gi" as indicated in the first line, and has a 0.45 probability of being converted into another Kanji character "技" (which may mean "technical" in English) after the conversion and also pronounced "gi" as indicated in the second line. The handwritten Hiragana characters "技士" before the conversion and pronounced "gishi" has a 0.55 probability of being converted into a character string of two Kanji characters "技師" and also pronounced "gishi" after the conversion as indicated in the third line, and has a 0.45 probability of being converted into another character string of two Kanji characters and also pronounced "gishi" after the conversion as indicated in the fourth line. The probabilities for other handwritten Hiragana characters before the conversion, after the conversion, are indicated similarly in the fifth through eighth lines. Although FIG. 8 illustrates an example in which the handwritten character string before the conversion are made up of Hiragana characters, characters other than the Hiragana characters may be registered as the handwritten character string before the conversion.

The dictionary data of the character string conversion dictionary part 29 illustrated in FIG. 9 indicates that the character string made up of a Kanji character '議' before the conversion and pronounced "gi" has a 0.95 probability of being converted into a character string made up of a character string of three Kanji characters "議事録" after the conversion and pronounced "gijiroku" (which may mean "agenda" in English) as indicated in the first line, and another character string made up of another Kanji character "技" before the conversion and pronounced "gi" has a 0.85 probability of being converted into another character string made up of three Kanji characters "技量試" after the conversion and pronounced "giryoushi" (which may mean "qualification trial" in English) as indicated in the second line. The probabilities for other character strings before the conversion, after the conversion, are indicated similarly in the third through tenth lines.

The dictionary data of the predictive conversion dictionary part 31 illustrated in FIG. 10 indicates that the character string made up of three Kanji characters "議 事録" before the conversion and pronounced "gijiroku" (which may mean "agenda" in English") has a 0.65 probability of being converted into a character string made up of seven Kanji and Hiragana characters "議事録の送付先" after the conversion and pronounced "gijiroku no soufusaki" (which may mean "sending destination of agenda" in English) as indicated in the first line, and another character string made up of three Kanji characters "技量試" before the conversion and pronounced "giryoushi" (which may mean "qualification trial" in English) has a 0.75 probability of being converted into a character string made up of six Kanji and Hiragana characters "技量試を決裁" after the conversion and pronounced "giryoushi wo kessai" (which may mean "qualification trial approval" in English) as indicated in the second line. The probabilities for other character strings before the conversion, after the conversion, are indicated similarly in the third through eighth lines. Although FIG. 10 illustrates an example in which all of the character strings before the conversion are made up of Kanji characters, characters other than Kanji characters may be registered as the character string before the conversion.

The dictionary data requires no language dependency, and any character string may be registered before and after the conversion.

FIG. 11 illustrates an example of image dictionary data included in the image transformation dictionary part 43. The image obtained by making a search in the image transformation dictionary part 43 will be referred to as an image candidate. The image dictionary data includes an index column, and an image column. The index column indicates the name of the image. The name in the index column is used for the comparison to determine whether or not a forward match with the handwriting recognition character string candidates, the language character string candidates, the converted character string candidates, or the predicted character string candidates occurs. Because the handwriting recognition character string candidates, the language character string candidates, the converted character string candidates, or the predicted string candidates are input in stages according to the user's handwriting, the match is determined when the search in the index column reveals a forward match. For example, when the user inputs a character string made up of two Katakana characters "アス" pronounced "asu", the forward match occurs for a character string made up of seven Katakana and Kanji characters "アスコルビン酸" pronounced "asukorubinsan" ("ascorbic acid" in English) and a character string made up of seven Katakana and Kanji characters "アスパラギン酸" pronounced "asuparaginsan" ("aspartic acid" in English).

The image in the image column may be any visually understandable image including figures such as diagrams or the like, illustrations such as bit maps or the like, photographs, 3-Dimensional Computer Graphics (3DCGs), or the like. The illustrations depict or decorate stories, novels, poems, or the like by the figures, to assist the character information of sciences, news reports, or the like. The illustrations are graphic or pictorial visual representations focusing on the subject matter rather than the format. The illustrations may be pictures, pictograms, or the like that are created according to the needs. The 3DCGs represent a 3-dimensional object using polygons, point group data, or the like, or are data of the 3-dimensional object. The 3-dimensional structure enables a viewer to view the shape from directions covering 360 degrees.

In addition, a file format of the image may be any one of Joint Photographic Experts Group (JPEG), Graphics Interchange Format (GIF), Portable Network Graphics (PNG), Tagged Image File Format (TIFF), Bitmap Image File Format (BMP), or the like. In the case of the 3DCG, a file format suitable for the 3DCG may be used. Further, the display device 2 may refer to the internal image dictionary data, or may retrieve and refer to the image searched on the Internet by a search engine.

<Operation Command Definition Data Stored in Operation Command Definition Part>

Next, operation command definition data used by the operation command recognition control part 32 will be described, with reference to FIG. 12A, FIG. 12B, and FIG. 13. FIG. 12A and FIG. 12B illustrate an example of the operation command definition data and system definition data stored in the operation command definition part 33.

FIG. 12A illustrates an example of the operation command definition data. The operation command definition data illustrated in FIG. 12A is an example of the operation command definition data for a case where there is no selected object selected by the handwritten object, and all operation commands that operate the display device 2 are targets. The operation command illustrated in FIG. 12A includes an operation command name (Name), a character string (String) that partially matches the character string candidate, and an operation command character string (Command) to be executed. "%~%" in the operation command character string is a variable, and corresponds to the system definition data as illustrated in FIG. 12B. In other words, "%~%" is replaced by the system definition data illustrated in FIG. 12B.

First, in operation command definition data 701 illustrated in FIG. 12A, the operation command name is a character string made up of fourteen Kanji, Katakana, and Hiragana characters "議事録テンプレートを読み込む" pronounced "gijiroku tenpureito wo yomikomu" ("load agenda template" in English), the character string that partially matches the character string candidate is made up of three Kanji characters "議事録" pronounced "gijiroku" ("agenda" in English) or a character string made up of six Katakana characters "テンプレート" pronounced "tenpureito" ("template" in English), and the operation command character string to be executed is "ReadFile https://%username%:%password%@server.com/template/minutes.pdf". In this example, the system definition data "%~%" is included in the operation command character string to be executed, and "%username%" and "%password%" are replaced by system definition data 704 and 705, respectively. Accordingly, the final operation command character string is "ReadFile https://taro.tokkyo: x2PDHTyS@server.com/template/minutes.pdf", indicating a read file (ReadFile) "https://taro.tokkyo: x2PDHTyS@server.com/template/minutes.pdf".

In operation command definition data 702, the operation command name is a character string made up of thirteen Kanji, Katakana, and Hiragana characters "議事録フォルダに保存する" pronounced "gijiroku foruda ni hozonsuru" ("store agenda folder" in English), the character string that partially matches the character string candidate is three Kanji characters "議事録" pronounced "gijiroku" ("agenda" in English) or two Kanji characters "保存" pronounced "hozon" ("store" in English), and the operation command character string to be executed is "WriteFile https:/%username%:%password%@server.com/minutes/%machine name%_%yyyyy-mm-dd%.pdf". Similar to the operation command definition data 701, "%username%", "%password%", and "%machinename%" in the operation command character string are replaced by the system definition data 704, 705, and 706 illustrated in FIG. 12B, respectively. "%yyyy-mm-dd%" is replaced by the current year, month, and date. For example, if the current date is Sep. 26, 2018, "%yyyy-mm-dd%" is replaced by "2018-09-26". The final operation command is "WriteFile https://taro.tokkyo: x2PDHTyS@server.com/minutes/%My-Machine_2018-09-26.pdf", indicating storing (writing) "gijiroku" ("agenda" in English) in a write file (WriteFile) "https://taro.tokkyo: x2PDHTyS@server.com/% minutes/%My-Machine_2018-09-26.pdf".

In operation command definition data 703, the operation command name is a character string made up of four Kanji and Hiragana characters "印刷する" pronounced "insatsu suru" ("print" in English)", the character string that partially matches the character string candidate is made up of two Kanji characters "印刷" pronounced "insatsu ("print" in English)" or a character string made up of four Katakana characters "プリント" pronounced "purinto" ("print" in English)", and the operation command character string to be executed is "PrintFile https:/%username%: %password%@server.com/print/%machiname%-%yyyy-mm-dd%.pdf". When the operation command character strings are replaced as in the operation command definition data 702, the final operation command is "PrintFile https://taro.tokkyo: x2PDHTyS@server.com/print/%My-Machine_2018-09-26.pdf", indicating that the file (PrintFile) "https://taro.tokkyo: x2PDHTyS@server.com/print/%My-Machine_2018-09-26.pdf" is printed (PrintFile), that is, the file is transmitted to a server. The printer prints the contents of the file on paper when the user causes the printer to communicate with the server and specifies the file.

As described above, because the operation command definition data 701 through 703 can be identified from the character string candidates, the operation command can be displayed when the user handwrites the operation command. Further, in a case where the user authentication is successful, "%username%", "%password%", or the like of the operation command definition data are replaced by the user information, and thus, the input and output of the file, in correspondence with the user, becomes possible.

In a case where the user authentication is not performed (including a case where the user authentication fails but the user is able to use the display device 2), the display device 2 is replaced by "%username%", "%password%", or the like of the display device 2 that is preset. Accordingly, even without the user authentication, the input and output of the file in correspondence with the display device 2 becomes possible.

Operation command definition data 709, 710, and 711 are operation commands for changing the pen state. The pen state may also be referred to as the pen type. In the operation command definition data 709, 710, and 711, the names of the operation commands are a character string made up of three Kanji and Katakana characters "細ペン" pronounced "hoso pen" ("thin pen" in English), a character string made up of three Kanji and Katakana characters "太ペン" pronounced "futo pen" ("thick pen" in English), and a character string made up of four Katakana characters "マーカー" pronounced "markar" ("marker" in English), respectively, the character strings that partially match the character string candidates are one Kanji character "細" pronounced "hoso" ("thin" or "fine" in English) or a character string made up of two Katakana characters "ペン" pronounced "pen" ("pen" in English), one Kanji character pronounced "futo" ("thick" of "bold" in English) or a character string made up of two Katakana characters "ペン" pronounced "pen" ("pen" in English), and a character string made up of four Katakana characters "マーカー" pronounced "markar" ("marker" in English), respectively, and the operation command character strings are "ChangePen fine", "ChangePen bold", and "ChangePen marking", respectively. When these operation commands are executed, the pen state is stored in the pen ID control data storage part 36, and thus, the user can handwrite the strokes in the set pen state.

Operation command definition data 712 is an operation command for aligning the orientation of the text data in a predetermined direction. In the operation command definition data 712, the operation command name is a character string made up of ten Katakana, Kanji, and Hiragana characters "テキスト方向を揃える" pronounced "tekisuto houkou wo soroeru" ("align text direction" in English), the character string that partially matches the character string candidate is made up of four Katakana characters "テキスト" pronounced "tekisuto" ("text" in English), a character string made up of two Kanji and Hiragana characters "向き" pronounced "muki" ("orientation" in English), or a character string made up of two Kanji characters "方向" pronounced "houkou" ("direction" in English), and the operation command character string is "AlignText Direction". The text data written by the user from a direction other than the top to bottom direction with respect to the touch sensor 216 will have a random orientation, thereby making it is difficult to read all of the text data from one direction. When the user executes the operation command definition data 712, the display device 2 aligns the recognized handwritten character strings in the same direction (for example, in a direction aligned with respect to the top to bottom direction). In this case, aligning the text data refers to rotating only angular information of the text data.

In operation command definition data 713, the operation command name is a character string made up of ten Kanji, Hiragana, and Katakana characters pronounced "tegaki sain touroku suru" ("register handwritten signature" in English), the character strings that partially match the character string candidates are made up of three Katakana characters "サイン" pronounced "sain" ("signature" in English) and two Kanji characters "登録" pronounced "touroku" ("register" in English), and the operation command character string is "RegisterSignature". When the "RegisterSignature" command is executed, a handwritten signature registration form is added to the handwritten input storage part 25, and the handwritten signature registration form is displayed on the operation screen 101. An example of the handwritten signature registration form will be described later, by referring to FIG. 30A through FIG. 30C, for example.

Figure 31:
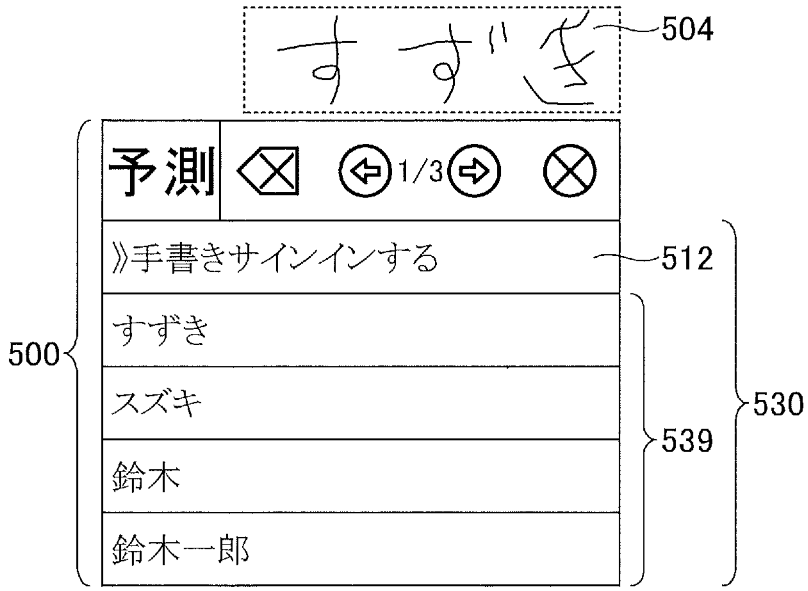
FIG. 31 is a diagram illustrating an example of the operation guide that is displayed when a user handwrites "Suzuki" which is a registered handwritten signature data.

In operation command definition data 714, the operation command name is a character string made up of ten Kanji, Hiragana, and Katakana characters "手書きサインインオン" pronounced "tegaki sain in on" ("handwritten sign in on" iPnPgRsh), the character string that partially matches the character string candidate is "%signature%", and the operation command is "Signin". The character string "%signature%" is a reserved word of the system definition data, and represents the fact that the registered handwritten signature data and the stroke data of the user name or the like meet the criteria for a match. In other words, when the registered handwritten signature data and the stroke data meet the criteria for the match, the operation command 512 based on the operation command definition data 714 is displayed in the operation guide 500, as illustrated in FIG. 31 which will be described later.

When the “Signin” command is executed, “AccountId” of the user having “SignatureId” of the matching handwritten signature data, is stored in the pen ID control data of the pen 2500 used to handwrite the user name or the like by the stroke data. Hence, the pen ID and the “AccountId” are made to correspond to each other, and the display device 2 can use the user definition data identified by the “AccountId”, as illustrated in FIG. 17A which will be described later.

In operation command definition data 715, the operation command name is a character string made up of eleven Kanji, Hiragana, and Katakana characters “手書きサインアウトする” pronounced “tegaki sain auto suru” (“handwritten sign out” in English), the character string that partially matches the character string candidate is made up of three Katakana characters “サイン” pronounced sain“si” in English) or three Katakana characters “アウト” pronounced “auto” (“out” in English), and the operation command is “Signout”. When the “Signout” command is executed, the “AccountId” is deleted from the pen ID control data of the pen 2500 that is used for the handwritten sign out. Hence, the correspondence between the pen ID and the “AccoundId” is deleted, thereby making it possible for an arbitrary user to use the pen 2500.

In operation command definition data 716, the operation command name is a character string made up of six Kanji and Hiragana characters “設定変更する” pronounced “settei henkou suru” (“change setting” in English), the character string that partially matches the character “設定” string candidate is made up of two Kanji characters pronounced “settei” (“set” in English) or two Kanji characters “変更” pronounced “henkou” (“change” in English), and the operation command is “ConfigSettings”. When the “ConfigSettings” command is executed, a user definition data change form is added to the handwritten input storage part 25, and the user definition data change form is displayed on the operation screen 101. The user definition data change form will be described later, by referring to FIG. 32A and FIG. 32B, for example.

Next, the operation command definition data when the handwritten object is present, that is, the operation command definition data for an editing system and a decorating system, will be described. FIG. 13 illustrates an example of the operation command definition data when a selected object selected by the handwritten object is present. The operation command definition data illustrated in FIG. 13 includes an operation command name (Name), a group name (Group) of the operation command candidates, and an operation command character string (Command) to be executed.

Operation command definition data 707 defines the operation commands for the editing system (Group=“Edit”), and is an example of the definition data of the operation command names for the editing system, including a character string made up of two Kanji characters “消去” pronounced “shoukvo” (“delete” in English), a character string made up of two Kanji characters “移動” pronounced “idou” (“move” in English), a character string made up of two Kanji characters “回転” pronounced “kaiten” (“rotate” in English), and a character string made up of two Kanji characters “選択” pronounced “sentaku” (“select” in English). In other words, these operation commands are displayed with respect to the selected objects, so that the user can select a desired operation command.

Operation command definition data 708 defines the operation commands for the decorating system (Group=“Decorate”), and is an example of the definition data for the operation command names for the decorating system, including a character string made up of two Kanji and Hiragana characters “太く” pronounced “futoku” (“thick” in English), a character string made up of two Kanji and Hiragana characters “細く” pronounced “hosoku” (“thin” in English), a character string made up of three Kanji and Hiragana characters “大きく” pronounced “ookiku” (“large” in English), a character string made up of three Kanji and Hiragana characters “小さく” pronounced “chiisaku” (“small” in English), and a character string made up of two Kanji characters “下線” pronounced “kasen” (“underline” in English). These operation commands are displayed with respect to the selected objects, so that the user can select a desired operation command. Other operation command, such as operation commands related to color, may also be displayed.

Accordingly, the operation command definition data 707 and 708 are identified when the user specifies the decided object by the handwritten object, so that the user can cause the operation command to be displayed by making the handwriting.

<User Definition Data>

Next, user definition data will be described with reference to FIG. 14. FIG. 14 illustrates an example of the user definition data stored by the operation command definition part 33. The user definition data illustrated in FIG. 14 is an example of the definition data of a single user. “AccountId” of user definition data 717 is user identification information (or numbering) automatically assigned to each user, “AccountUsername” and “AccountPassword” are a user name and a password, respectively, “SignatureId” is identification information (or numbering) automatically assigned to the handwritten signature data at the time of registering the handwritten signature data, and “username”, “password”, and “machinename” are character strings set in the operation command definition data 701, 702, and 703 in place of the system definition data 704, 705, and 706, respectively. Hence, it is possible to execute an operation command using the user definition data.

In a case where the user signs in by handwriting the user name or the like, the character string of the user definition data including the “AccountId” in correspondence with the pen ID of the pen 2500 used by the user, is used when executing the operation command by utilizing the correspondence between the pen ID and the “AccountId” with respect to the pen ID control data, as illustrated in FIG. 17A. After the user signs out, the character string for the system definition data is used when executing the operation command, even if the pen 2500 that is used by the user to sign in is used.

User definition data 718 is used in the user definition data change form. “Name” is the item name of “AccountUsername”, “AccountPassword”, “username”, “password”, or “machinename” of the user definition data 717, and “Data”

is the changed value of "AccountUsername", "AccountPassword", "username", "password", or "machinename". In this example, the data for a character string made up of two Kanji characters "名前" pronounced "namae" ("name" in English) is "% AccountName %". The data for a character string made up of five Katakana characters "パスワード" pronounced "pasuwado" ("password" in English) is "%AccountPassword%". The data for a character string made up of ten Katakana and Kanji characters "フォルダユーザ名" pronounced "foruda yuza mei" ("folder user name" in English) is "%username%". The data for a character string made up of ten Katakana characters "フォルダパスワード" pronounced "foruda pasuwado" ("folder password in English) is "%password%". The data for a character string made up of ten Katakana and Kanji characters "フォルダファイル名" pronounced "foruda fairu mei" ("folder password" data is "%machinename%". Each item corresponds to each item of user definition data 717. These items input to the user definition data change form are reflected in the user definition data 717.

<Handwritten Signature Data>

Next, the handwritten signature data will be described with reference to FIG. 15. FIG. 15 illustrates an example of the handwritten signature data stored in the handwritten signature data storage part 39. The handwritten signature data includes "Data" representing the handwritten signature corresponding to "SignatureId". "SignatureId" is identification information (or numbering) automatically assigned at the time of registering the handwritten signature data, and "Data" is data calculated from the stroke data received from the handwritten signature authentication control part 38, according to a handwritten signature authentication algorithm of the handwritten signature authentication control part 38.

<Handwritten Input Storage Data Stored in Handwritten Input Storage Part>

Next, handwritten input storage data will be described, with reference to FIG. 16. FIG. 16 illustrates an example of the handwritten input storage data stored in the handwritten input storage part 25. One line in FIG. 16 represents one stroke. One handwritten input storage data includes each of items "DataId", "Type", "PenId", "Color", "Width", "Pattern", "Angle", "AccountId", "StartPoint", "StartTime", "EndPoint", "EndTime", "Point", and "Pressure".

"DataId" represents identification information of the stroke. "Type" represents a type of the stroke. The types include the stroke (Stroke), the group (Group), and the text (Text). The type of handwritten input storage data 801 and 802 is "Stroke", and the type of handwritten input storage data 803 is "Group". "Group" encompasses grouping the stroke with other strokes, and the handwritten input storage data having the type "Group" specifies a target stroke to be grouped by "DataId". "PenId", "Color", "Width", "Pattern", "Angle", and "AccountId" are transcribed from the pen ID control data described below. "StartPoint" represents start point coordinates of the stroke, "StartTime" represents a start time of the stroke, "EndPoint" represents end point coordinates of the stroke, and "EndTime" represents an end time of the stroke. "Point" represents a sequence of coordinate points from the start point to the end point, and "Pressure" represents the pen pressure from the start point to the end point. As indicated by "Angle", handwritten input storage data 804 and 805 indicate the handwriting recognition after being rotated clockwise by 180 degrees and 270 degrees, respectively. The handwritten input storage data 802 and 805 indicate that the handwritten input storage data 802 and 805 are input by the user having AccountId=1 for the user definition data.

<Pen ID Control Data Stored in Pen ID Control Data Storage>

Figure 17B:
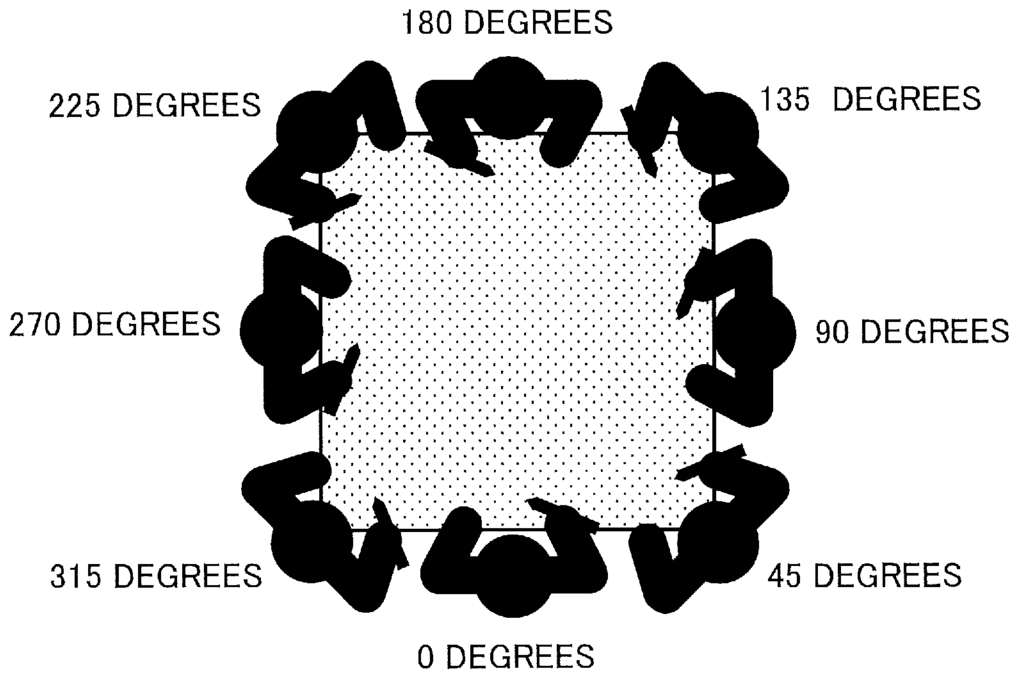

Next, the pen ID control data will be described, with reference to FIG. 17A and FIG. 17B. FIG. 17A is a diagram illustrating the pen ID control data stored in the pen ID control data storage part 36. One line in FIG. 17A represents the pen ID control data of one pen. FIG. 17B is a diagram for explaining angular information when the user makes the handwriting with respect to the display device 2. The angular information may be the angle of the direction in which the user is present, the angle of the direction in which the pen is used, or the angle of the rotation of the characters handwritten by the user. When a predetermined direction (for example, the top to bottom direction) of the display device 2 is regarded as being the direction with the angle of 0 degrees (reference), the angular information of each of the users is 45 degrees, 90 degrees, 135 degrees, 180 degrees, 225 degrees, 270 degrees, and 315 degrees, counterclockwise.

In the case where the display device 2 is placed flat, the angular information of the user represents the position of the user with respect to the display device 2. In other words, the angular information of the user may be regarded as being the information related to the position of the user. The display device 2 can identify the direction in which the user is present when viewed from the display device 2. The angular information may be replaced by other information, such as information expressing 0 degrees as a 6 o'clock direction, 45 degrees as in-between a 4 o'clock direction and a 5 o'clock direction, 90 degrees as a 3 o'clock direction, 135 degrees as in-between a 1 o'clock direction and a 2 o'clock direction, 180 degrees as a 12 o'clock direction, 225 degrees as in-between a 10 o'clock direction and a 11 o'clock direction, 270 degrees as a 9 o'clock direction, and 315 degrees as in-between a 7 o'clock direction and a 8 o'clock direction, based on the direction viewed from the display device 2.

The angular information is not automatically determined by the user's position, and each user inputs (specifies) the angular information. A resolution of the angular information that can be specified in this example (45 degrees in FIG. 17A and FIG. 17B) is merely one example, and the resolution may be set to a smaller angle in a range of 5 degrees to 30 degrees, for example. However, if the characters are rotated by an angle of approximately 45 degrees, the user is likely able to read and visually recognize the characters.

The pen ID control data includes "PenId", "Color", "Width", "Pattern", "Angle", and "AccountId". "PenId" is identification information stored inside the pen. "Color" is the color of the stroke set in this pen, and can be changed arbitrarily by the user. "Width" is the thickness (or width) of the stroke set in this pen, and can be changed arbitrarily by the user. "Pattern" is the line type of the stroke set in this pen, and can be changed arbitrarily by the user. "Angle" is the angular information of the stroke set in this pen, and can be changed arbitrarily by the user. In the example illustrated in FIG. 17A, the angular information of each pen is 0 degrees, 90 degrees, 180 degrees, and 270 degrees, counterclockwise. AccountId is the user's identity. Because "AccountId" is made to correspond to the pen ID, it is possible to identify the "AccountId" corresponding to the pen ID of the pen 2500 that is used by the user, and execute the operation command using the user definition data.

Pen ID control data 901 is the control data in which the pen ID is 1, a color that is black (Black), a thickness that is 1 pixel (1 px), a pattern that is solid (Solid), angular information that is 0 degrees, and AccountId=1. The user with AccountId=1 is the user with the user definition data 717 illustrated in FIG. 14, and indicates that this user signed in by handwriting the user name or the like using the pen with the pen ID of 1. The pen ID control data having no "AccountId" indicates a signed out state (not made to correspond to the user).

Similarly, pen ID control data 902 is the control data in which the pen ID is 2, a color that is black, a thickness that is 1 pixel, a pattern that is solid, angular information that is 90 degrees, and includes no AccountId. Pen ID control data 903 is the control data in which the pen ID is 3, a color that is black, a thickness that is 10 pixels, a pattern that is solid, angular information that is 180 degrees, and includes no AccountId. Pen ID control data 904 is the control data in which the pen ID is 4, a color that is black, a thickness that is 10 pixels, a pattern that is a halftone dot pattern, angular information that is 270 degrees, and includes no AccountId.

Figure 33:
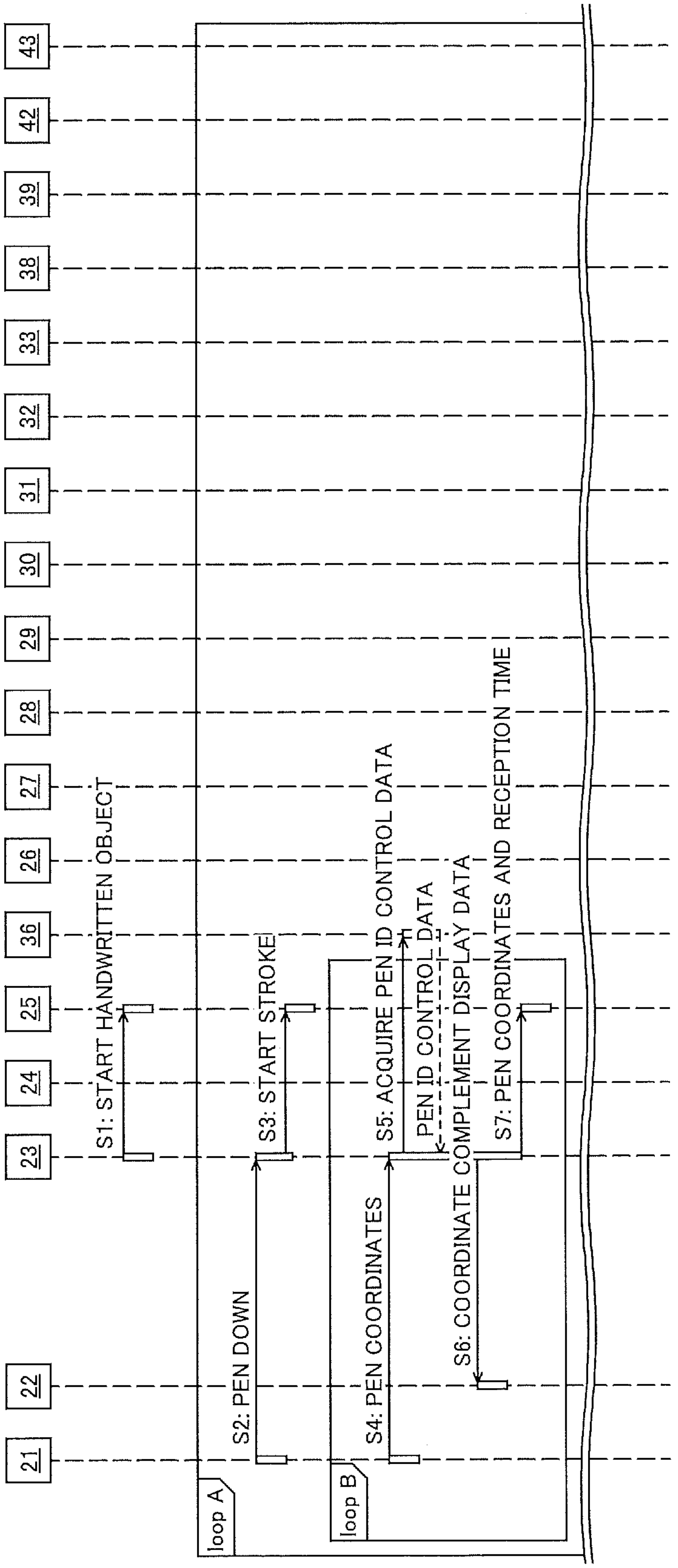
FIG. 33 is a sequence diagram (part 1) for explaining an example of a process in which a display device displays character string candidates and operation command candidates.
Figure 35:
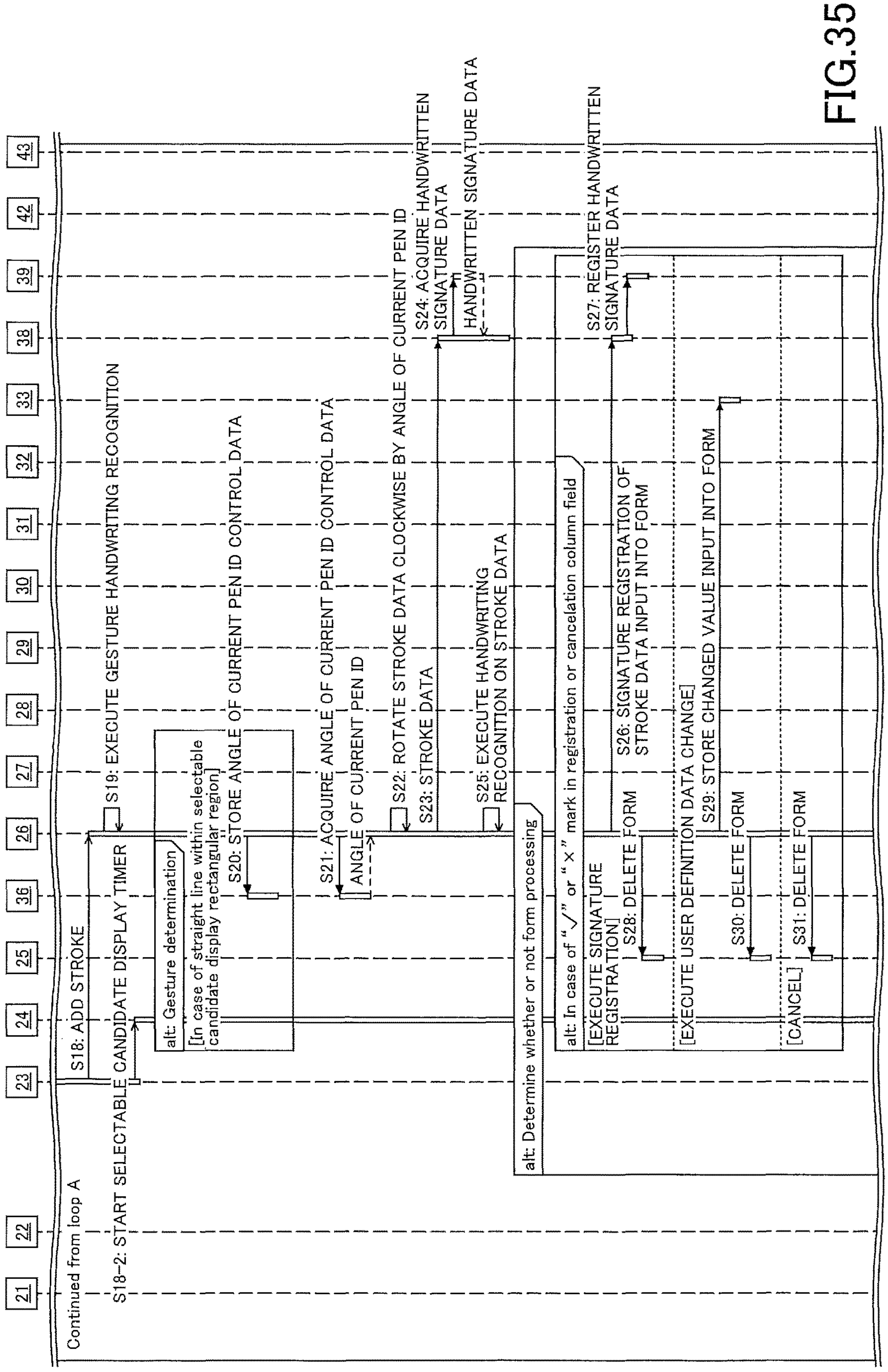
FIG. 35 is a sequence diagram (part 3) for explaining the example of the process in which the display device displays the character string candidates and the operation command candidates.
Figure 37:
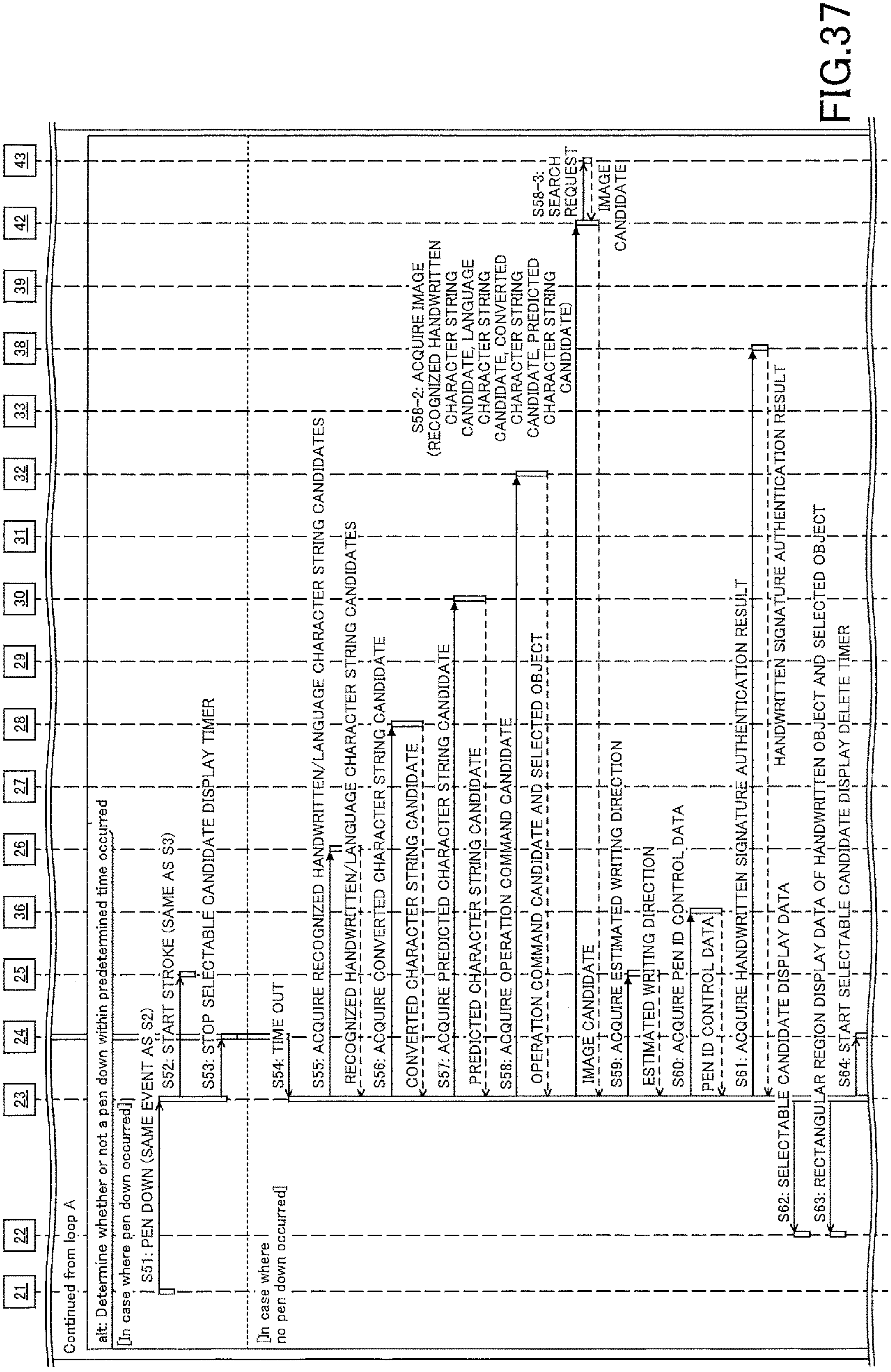
FIG. 37 is a sequence diagram (part 5) for explaining the example of the process in which the display device displays the character string candidates and the operation command candidates.
Figure 39:
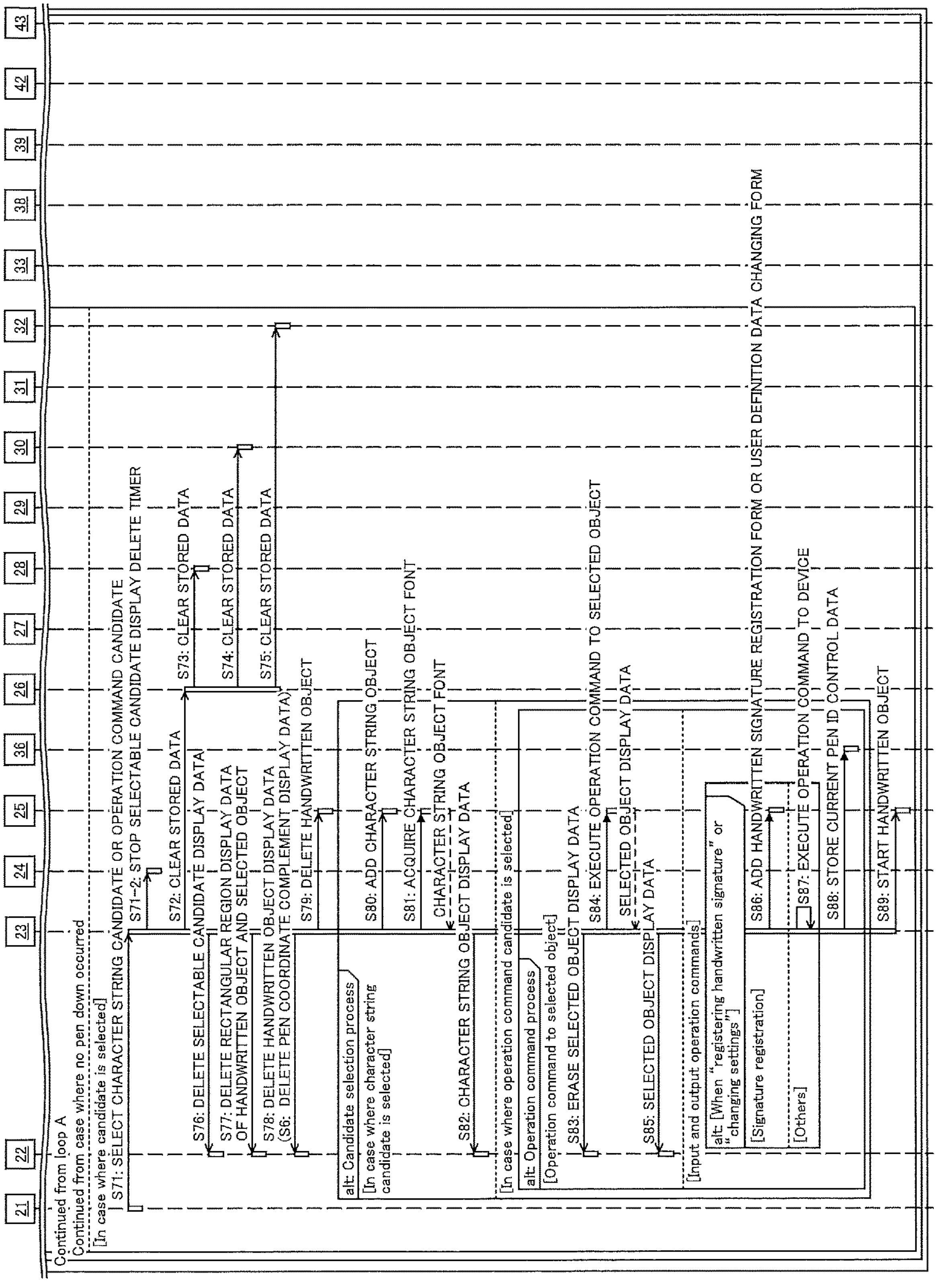
FIG. 39 is a sequence diagram (part 7) for explaining the example of the process in which the display device displays the character string candidates and the operation command candidates.

The control data is used in step S5 illustrated in FIG. 33 for acquiring the pen ID control data illustrated in FIG. 33, in step S20 illustrated in FIG. 35 for storing the angular information of the pen ID control data, in step S21 illustrated in FIG. 35 for acquiring the angular information of the pen ID control data, in step S60 illustrated in FIG. 37 for acquiring the pen ID control data, and in step S88 illustrated in FIG. 39 for storing the angular information of the pen ID control data.

<Example of Selectable Candidates>

Figure 18:
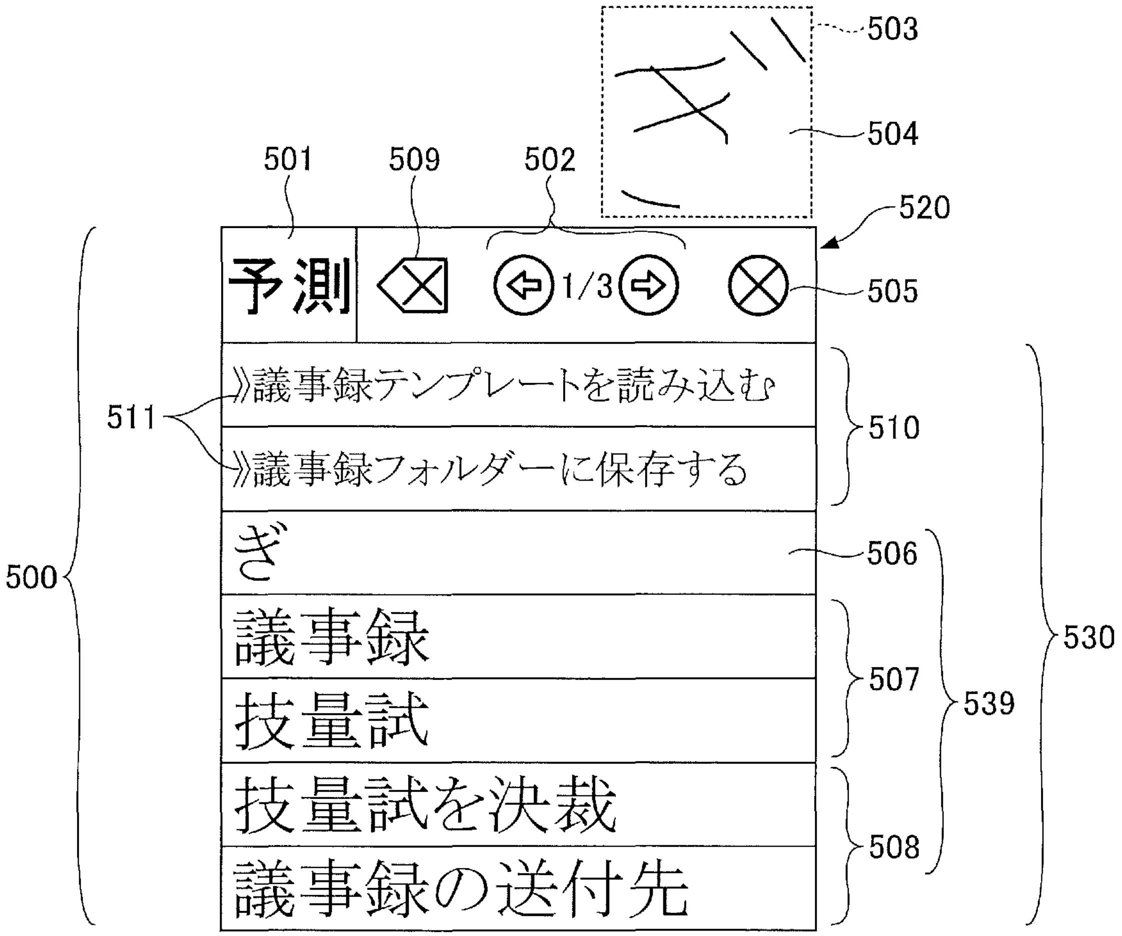
FIG. 18 is a diagram illustrating an example of an operation guide and selectable candidates displayed by the operation guide.

First, a selectable candidate displaying only characters will be described with reference to FIG. 18. FIG. 18 illustrates an example of a selectable candidate 530 displayed by an operation guide and an operation guide. When the user handwrites the handwritten object 504 and a time out of the selectable candidate display timer occurs, the operation guide 500 is displayed. The operation guide 500 includes an operation header 520, an operation command candidate 510, a handwriting recognition character string candidate 506, a converted character string candidate 507, a character string/predictive conversion candidate 508, and a handwritten object rectangular area display 503. The selectable candidate 530 includes an operation command candidate 510, a handwriting recognition character string candidate 506, a converted character string candidate 507, and a character string/predictive conversion candidate 508. A language character string candidate is not displayed in this example, however, the language character string candidate may be displayed, as appropriate. The selectable candidate 530, excluding the operation command candidate 510, will be referred to as a character string candidate 539.

The operation header 520 includes buttons 501, 509, 502, and 505. The button 501 accepts a switching operation between the predictive conversion and the Kana conversion. In the example illustrated in FIG. 18, when the user presses the button 509 indicating a character string made up of two Kanji characters "予測" pronounced "yosoku" ("predictive" in English) to select the predictive conversion, the handwritten input part 21 accepts the selected predictive conversion and notifies the same to the handwritten input display control part 23, and the display part 22 changes the display of the button 509 to indicate a character string made up of two Hiragana characters "かな" pronounced "kana" to enable selection of the Kana conversion. After this change, the character string candidate 539 arranges the candidates in a descending probability order of the Kana conversion which converts the Hiragana characters into the Kanji and/or Katakana characters.

The button 502 accepts a page operation on the candidate display. In the example illustrated in FIG. 18, there are three candidate display pages, and the first page is currently displayed. The button 505 accepts deletion of the operation guide 500. When the user presses the button 505, the handwritten input part 21 accepts the deletion and notifies the same to the handwritten input display control part 23, and the display part 22 deletes the display other than the handwritten object. The button 509 accepts collective display deletion. When the user presses the button 509, the handwritten input part 21 accepts the collective display deletion and notifies the same to the handwritten input display control part 23, and the display part 22 deletes all of the display illustrated in FIG. 18, including the handwritten object. Accordingly, the user can redo the handwriting from the start.

The handwritten object 504 in this example is a Hiragana character "ぎ" pronounced "gi". The handwritten object rectangular area display 503, surrounding the handwritten object 504, is displayed. The display procedure may be performed in the sequence described later in conjunction with FIG. 33 through FIG. 39. In the example illustrated in FIG. 18, the handwritten object rectangular area display 503 is displayed as a rectangular frame indicated by dots.

The handwriting recognition character string candidate 506, the converted character string candidate 507, and the character string/predictive conversion candidate 508 respectively include character string candidates arranged in the descending probability order. The Hiragana character "ぎ" pronounced "gi" of the handwriting recognition character string candidate 506 is the candidate of the recognition result. In this example, the display device 2 correctly recognizes the Hiragana character "ぎ" pronounced "gi".

The converted character string candidate 507 is the converted character string candidate converted from the language character string candidate. In this example, the converted character string candidate 507 displays the upper character string made up of three Kanji characters "議事録" pronounced "gijiroku" (which may mean "agenda" in English), and the lower c e string made up of three Kanji characters "技量試" pronounced "giryoushi" (which may mean "qualification trial" in English), which is an abbreviation for a character string made up of six Kanji characters "技術量産試作" pronounced "gijutsu ryousan shisaku" (which may mean "technical mass production trial" in English). The character string/predictive conversion candidate 508 is the predicted character string candidate converted from the language character string candidate or the converted character string candidate. In this example, the character string/predictive conversion candidate 508 displays the upper character string made up of six Kanji and Hiragana characters "技量試を決裁" pronounced "giryoushi wo kessai" (which may mean "qualification trial approval" in English), and the lower character string made up of seven Kanji and Hiragana characters "議事録の送付先" after the conversion and pronounced "gijiroku no soufusaki" (which may mean "sending destination of agenda" in English).

The operation command candidate 510 is the operation command candidate selected based on the operation command definition data 701 through 703, and 709 through 716 illustrated in FIG. 12A. In the example illustrated in FIG. 18, a bullet character ">>" 511 indicates the operation command candidate. In FIG. 18, there is no decided object that can be selected by the handwritten object 504 that is a Hiragana character pronounced "gi", and because the character string "ぎ" candidate (upper character string) made up of three Kanji characters "議事録" pronounced "gijiroku" (which may mean "agenda" in English) displayed in the converted character string candidate 507, which is the character string candidate of the handwritten object 504, partially matches the operation command definition data 701 and 702 illustrated in FIG. 12A, the character string candidate (upper character string) made up of three Kanji characters "議事録" pronounced "gijiroku" (which may mean "agenda" in English), displayed in the converted character string candidate 507, is displayed as the operation command candidate 510 of the operation command.

The operation command candidate 510 includes an upper candidate (upper character string) made up of fourteen Kanji, Katakana, and Hiragana characters "議事録テンプレートを読み込む" pronounced "gijiroku tenpureto wo yomikomu" ("load agenda template" in English), and a lower candidate (lower character string) made up of thirteen Kanji, Katakana, and Hiragana characters "議事録フォルダに保存 する" Pronounced "gijiroku foruda ni hozonsuru" ("store agenda folder" in English). When the user selects the upper candidate following the upper bullet character ">>" 511 displayed in the operation command candidate 510, the operation command defined by the operation command definition data 701 is executed. When the user selects the lower candidate following the lower bullet character ">>" 511 displayed in the operation command candidate 510, the operation command defined by the operation command definition data 702 is executed. Because the operation command candidate is displayed when the operation command definition data including the converted character string is found, the operation command candidate is not always displayed.

As illustrated in FIG. 18, the character string candidates and the operation command candidates are displayed together at the same time, and thus, the user can arbitrarily select each of the character string candidate and the operation command candidate intended by the user.

Figure 19:
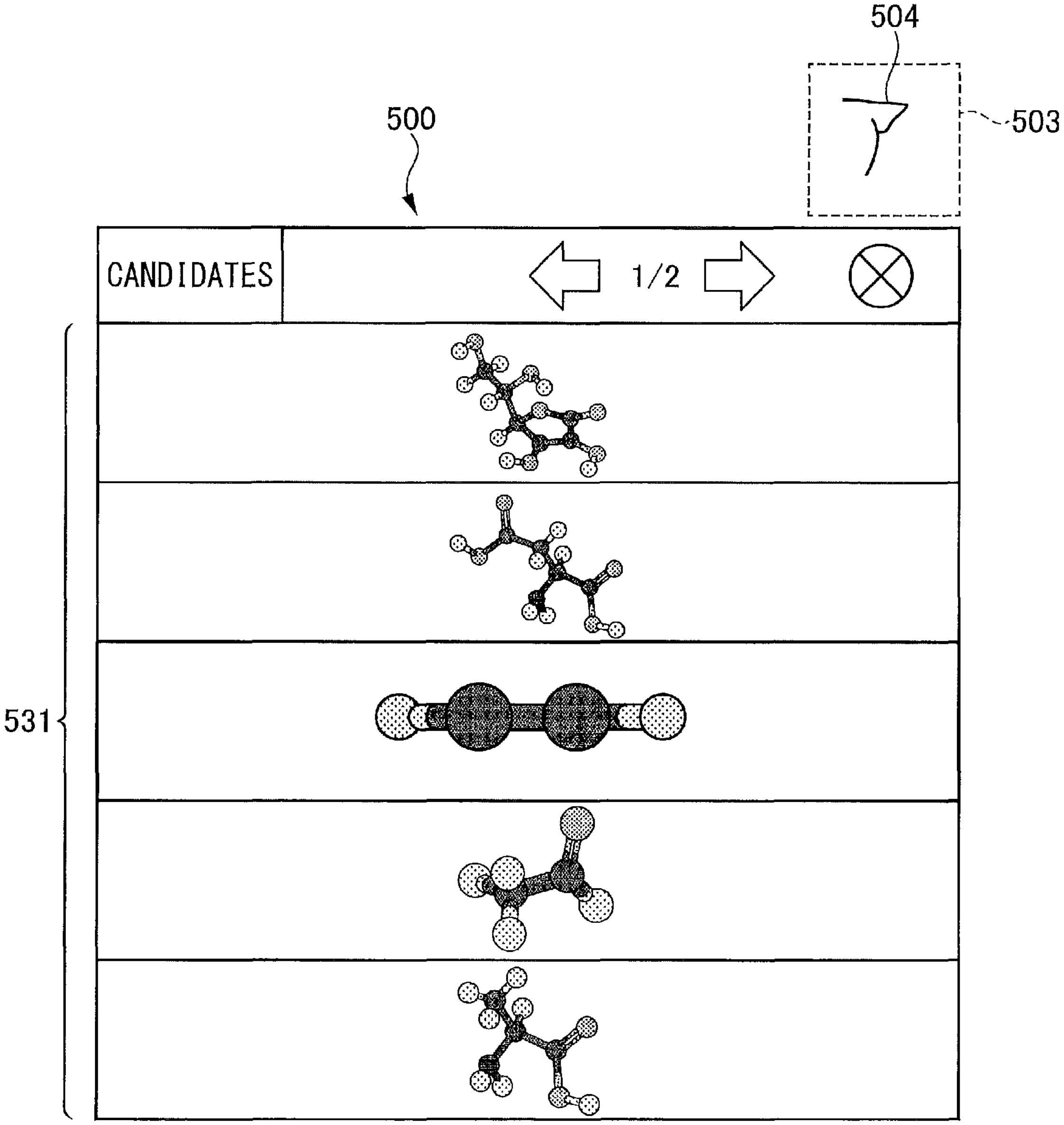
FIG. 19 is a diagram (part 1) illustrating an example of the operation guide in which only image candidates are displayed.
Figure 20:
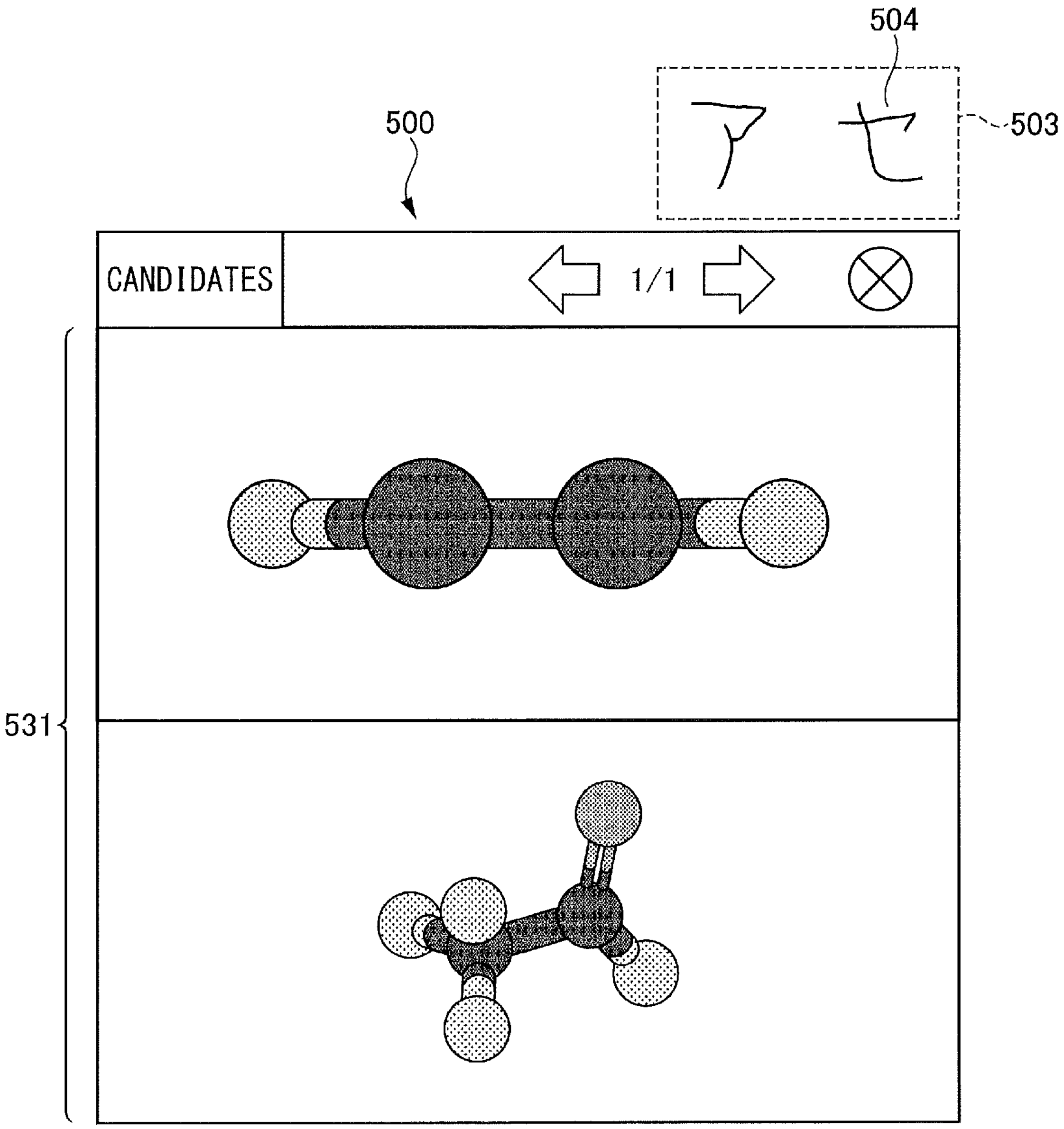
FIG. 20 is a diagram (part 2) illustrating an example of the operation guide in which only the image candidates are displayed.
Figure 21:
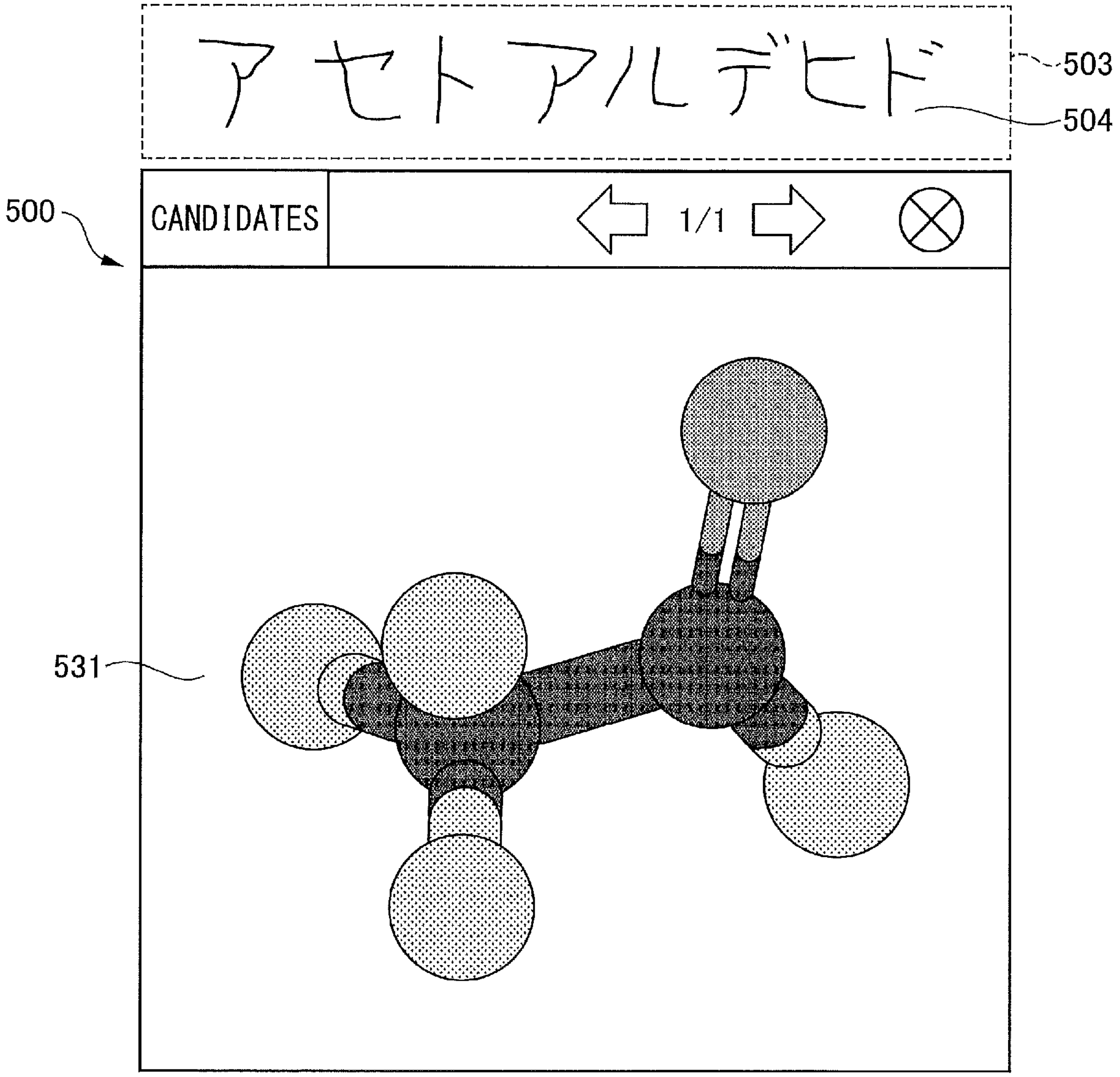
FIG. 21 is a diagram (part 3) illustrating an example of the operation guide in which only the image candidates are displayed.

Next, the operation guide 500 which displays only image candidates will be described, with reference to FIG. 19 through FIG. 21. FIG. 19 through FIG. 21 illustrate transition states in which image candidates 531 are gradually narrowed down according to the user's handwriting. As will be described below, the handwriting recognition control part 26 successively converts the handwritten data from the beginning, to convert the handwritten data into characters. The image transformation control part 42 performs a search in the image transformation dictionary part 43 by the forward match, while increasing the number of converted characters every time the character is converted. The display part 22 displays a number of image candidates, which decreases as the number of characters used for the search increases.

FIG. 19 illustrates a case where the user handwrites one Katakana character "ア" pronounced "ə" as the handwritten object 504. When the Katakana character of the handwritten object 504 is recognized, and the Katakana character "ア" pronounced "ə" is obtained as the handwriting recognition character string, the handwritten input display control part 23 transmits the Katakana character "ア" pronounced "ə" to the image transformation control part 42. The image transformation control part 42 searches the image transformation dictionary part 43 illustrated in FIG. 11, and transmits image candidates corresponding to an index column having a name meeting the criteria for the match with the Katakana character "ア" pronounced "ə" when the forward match is performed, to the handwritten input display control part 23. As a result, in the example illustrated in FIG. 19, five image candidates 531 having names beginning with the Katakana character "ア" pronounced "ə" are displayed in the operation guide 500.

Next, FIG. 20 illustrates the image candidates 531 displayed when the user handwrites the Katakana character "ア" pronounced "ə", and thereafter handwrites another Katakana character "セ" pronounced "se", without selecting the image candidate 531. Accordingly, because the user successively handwrites two Katakana characters "アセ" pronounced "ase", the handwritten input display control part 23 transmits the two Katakana characters "アセ" pronounced "ase" to the image transformation control part 42. The image transformation control part 42 searches the image transformation dictionary part 43 illustrated in FIG. 11, and transmits image candidates corresponding to an index column having a name meeting the criteria for the match with the two Katakana characters "アセ" pronounced "ase" when the forward match is performed, to the handwritten input display control part 23. As a result, in the example illustrated in FIG. 20, two image candidates 531 having names beginning with the two Katakana characters "アセ" pronounced "ase" are displayed in the operation guide 500.

As described above, the image transformation control part searches the image transformation dictionary by performing the forward match, while increasing the number of converted characters every time the character is converted.

Next, FIG. 21 illustrates the image candidate 531 displayed when the user handwrites the character string made up of eight Katakana characters "アセトアルデヒド" (all characters indicating "acetaldehyde" in Japanese) pronounced "asetoarudehido" ("ascorbic acid" in English). The handwritten input display control part 23 transmits the character string made up of eight Katakana characters "アセトアルデヒド" pronounced "asetoarudehido" to the image transformation control part 42. The image transformation control part 42 searches the image transformation dictionary part 43 illustrated in FIG. 11, and transmits image candidate corresponding to an index column having a name meeting the criteria for the match with the character string made up of eight Katakana characters "アセトアルデヒド" pronounced "asetoarudehido" when the forward match is performed, to the handwritten input display control part 23. As a result, in the example illustrated in FIG. 21, one image candidate 531 having the name that is the character string made up of eight Katakana characters "アセトアルデヒド" pronounced "asetoarudehido" is displayed in the operation guide 500.

As illustrated in FIG. 19 through FIG. 21, as the number of image candidates displayed in one operation guide 500 decreases, the image candidates can be displayed on a larger scale, thereby enabling the user to look into the image candidates in more detail before making the selection. For this reason, the image data of the image transformation dictionary part 43 can include a number of pixels capable of providing an excellent image quality in a state where the image data is displayed at a maximum size, and the image data can be displayed on a reduced scale, as appropriate, so that the image quality will not deteriorate when displaying the image data on an enlarged scale.

Figure 22:
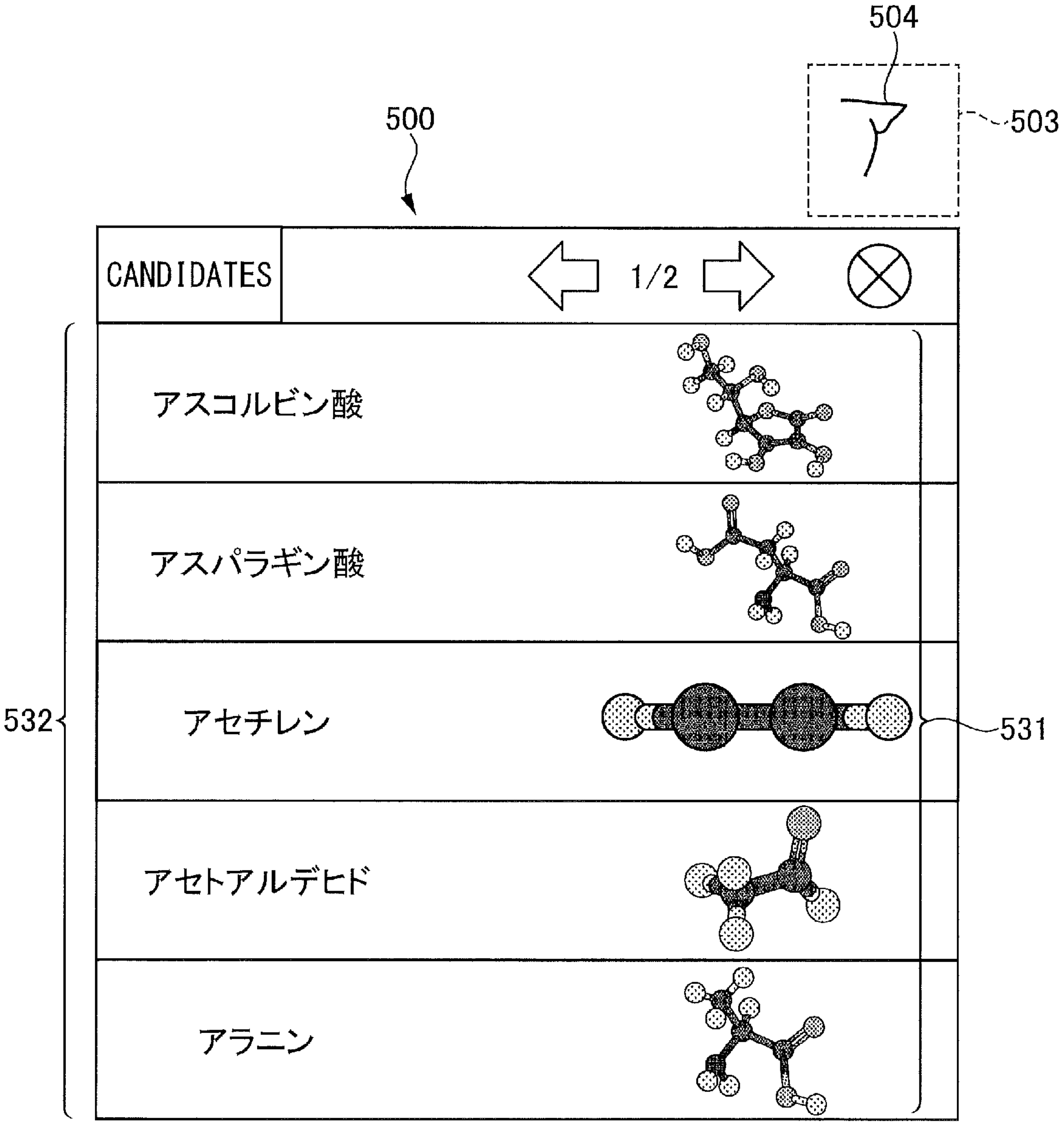
FIG. 22 is a diagram (part 1) illustrating a display example of the operation guide displaying the image candidates and the names of the image candidates.
Figure 23:
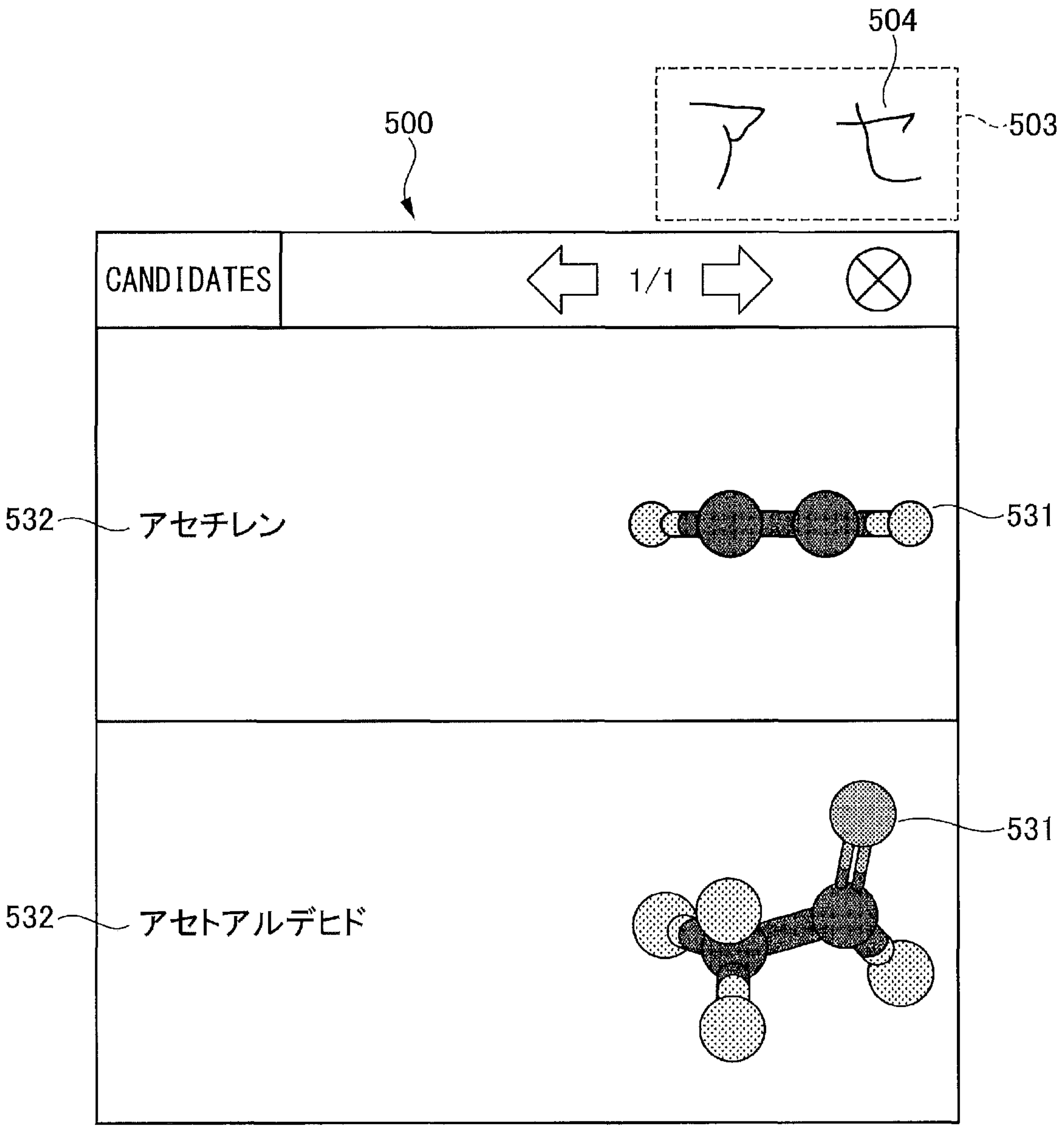
FIG. 23 is a diagram (part 2) illustrating a display example of the operation guide displaying the image candidates and the names of the image candidates.
Figure 24:
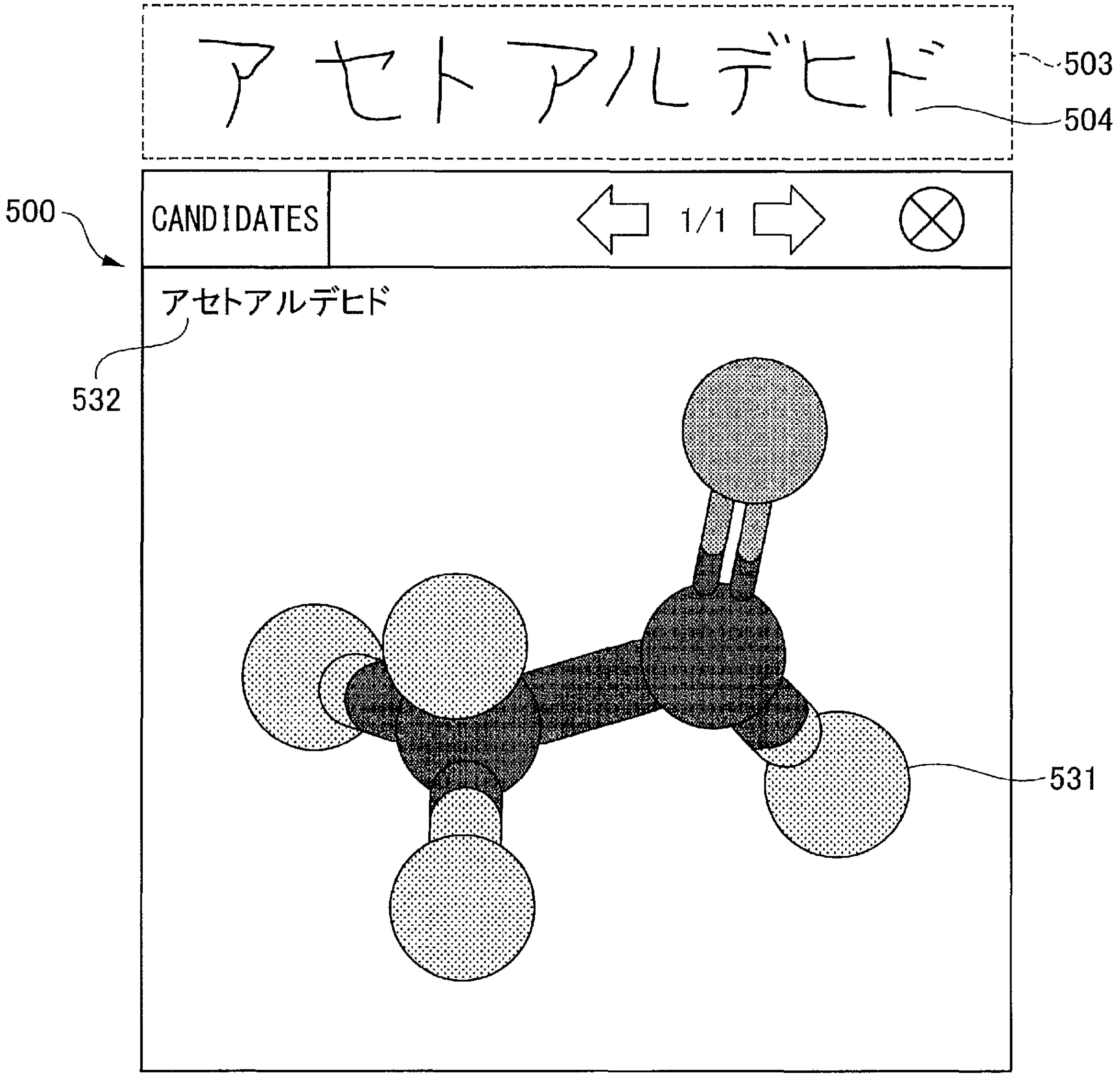
FIG. 24 is a diagram (part 3) illustrating a display example of the operation guide displaying the image candidates and the names of the image candidates.

FIG. 22 through FIG. 24 illustrate display examples of the operation guide 500 displaying the image candidate 531 and an image candidate name 532. FIG. 22 corresponds to FIG. 19, FIG. 23 corresponds to FIG. 20, and FIG. 24 corresponds to FIG. 21. The display method illustrated in FIG. 22 through FIG. 24 may be the same as that illustrated in FIG. 19 through FIG. 21. In the examples illustrated in FIG. 22 through FIG. 24, the image transformation control part 42 also receives the name of the index column together with the image, from the image transformation dictionary part 43, and transmits the same to the handwritten input display control part 23. Hence, the operation guide 500 can display the name of the image candidate.

Whether to display only the image candidates 531 as in FIG. 19 through FIG. 21, or to display the image candidates 531 and the image candidate names 532 as in FIG. 22 through FIG. 24, can be set by the user from an operation header 520, or from a menu that is displayed by a long press of the operation guide 500 or the like.

<Example of Specifying Selected Object>

The display device 2 according to this embodiment can specify the selected object when the user selects a decided object by handwriting. The selected object (or decided object) may be subject to editing or decorating.

FIG. 25A through FIG. 25D are diagrams illustrating an example of specifying the selected object. In FIG. 25A through FIG. 25D, a handwritten object 11 is displayed by a black solid line, a handwritten object rectangular region 12 is displayed by a gray halftone dot pattern, a decided object 13 is displayed by a black line, and a selected object rectangular region 14 is displayed by a dotted line. These objects and regions can be distinguished from one another by a lowercase letter appended to the reference numeral designated thereto. Further, the striding line determination condition 406 or the enclosure line determination condition 407 of the defined control data illustrated in FIG. 7 can be used as a determination condition (whether or not a predetermined relationship is satisfied) for determining a decided object as the selected object.

Figure 25A:
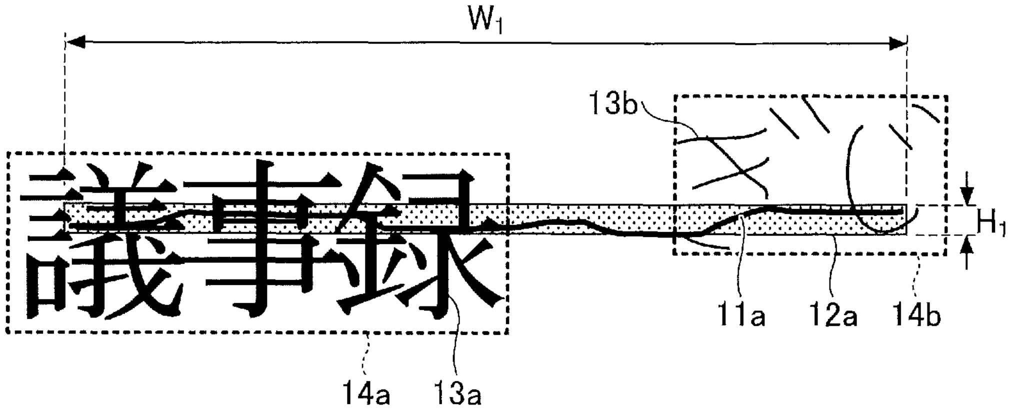
FIG. 25A, FIG. 25B, FIG. 25C, and FIG. 25D are diagrams for explaining an example of specifying the selected object.

FIG. 25A illustrates an example in which two decided objects 13*a* and 13*b* written horizontally are specified by the user using the striding line (handwritten object 11*a*). In this example, a length H1 of the shorter side and a length W1 of the longer side of a handwritten object rectangular region 12*a* satisfy the conditions of the striding line determination condition 406, and the overlap ratio of the handwritten object rectangular region 12*a* with respect to the decided objects 13*a* and 13*b*, respectively, satisfies the conditions of the striding line determination condition 406. For this reason, both the decided objects 13*a* and 13*b* that are the character string made up of three Kanji characters "議事録" pronounced "gijiroku" and the character string made up of two Hiragana characters "ぎじ" pronounced "giji", respectively, are specified as the selected objects.

Figure 25B:
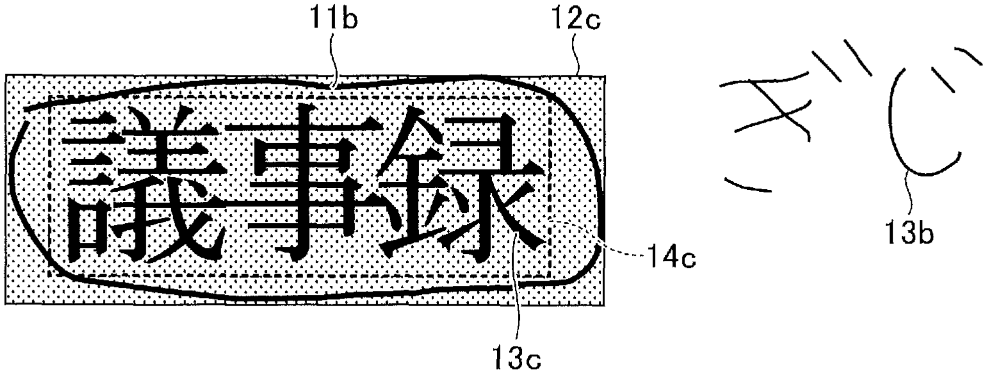

FIG. 25B illustrates an example in which a decided object 13*c* written horizontally is specified by the user using the enclosure line (handwritten object 11*b*). In this example, only the decided object 13*c* that is the character string made up of three Kanji characters "議事録" pronounced "gijiroku", is specified as the selected object, because the overlap ratio of the handwritten object rectangular region 12*c* with respect to the decided object 13*c* satisfies the conditions of the enclosure line determination condition 407.

Figure 25C:
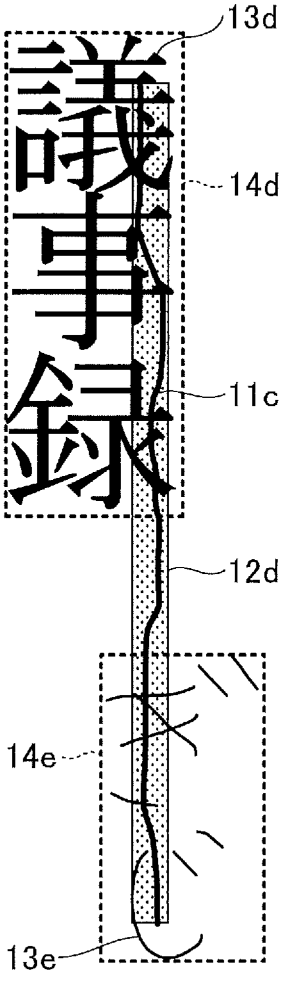

FIG. 25C illustrates an example in which a plurality of decided objects 13*d* and 13*e* written vertically are specified by the user using the striding line (handwritten object 11*c*). In this example, similar to FIG. 25A, the length H1 of the shorter side and the length W1 of the longer side of a handwritten object rectangular region 12*d* satisfy the conditions of the striding line determination condition 406, and the overlap ratio of the handwritten object rectangular region 12*c* with respect to the decided object 13*d* that is the character string made up of three Kanji characters "議事録" pronounced "gijiroku", and the decided object 13*e* that is the character string made up of two Hiragana characters "ぎじ" pronounced "giji", respectively, satisfies the conditions of the striding line determination condition 406. For this reason, the decided objects 13*d* and 13*e* of both the character string made up of three Kanji characters "議事録" pronounced "gijiroku" and the character string made up of two Hiragana characters "ぎじ" pronounced "giji", are specified as the selected objects.

Figure 25D:
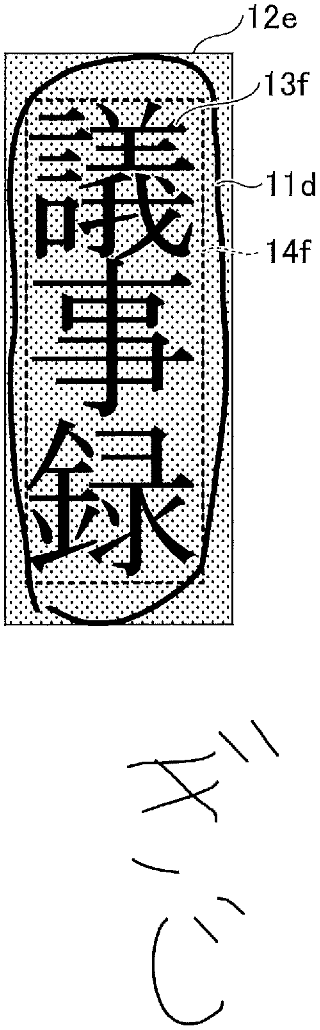

FIG. 25D illustrates an example in which a decided object 13*f* is specified by the user using the enclosure line (handwritten object 11*d*). In this example, similar to FIG. 25B, only the decided object 13*f* that is the character string made up of three Kanji characters "議事録" pronounced "gijiroku" is specified as the selected object.

<Example of Displaying Operation Command Candidate>

Figure 26A:
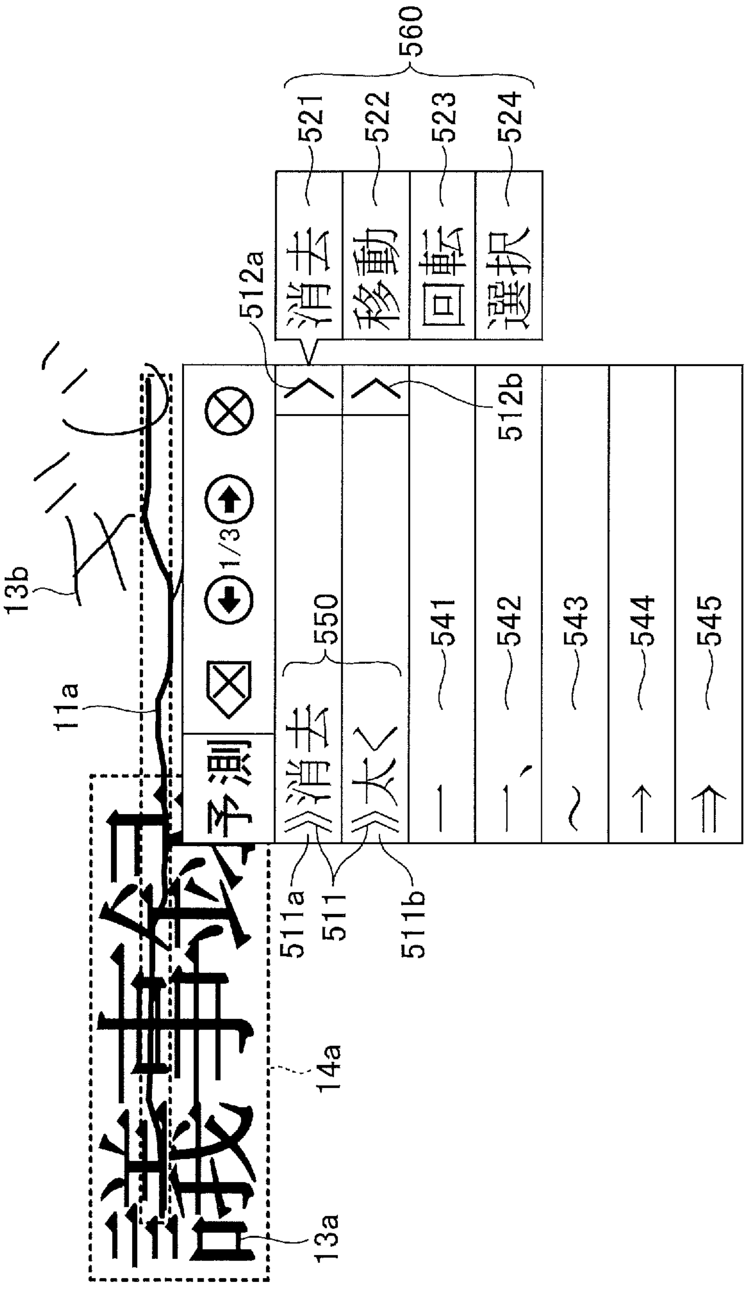
FIG. 26A and FIG. 26B are diagrams illustrating a display example of candidates of operation commands based on the operation command definition data when the handwritten object is present.
Figure 26B:
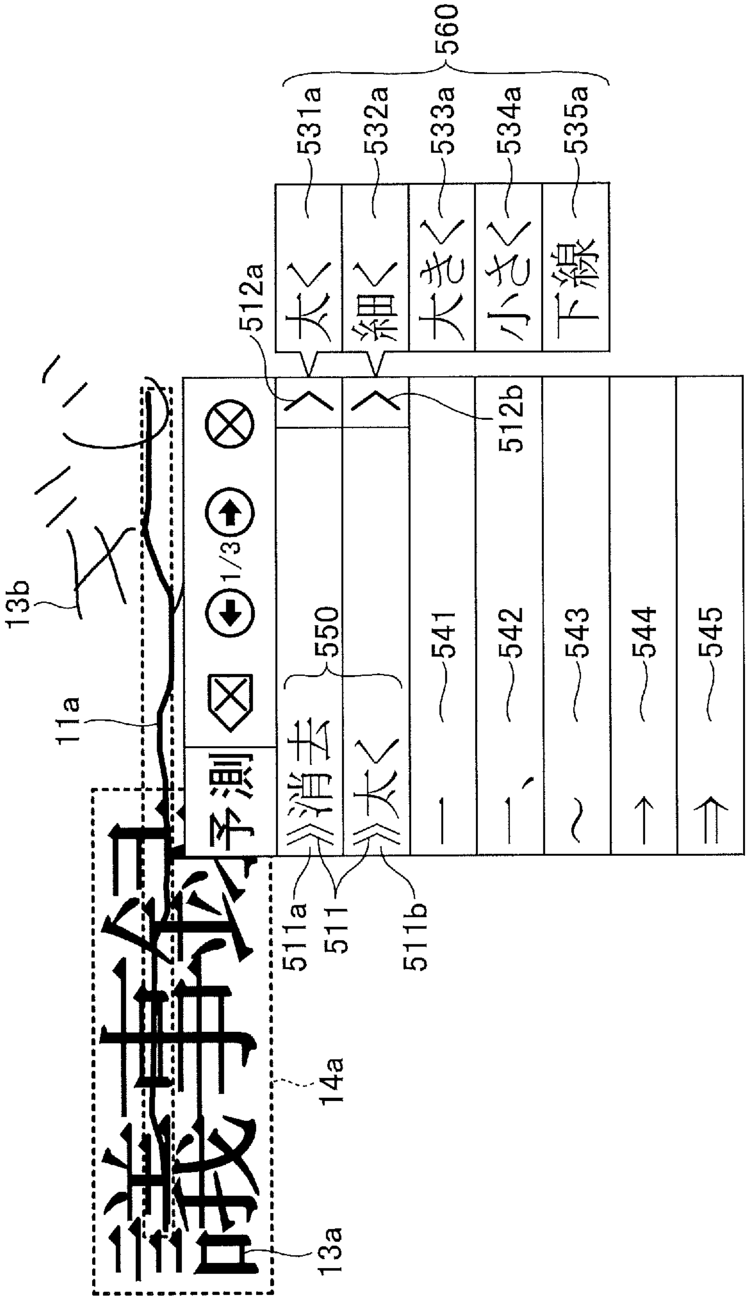

FIG. 26A and FIG. 26B illustrate a display example of the operation command candidate based on the operation command definition data in a case where the handwritten object illustrated in FIG. 13 is present. FIG. 26A illustrates the operation command candidate for the editing system, and FIG. 26B illustrates the operation command candidate for the decorating system. Further, FIG. 26A illustrates the example in which the selected object is specified by the handwritten object 11*a* illustrated in FIG. 25A.

As illustrated in FIG. 26A and FIG. 26B, a main menu 550 displays the operation command candidates after the bullet character ">>" 511. The main menu 550 displays the last executed operation command name, or the first operation command name in the operation command definition data. A bullet character ">>" 511*a* of the first line displays the operation command candidate for the editing system, and a bullet character ">>" 511*b* of the second line displays the operation command candidate for the decorating system.

An end-of-line character ">" (an example of a sub menu button) in the operation command 512 indicates that there is a sub menu. In the first line, an end-of-line character ">" 512*a* causes the (last selected) sub menu to be displayed with respect to the operation command candidates for the editing system. In the second line, an end-of-line character ">" 512*b* causes remaining sub menus to be displayed with respect to the operation command candidates for the decorating system. When the user presses the end-of-line character ">" in the operation command 512, a sub menu 560 is displayed on the right side thereof. The sub menu 560 displays all operation commands defined in the operation command definition data. In the display example illustrated in FIG. 26A, the sub menu 560 corresponding to the end-of-line character ">" 512*a* of the first line is also displayed from the time when the main menu 550 is displayed. The sub menu 560 may be displayed when the user presses the end-of-line character ">" 512*a* of the first line.

When the user presses one of the operation command names by using the pen, the handwritten input display control part 23 executes the "Command" of the operation command definition data corresponding to the operation command name, with respect to the selected object. In other words, "Delete" is executed when a "Delete" button 521 is selected, "Move" is executed when a "Move" button 522 is selected, "Rotate" is executed when a "Rotate" button 523 is selected, and "Select" is executed when a "Select" button 524 is selected.

For example, if the user presses the "Delete" button 521 with the pen, the character string made up of three Kanji characters "議事録" pronounced "gijiroku" and the character string made up of the two Hiragana characters "ぎじ" pronounced "giji" can be deleted. Pressing the "Move" button 522, the "Rotate" button 523, and the "Select" button 524 causes a bounding box (circumscribed rectangle of the selected object). The "Move" button 522 and the "Rotate" button 523 allows the user to move or rotate the characters by a drag operation of the pen. Pressing the "Select" button 524 allows the user to perform other bounding box operations.

Character string candidates other than the operation command candidates, such as "-" 541, "-" 542, "~" 543, "→" 544, and "⇒" 545, are the recognition results of the striding line (handwritten object 11*a*). Hence, if the user intends to input the character string and not the operation command, the character string candidate can be selected.

In FIG. 26B, when the user presses the end-of-line character ">" 512*b* of the second line, the sub menu 560 is displayed on the right side thereof. Similar to FIG. 26A, FIG. 26B illustrates the example in which both the main menu 550 and the sub menu 560 are displayed. When "Thick" 531*a* is selected based on the operation command definition data illustrated in FIG. 13, the handwritten input display control part 23 executes "Thick" on the selected object to make the selected object thick. When "Thin" 532*a* is selected, the handwritten input display control part 23 executes "Thin" with respect to the selected object to make the selected object thin. When "Large" 533*a* is selected, the handwritten input display control part 23 executes "Large" with respect to the selected object to make the selected object large. When "Small" 534*a* is selected, the handwritten input display control part 23 executes "Small" with respect to the selected object to make the selected object small. When "Underline" 535*a* is selected, the handwritten input display control part 23 executes "Underline" with respect to the selected object to underline the selected object.

Fixed or default values may be defined separately with respect to the extent to which the selected object is to be thickened when "Thick" 531*a* is selected, the extent to which the selected object is to be thinned when "Thin" 532*a* is selected, the extent to which the selected object is to be enlarged when "Large" 533*a* is selected, the extent to which the selected object is to be reduced when "Small" 534*a* is selected, and the line type to be used when "Underline" 535*a* is selected, or the like. Alternatively, when the sub menu illustrated in FIG. 26B is selected, a separate selection menu can be opened to allow the user to make adjustments to the selected object.

When the user presses "Thick" 531*a* with the pen, the handwritten input display control part 23 thickens the lines forming the decided objects 13*a* and 13*b* that are the character string made up of three Kanji characters "議事録" pronounced "gijiroku" and the character string made up of two Hiragana characters "ぎじ" pronounced "giji", respectively. When the user presses "Thin" 532*a* with the pen, the handwritten input display control part 23 thins the lines forming the decided objects 13*a* and 13*b* that are the character string made up of three Kanji characters "議事録" pronounced "gijiroku" and the character string made up of two Hiragana characters "ぎじ" pronounced "giji", respectively. When the user presses large 533*a* with the pen, the handwritten input display control part 23 can enlarge the decided objects 13*a* and 13*b*, respectively. When the user presses "Small" 534*a* with the pen, the handwritten input display control part 23 can reduce the decided objects 13*a* and 13*b*, respectively. When the user presses "Underline" 535*a* with the pen, the handwritten input display control part 23 can add the underline to the decided objects 13*a* and 13*b*, respectively.

Figure 27A:
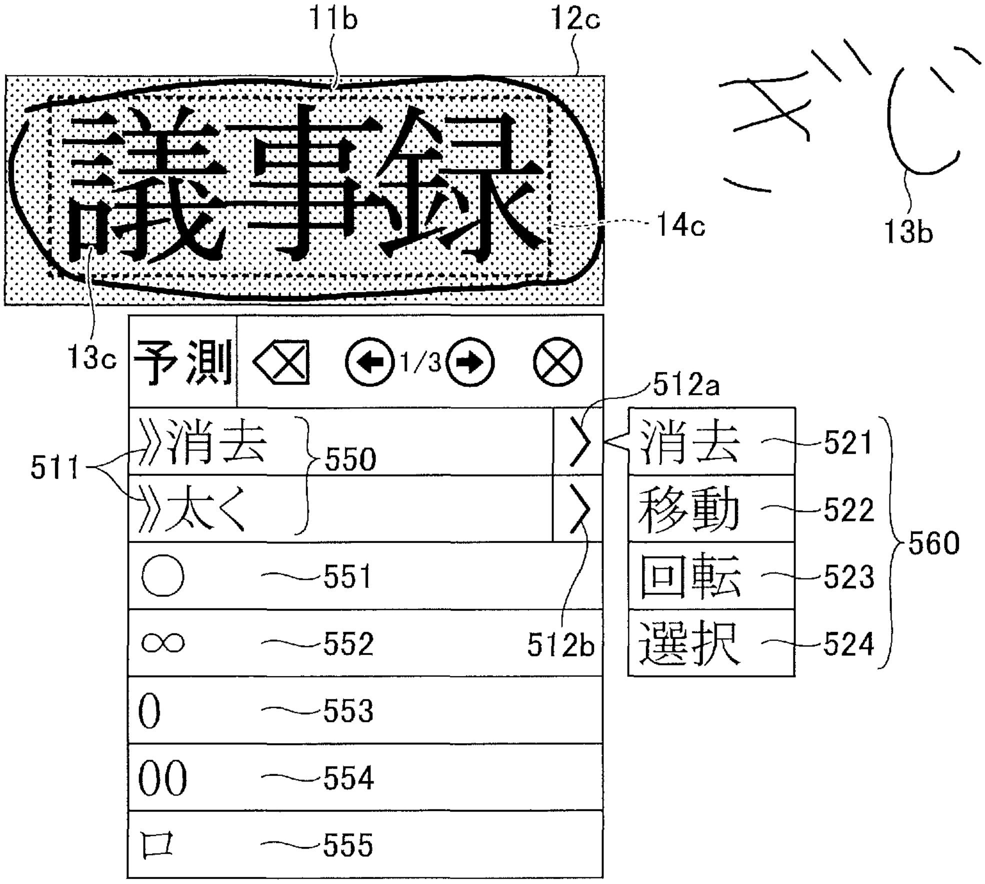
FIG. 27A and FIG. 27B are diagram illustrating a display example of the candidates of the operation commands based on the operation command definition data when the handwritten object is present.
Figure 27B:
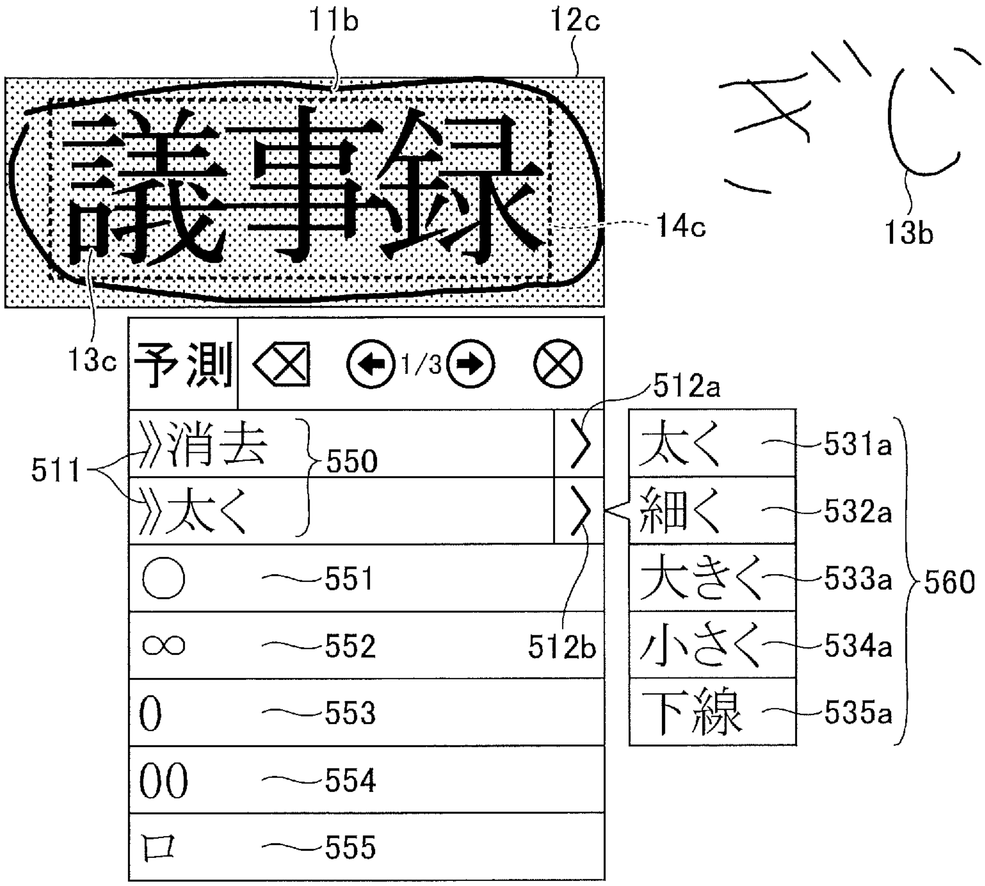

FIG. 27A and FIG. 27B illustrate a display example of the operation command candidate based on the operation command definition data when the handwritten object illustrated in FIG. 13 is present. The difference from FIG. 26A and FIG. 26B is that FIG. 27A and FIG. 27B illustrate the example in which the selected object is specified by the handwritten object 11*b* (enclosure line) illustrated in FIG. 25B. As may be seen by comparing FIG. 26A and FIG. 26B with FIG. 27A and FIG. 27B, there is no difference in the operation command candidates that are displayed, regardless of whether the handwritten object is the line or the enclosure line, so to enable the handwritten input display control part 23 to display the operation command candidate on the display part 22 when the selected object is specified. However, the handwritten input display control part 23 may recognize the handwritten object and change the operation command candidates according to the handwritten object. In this case, a developer or the like associates the operation command definition data such as that illustrated in FIG. 13 with the recognized handwritten objects ("-", "o", or the like), so as to provide correspondence between the recognized handwritten objects and the operation command definition data.

In FIG. 27A and FIG. 27B, character string candidates other than the operation command candidates, namely, "○" 551, "∞" 552, "0" 553, "00" 554, and "ロ" 555, are the recognition results of the enclosure line (handwritten object 11*b*), and the character string candidate can be selected if the user intends to input the character string and not the operation command. "ロ" 555 is a Katakana character pronounced "ro".

<Input Example of Angular Information>

Figure 28A:
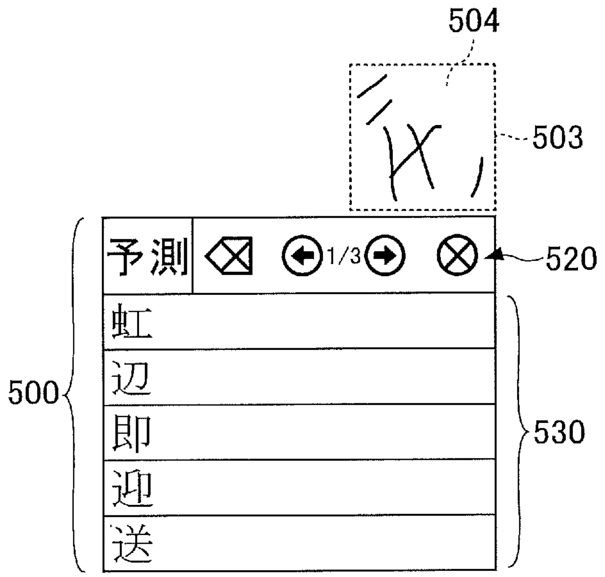
FIG. 28A, FIG. 28B, and FIG. 28C are diagrams for explaining a method of inputting angular information of 90 degrees.
Figure 28B:
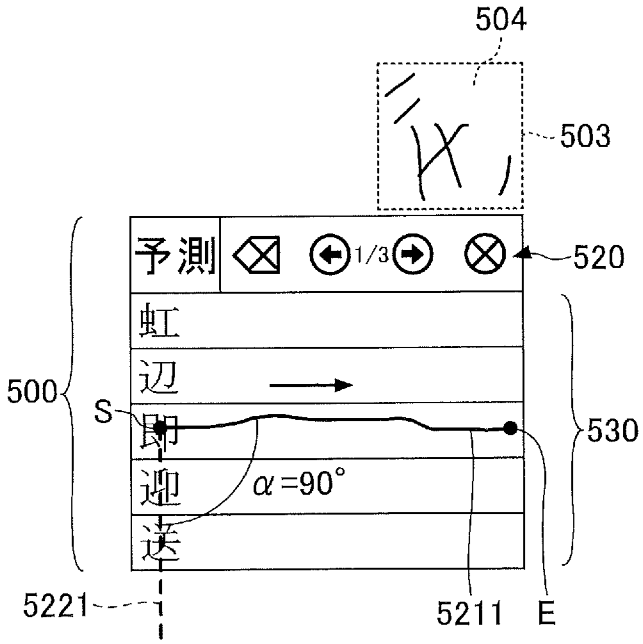
Figure 28C:
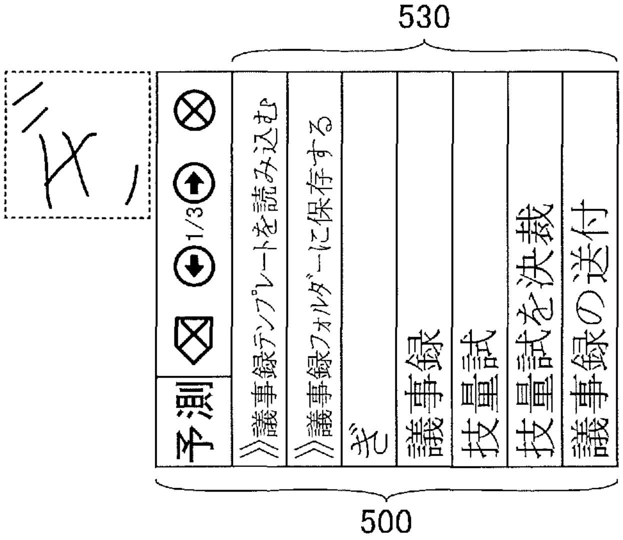

Next, a method of inputting angular information will be described, with reference to FIG. 28A through FIG. 28C. FIG. 28A through FIG. 28C illustrate an example of the input method of angular information. FIG. 28A through FIG. 28C illustrate a case where the user, positioned in the 3 o'clock direction from the display device 2, inputs the angular information. Because handwritten characters or the like written from the 3 o'clock direction can be recognized correctly when rotated 90 degrees clockwise, the angular information indicating 90 degrees may be input.

FIG. 28A illustrates a state in which the angular information of the pen ID control data is 0 degrees (initial value), and the operation guide 500 is displayed because the user, positioned in the 3 o'clock direction from the display device 2, handwrites the Hiragana character "ぎ" pronounced "gi". Because the display device 2 recognizes the Hiragana character "ぎ" pronounced "gi", handwritten from the 3 o'clock direction, with the angular information maintained at 0 degrees, the selectable candidate 530 that is different from the anticipated selectable candidate is displayed.

When inputting the angular information, the user handwrites a straight line inside the operation guide 500, from the top to bottom when viewed from the user. FIG. 28B illustrates an example of a straight line 5211. The angular information is an angle α formed in a counterclockwise direction between the straight line 5211 and a 6 o'clock direction (angular information of 0 degrees). In other words, the angular information is the angle α formed in the counterclockwise direction between the straight line 5211 input by the user and a straight line 5221 (indicated by a dotted line) that is lowered in the 6 o'clock direction from a starting point S of the straight line 5211. Simply put, the angular information is an end point direction of the straight line 5211. Accordingly, the angular information input by the user in FIG. 28B is 90 degrees.

A method of detecting the straight line may convert coordinates from the starting point S to an end point E into a straight line according to the method of least squares, and comparing a correlation coefficient with a threshold value to determine whether or not the straight line is obtained, for example.

Immediately after the user starts writing the straight line 5211 (immediately after the pen 2500 touches the starting point S of the straight line 5211), the display device 2 deletes the operation guide 500. In addition, immediately after the writing of the straight line 5211 is completed (immediately after the pen 2500 is separated from the end point E of the straight line 5211), the display device 2 searches for the value closest to the above described angle α from 45 degrees, 90 degrees, 135 degrees, 180 degrees, 215 degrees, 270 degrees, 315 degrees, and 360 degrees, to determines the closest value as the angular information. The angle α itself may be the angular information. The determined angular information is set to "Angle" of the pen ID control data. The pen event transmitting part 41 of the pen 2500 transmits the pen ID to the display device 2 when the pen tip of the pen 2500 is pressed for the handwriting or the like, and thus, the display device 2 can make the angular information correspond to the pen ID control data.

The user can handwrite the straight line to input the angular information, only from the operation guide 500. Accordingly, when the user handwrites the straight line in regions other than the operation guide 500, the straight line is recognized as a numeric character "1" or a Kanji character "一" pronounced "ichi" ("one" in English) or the like, and the angular information can be input when the straight line is handwritten in the operation guide 500. In other words, the handwriting recognition control part 26 detects the straight line from a predetermined range, and converts the handwritten stroke data outside the predetermined range into the text data.

FIG. 28C illustrates the operation guide 500 immediately after the operation illustrated in FIG. 28B is performed. Because 90 degrees is set as the angular information ("Angle") in the pen ID control data, the handwritten object (stroke data) is internally rotated clockwise by 90 degrees to be subject to the handwriting recognition, and the operation guide 500 is rotated counterclockwise by 90 degrees and displayed.

Figure 29:
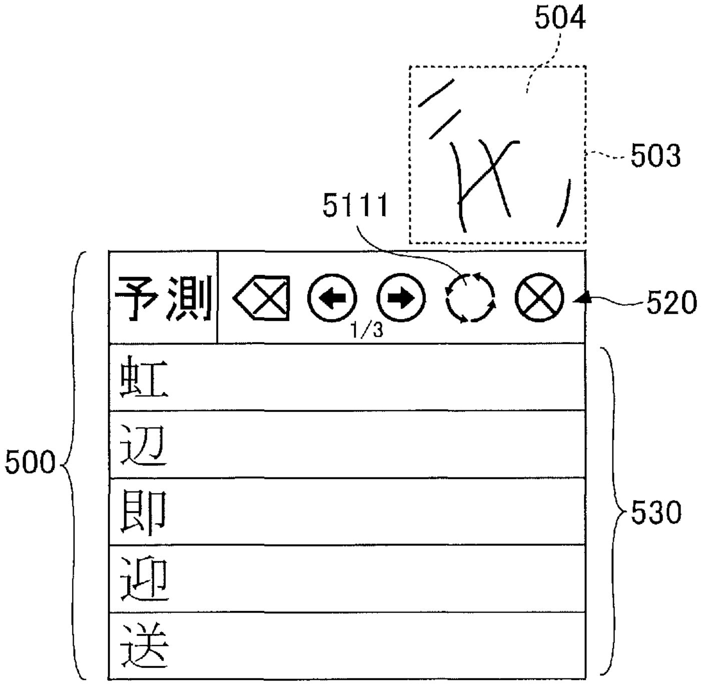
FIG. 29 is a diagram for explaining another method of inputting the angular information.

FIG. 29 is a diagram for explaining another method of inputting the angular information. In FIG. 29, it is assumed for the sake of convenience that the user is positioned in the 3 o'clock direction from the display device 2. In FIG. 29, because the user positioned in the direction of 3 o'clock from the display device 2 handwrites the Hiragana character "ぎ" pronounced "gi" in the state where the angular information is 0 degrees (initial value), the operation guide 500 and the selectable candidate 530 are displayed. The operation guide 500 illustrated in FIG. 29 includes a rotating operation button 5111 in the operation header 520.

The angular information of the pen ID control data is incremented by 90 degrees every time the user presses the rotating operation button 5111 using the pen 2500, to change the angular information to a remainder that is obtained after dividing the incremented angular information by 360 degrees. The angular information may be incremented by 45 degrees every time the rotating operation button 5111 is pressed.

<Registration Example of Handwritten Signature Data>

Figure 30A:
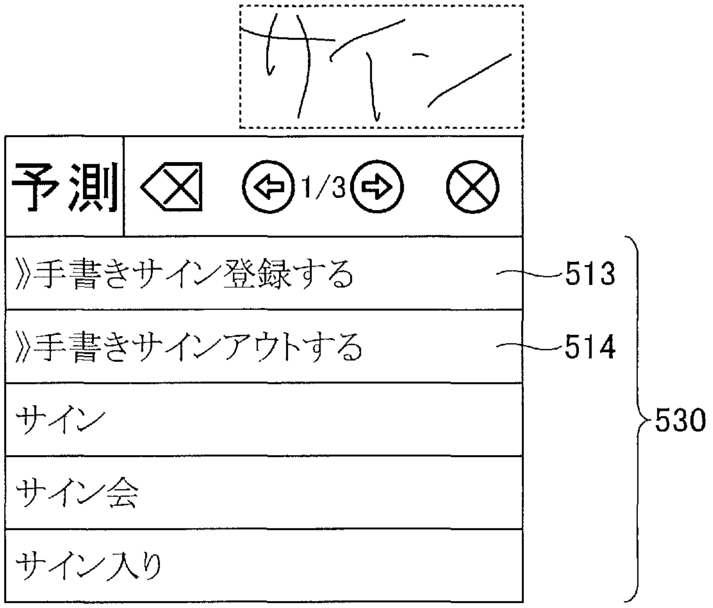
FIG. 30A, FIG. 30B, and FIG. 30C are diagrams for explaining a method of registering the handwritten signature data.
Figure 30B:
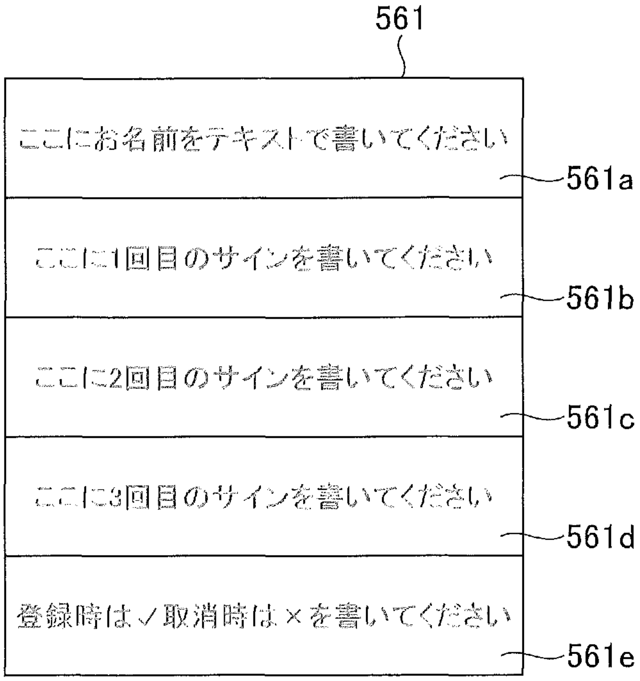
Figure 30C:
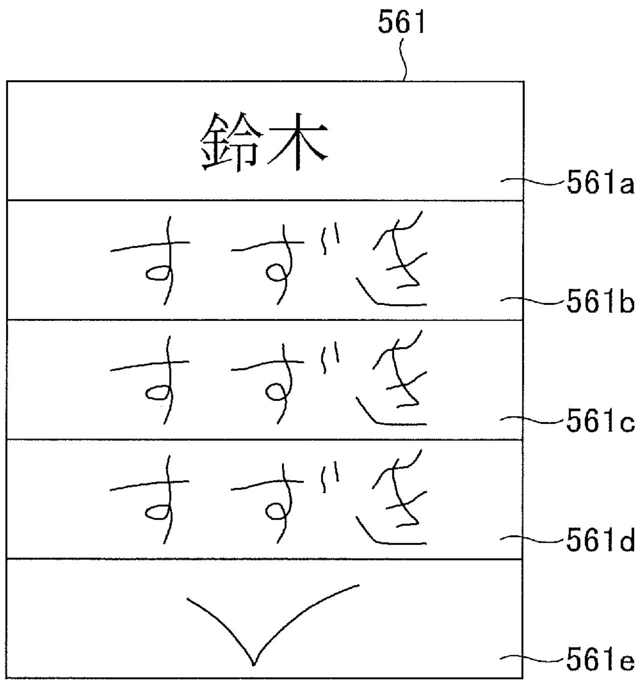

Next, a registration example of the handwritten signature data will be described, with reference to FIG. 30A through FIG. 30C. FIG. 30A through FIG. 30C are diagrams for explaining a method of registering the handwritten signature data. First, FIG. 30A illustrates an example of the selectable candidate 530 that is displayed when the user handwrites a character string made up of three Katakana characters "サイン" pronounced "sain" ("signature" in English). In this example, two operation commands 513 and 514 for a character string "手書きサイン登録する" pronounced "tegaki sain touroku suru" ("register handwritten signature" in English) and a character string "手書きサインアウトする" pronounced "tegaki sain auto suru" ("handwritten sign out" in English), respectively, based on the operation command definition data 713 and 715, and the character candidates made up of the character string "サイン" pronounced "sain" ("signature" in English), the character string "サイン会" pronounced "sain kai" ("autograph session" in English), and the character string "サイン入り" pronounced "sain iri" ("autographed" in English), partially matching the character string made up of the three Katakana characters "サイン" pronounced "sain" ("signature" in English), are displayed. The two operation commands 513 and 514 are displayed because "String" of the operation command definition data 713 and 715 illustrated in FIG. 12A includes the character string made up of the three Katakana characters "サイン" pronounced "sain" ("signature" in English).

When the user presses the operation command 513 for the character string "手書きサイン登録する" pronounced "tegaki sain touroku suru" ("register handwritten signature" in English) by the pen 2500, a handwritten signature registration form 561 illustrated in FIG. 30B is added to the handwritten input storage part 25 and is displayed on the operation screen 101. For example, the operation guide 500 illustrated in FIG. 30A is deleted, and the handwritten signature registration form 561 is displayed in the same position as the operation guide 500. The handwritten signature registration form 561 includes, from the top, a name input field 561*a*, signature input fields 561*b* through 561*d*, and a registration confirmation field 561*e*. The user inputs the text of the name in the name input field 561*a*, a first-time handwritten signature, a second-time handwritten signature, and a third-time handwritten signature in the signature input fields 561*b*, 561*c*, and 561*d*, respectively, and a check mark or a cancellation mark in the registration confirmation field 561*e*. The text of the name is the display name of this user, and is converted into text data. The handwritten signatures are input three times because feature quantities of the handwritten signatures are registered on the precondition that, the handwritten signature is different each time the user handwrites the signature and a perfect match of the handwritten signatures of the same user rarely occurs.

Generally, the handwritten signature is the user's name or the like, or characters or the like related to the user. Besides the user's name, the handwritten signature may be a number such as the employee number, a nickname, a portrait, or the like. In addition, the handwritten signature is not limited to the characters or the like related to the user, and may be some kind of handwritten object. The handwritten signature may be a circle, a triangle, a square, a symbol, or an arbitrary combination thereof. Because feature data of the handwritten signature are not limited to the coordinates thereof, even if two users having the same surname (for example, "Suzuki") register the handwritten signatures for "Suzuki" using the same three Hiragana characters "すずき" it is possible to correctly authenticate the two users.

When the user handwrites on the handwritten signature registration form 561 according to instructions, the handwritten signature registration form 561 as illustrated in FIG. 30C is obtained. When the user handwrites a character string made up of seven Katakana characters "チェックマーク" pronounced "chekku maaku" ("check mark" in English) in the registration confirmation field 561*e*, the handwritten signature data is registered in the handwritten signature data storage part 39, and the handwritten signature registration form 561 is deleted. By this registration, "SignatureId" is numbered, and the similarly numbered "AccountId", and the text indicating the name of the name input field 561*a* are registered in the user definition data in correspondence with "SignatureId". When the user handwrites the user's name or the like and signs in, "SignatureId" corresponding to "AccountId" in the user definition data is acquired, and registered in the pen ID control data in correspondence with the pen ID of the pen 2500 that is used for the handwritten sign in. Thereafter, if the user uses the pen 2500, the pen ID is transmitted to the display device 2. The display device 2 can identify "AccountId" corresponding to the pen ID in the pen ID control data, and can execute the operation command using the user definition data without requiring user intervention.

When the user handwrites "x" in the registration confirmation field 561*e*, the handwritten signature registration is cancelled, and the handwritten signature registration form 561 is deleted. If an error occurs during the registration, the error is displayed in a system reservation area or the like of the operation screen 101.

As described above, the handwritten input display control part 23 can accept the handwritten input without distinguishing between the handwritten input to the form and the handwritten input to other than the form.

<Example of Handwritten Sign In>

Next, a method employed by the user to sign in after registering the handwritten signature data will be described, with reference to FIG. 31. FIG. 31 illustrates an example of the operation guide 500 that is displayed when the user handwrites a character string "すずき" ("Suzuki" in English) which is the handwritten signature data registered by the user. Because the character string "すずき" is registered in the operation command definition part 33 as the handwritten signature data, the character string "すずき" handwritten by the user meets the criteria for the match with the registered handwritten signature data. Accordingly, the operation command 512, which is a character string of eight Kanji, Hiragana, and Katakana characters "手書きサインする" pronounced "tegaki sain suru" ("Affix handwritten signature" in English) is displayed.

In addition, because handwritten signature data meets the criteria for the match with the registered handwritten signature data, "SignatureId" representing the character string "すずき" ("Suzuki" in English) is identified, and the user definition data having "AccountId" corresponding to "SignatureId" is identified.

If the user selects the operation command 512, which is a character string of eight Kanji, Hiragana, and Katakana characters "手書きサインする" pronounced "tegaki sain suru" ("Affix handwritten signature" in English), the user definition data of the character string "すずき" ("Suzuki" in English) is added to the pen ID control data in correspondence with the pen ID of the pen 2500 that is being used by the user, so that the user definition data of the character string "すずき" ("Suzuki" in English) can be used when using the operation command.

Because the registration of the handwritten signature data using the handwritten signature registration form 561 illustrated in FIG. 31 is controlled as part of the handwritten input represented by the characters or the like, the handwritten signature registration form 561 is displayed on the same operation screen as the operation screen on which the characters or the like are handwritten. There is no difference in the handwriting operations inside and outside the handwritten signature registration form 561, and the user can complete the input to the handwritten signature registration form 561 by simply handwriting to regions of the handwritten signature registration form 561 partitioned by ruled lines.

<Example of User Definition Data Changing Operation>

Figures 32A, 32B:
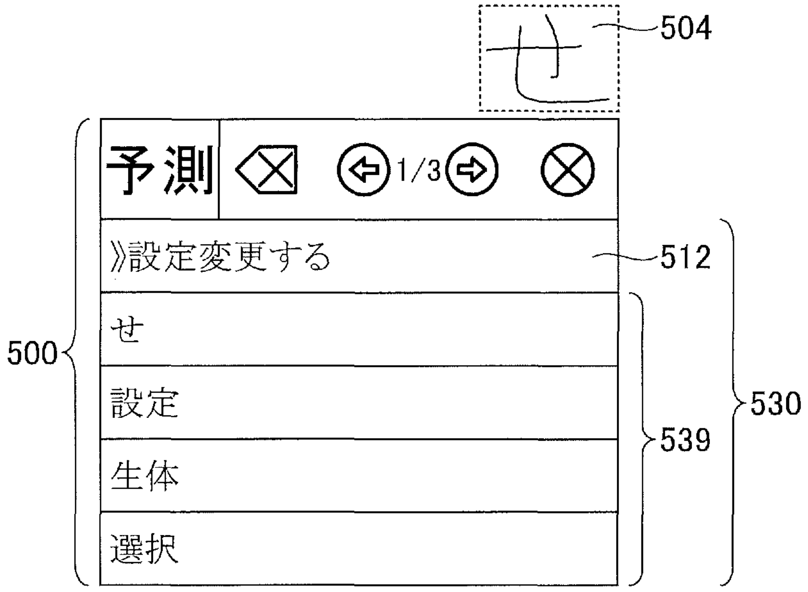
FIG. 32A and FIG. 32B are diagrams for explaining a method of changing the user definition data.

Next, a method of changing the user definition data will be described, with reference to FIG. 32A and FIG. 32B. FIG. 32A and FIG. 32B are diagrams for explaining the method of changing the user definition data. FIG. 32A illustrates an example of the operation guide 500 that is displayed when the user handwrites a Hiragana character "せ" pronounced "se". In the operation command definition data 716 illustrated in FIG. 12A, a character string made up of two Kanji characters "設定" pronounced "settei" ("set" or "setting" in English) is defined in "String", and because the character string "設定" is included in the predicted character strings for the Hiragana character "せ", the operation command 512, which is a character string made up of six Kanji and Hiragana characters "設定変更する" pronounced "settei henkou suru" ("change setting" in English), is displayed.

If the user selects the operation command 512, which is the character string "設定変更する" pronounced "settei henkou suru" ("change setting" in English), with the pen 2500 that is used to handwrite the signature, the "AccountId" of the user is identified from the pen ID control data corresponding to the pen ID of the pen 2500. Hence, the user definition data of the user who signed in is identified. A user definition data change form 562 illustrated in FIG. 32B is added to the handwritten input storage part 25, and is displayed on the operation screen 101. In the example illustrated in FIG. 32B, the user definition data change form 562 is created in according to the user definition data 718 illustrated in FIG. 14. The user definition data change form 562 includes a name field 562*a*, a password field 562*b*, a folder user name field 562*c*, a folder password field 562*d*, a folder file name field 562*e*, and a registration or cancellation field 562*f*.

If the user has not signed in beforehand, an error occurs because the display device 2 cannot identify the "AccountId" of the user, and an error message is displayed in the system reservation area or the like of the operation screen 101.

The user handwrites the password in the password field 562*b* of the user definition data change form 562 illustrated in FIG. 32B. The user handwrites the folder user name in the folder user name field 562*c*. The user handwrites the folder password in the folder password field 562*d*, and handwrites the folder file name in the folder file name field 562*e*. The user handwrites a check mark "√" or "x" in the registration or cancellation field 562*f*. As a result of these inputs to the user definition data change form 562, changes are made to the user definition data, and the user definition data change form 562 is then deleted.

Accordingly, the user can cause the display of the user definition data change form 562 by handwriting the stroke data that calls and makes access to the user definition data change form 562, and the user can arbitrarily change the user definition data by inputting the changes to the user definition data change form 562. The handwritten input display control part 23 receives the handwritten input without distinguishing between the handwritten input to the form and the handwritten input to other than the form.

The "AccountUsername" of the user definition data is automatically displayed in the name field 562*a*. In addition, the user definition data change form 562 can be used for not only for making changes, but also for making registrations.

Because the change of the user definition data using the user definition data change form 562 illustrated in FIG. 32B is controlled as part of the handwritten input typified by characters or the like, the user definition data change form 562 is displayed on the same operation screen as the operation screen on which the characters or the like are handwritten. There is no difference in the handwriting operations inside and outside the user definition data change form 562, and the user can complete the input to the user definition data change form 562 by simply handwriting to regions of the user definition data change form 562 partitioned by ruled lines.

<Operation Procedure>

The operation of the display device will be described using the above described configurations, with reference to FIG. 33 through FIG. 39. FIG. 33 through FIG. 39 are sequence diagrams illustrating an example of a process in which the display device 2 displays the character string candidate and the operation command candidate. The process illustrated in FIG. 33 starts when the display device 2 is started (when the application program is started). In FIG. 33 through FIG. 39, the functions illustrated in FIG. 6A are indicated by the reference numerals for the sake of convenience, due to space limitations.

First, in step S1 illustrated in FIG. 33, the handwritten input display control part 23 transmits the start of the handwritten object to the handwritten input storage part 25, and in response thereto, the handwritten input storage part 25 secures a handwritten object region (a memory region for storing the handwritten object). The handwritten object region may be secured after the user causes the pen 2500 to make contact with the handwritten input part 21.

Next, in step S2, the user causes the pen 2500 to make contact with the handwritten input part 21, and the handwritten input part 21 detects and transmits the pen down to the handwritten input display control part 23.

In step S3, the handwritten input display control part 23 transmits a start of the stroke to the handwritten input storage part 25, and the handwritten input storage part 25 secures a stroke region.

In step S4, when the user moves the pen 2500 while the pen 2500 maintains contact with the handwritten input part 21, the handwritten input part 21 transmits the pen coordinates to the handwritten input display control part 23.

In step S5, the handwritten input display control part 23 specifies the pen ID received from the pen 2500 at the same time as the input of the pen coordinates, and acquires the current pen ID control data stored in the pen ID control data storage part 36. Because the pen ID is transmitted at the time of inputting the pen coordinates, the stroke and the pen ID are made to correspond to each other. The pen ID control data storage part 36 transmits the pen ID control data (color, thickness, pattern, and angular information) to the handwritten input display control part 23. In this state, the angular information still has the initial value which is zero.

In step S6, the handwritten input display control part 23 transmits pen coordinate complement display data (data interpolating discrete pen coordinates) to the display part 22. The display part 22 displays a line by interpolating the pen coordinates using the pen coordinate complement display data.

In step S7, the handwritten input display control part 23 transmits the pen coordinates and a reception time thereof to the handwritten input storage part 25, and the handwritten input storage part 25 adds the pen coordinates to the stroke. While the user is moving the pen 2500, the handwritten input part 21 periodically repeats transmitting the pen coordinates to the handwritten input display control part 23, and thus, the processes of steps S4 through S7 are repeated until the pen up.

Figure 34:
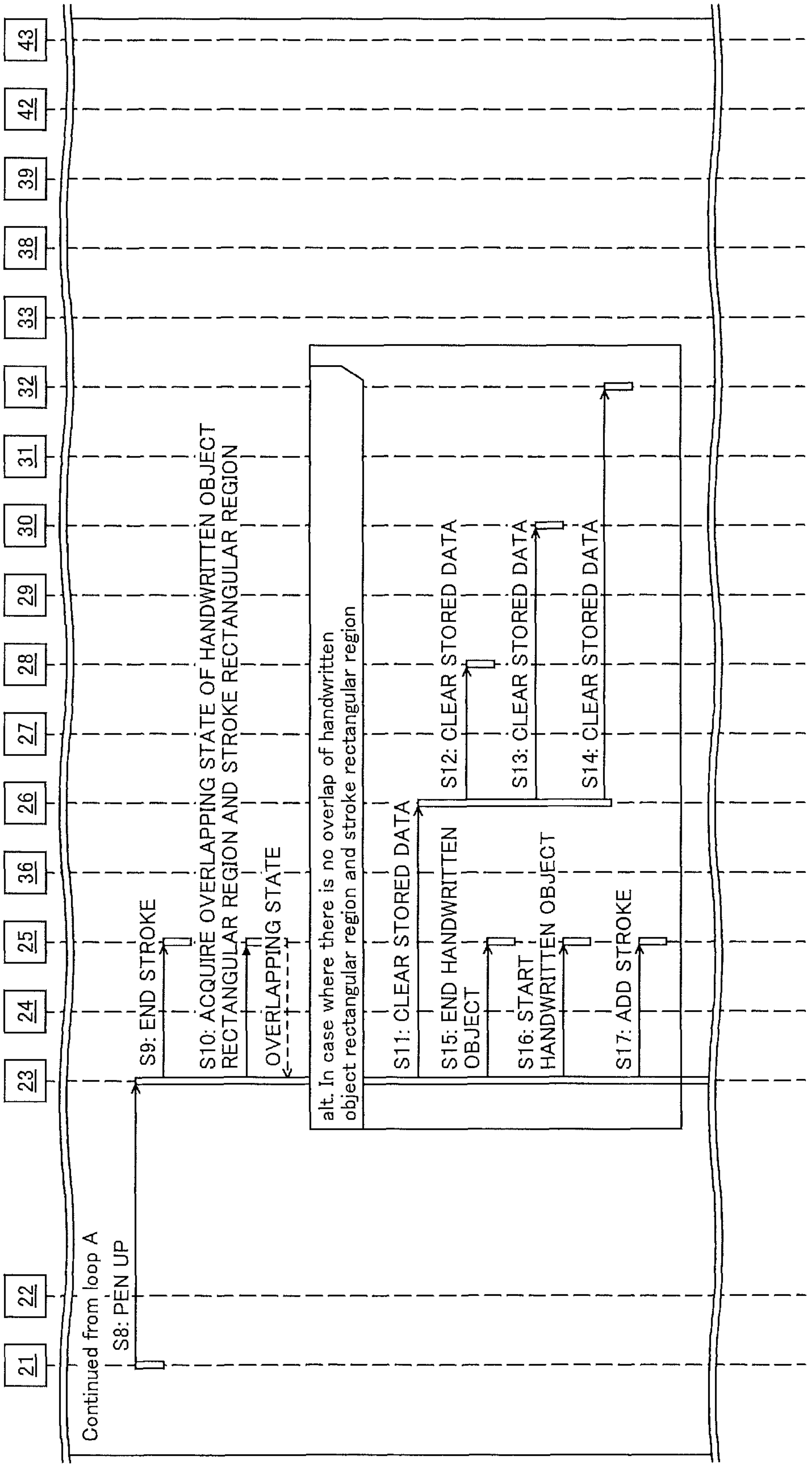
FIG. 34 is a sequence diagram (part 2) for explaining the example of the process in which the display device displays the character string candidates and the operation command candidates.

In step S8 illustrated in FIG. 34, when the user releases the pen 2500 from the handwritten input part 21, the handwritten input part 21 transmits the pen up to the handwritten input display control part 23.

In step S9, the handwritten input display control part 23 transmits an end of the stroke to the handwritten input storage part 25, and the handwritten input storage part 25 determines the pen coordinates of the stroke. The pen coordinates cannot be added to the stroke after the pen coordinates of the stroke are determined.

Next, in step S10, the handwritten input display control part 23 transmits an overlapping state acquisition of the handwritten object rectangular region and the stroke rectangular region to the handwritten input storage part 25, based on the handwritten object rectangular region 403. The handwritten input storage part 25 calculates the overlapping state, and transmits the calculated overlapping state to the handwritten input display control part 23.

Subsequent steps S11 through S17 are performed when the handwritten object rectangular region and the stroke rectangular region do not overlap each other.

In step S11, if the handwritten object rectangular region and the stroke rectangular region do not overlap each other, one handwritten object is determined, and thus, the handwritten input display control part 23 transmits a stored data clear to the handwriting recognition control part 26.

In steps S12 through S14, the handwriting recognition control part 26 transmits the stored data clear to each of the character string conversion control part 28, the predictive conversion control part 30, and the operation command recognition control part 32. In response to the stored data clear, the handwriting recognition control part 26, the character string conversion control part 28, the predictive conversion control part 30, and the operation command recognition control part 32 clear the data related to the character string candidates and the operation command candidates stored up to a point in time immediately before receiving the stored data clear. At the time of clearing the data, the last handwritten stroke is not added to the handwritten object.

In step S15, the handwritten input display control part 23 transmits the end of the handwritten object to the handwritten input storage part 25, and the handwritten input storage part 25 determines the handwritten object. The handwritten object is determined when one handwritten object is completed (no more strokes are added).

In step S16, the handwritten input display control part 23 transmits the start of the handwritten object to the handwritten input storage part 25. In order to prepare for the start of handwriting (pen down) of the next handwritten object, the handwritten input storage part 25 secures a new handwritten object region.

Next, in step S17, the handwritten input display control part 23 transmits a stroke addition with respect to the stroke ended in step S9 to the handwritten input storage part 25. When steps S11 through S17 are performed, the added stroke is the first stroke of the handwritten object, and the handwritten input storage part 25 adds the stroke data to the handwritten object that is being started to be handwritten. If steps S11 through S17 are not performed, the added stroke is already added to the handwritten objects that is being handwritten.

Subsequently, in step S18 illustrated in FIG. 35, the handwritten input display control part 23 transmits the stroke addition to the handwriting recognition control part 26, and the handwriting recognition control part 26 adds stroke data to a stroke data storage region (a region where the stroke data is temporarily stored) where the character string candidates are stored.

In step S19, the handwriting recognition control part 26 performs a gesture handwriting recognition with respect to the stroke data storage region. The gesture handwriting recognition refers to the recognition of the angular information from the straight line. Because the gesture handwriting recognition is performed inside the operation guide 500, the handwriting recognition control part 26 detects the straight line inside the operation guide 500. The position information of the operation guide 500 is transmitted to the handwriting recognition control part 26 in step S67, which will be described later.

In step S20, when the straight line inside the operation guide 500 is detected, the angle α formed in the counterclockwise direction between the straight line 5211 input by the user and the straight line 5221 that is lowered in the 6 o'clock direction from the starting point S of the straight line 5211, is determined in units of 45 degrees. In addition, the handwriting recognition control part 26 stores the determined angular information in the pen ID control data storage part 36 in correspondence with the pen ID of the stroke data of the straight line 5211. Step S20 is performed when the straight line is detected in the operation guide 500.

Next, in step S21, the handwriting recognition control part 26 specifies the pen ID received from the handwritten input part 21, and acquires the angular information of the current pen ID control data from the pen ID control data storage part 36.

In step S22, the handwriting recognition control part 26 rotates the stroke data of the stroke data storage region clockwise according to the acquired angular information.

In step S23, the handwriting recognition control part 26 transmits the stroke data after rotation, namely, the rotated stroke data, to the handwritten signature authentication control part 38. Hence, the stroke data is always transmitted to the handwritten signature authentication control part 38 in a state where it is unclear whether or not the stroke data is the handwritten signature.

In step S24, the handwritten signature authentication control part 38 receives the stroke data, and receives the registered handwritten signature data from the handwritten signature data storage part 39. Further, the handwritten signature authentication control part 38 compares the stroke data with the handwritten signature data to determine a match, and stores the authentication result of the handwritten signature so that the authentication result of the handwritten signature can be acquired in step S61 at a subsequent stage which will be described later.

Next, in step S25, the handwriting recognition control part 26 performs a handwriting recognition on the stroke data, and processes the form when the checkmark "q" or "x" is recognized in the registration or cancellation field of the form, and otherwise performs the conventional handwriting recognition.

In step S26, when the registration or cancellation field of the handwritten signature registration form 561 includes the check mark "q", the handwriting recognition control part 26 transmits the handwritten signature data (stroke data) input by the user with respect to the handwritten signature registration form 561 to the handwritten signature authentication control part 38. The handwritten signature registration form 561 is generated in the handwritten input storage part 25 by the handwritten input display control part 23 in step S86, which will be described later.

In step S27, the handwritten signature authentication control part 38 registers the received handwritten signature data (stroke data) in the handwritten signature data storage part 39, and "SignatureId" is numbered and returned to the handwriting recognition control part 26. If "SignatureId" and the name input in the name input field 561*a* of the handwritten signature registration form 561 are not stored in the user definition data, the handwriting recognition control part 26 newly adds the user definition data. In addition, the handwriting recognition control part 26 assigns numbering to "AccountId", and stores "SignatureId" in the added user definition data. If the name input in the name input field 561*a* is stored in the user definition data, "SignatureId" is stored in the user definition data. This process links "AccountId" and "SignatureId". When the user definition data is newly added, other values are not set, but the user can register and change other values from the user definition data change form 562.

In step S28, upon registration of the handwritten signature data, the handwriting recognition control part 26 deletes the handwritten signature registration form 561 from the handwritten input storage part 25.

In step S29, when the registration or cancellation field of the user definition data change form 562 includes the check mark "q", the handwriting recognition control part 26 transmits the changed value input to the user definition data change form 562 in step S86, which will be described later, to the operation command definition part 33. The handwritten input display control part 23 generates the user definition data change form 562 in the handwritten input storage part 25.

In step S30, upon changing the user definition data, the handwriting recognition control part 26 deletes the user definition data change form 562 from the handwritten input storage part 25.

In step S31, when the registration or cancellation field of the form added in step S86, which will be described later, includes a mark "x", the handwriting recognition control part 26 deletes the form added in step S86 from the handwritten input storage part 25.

Figure 36:
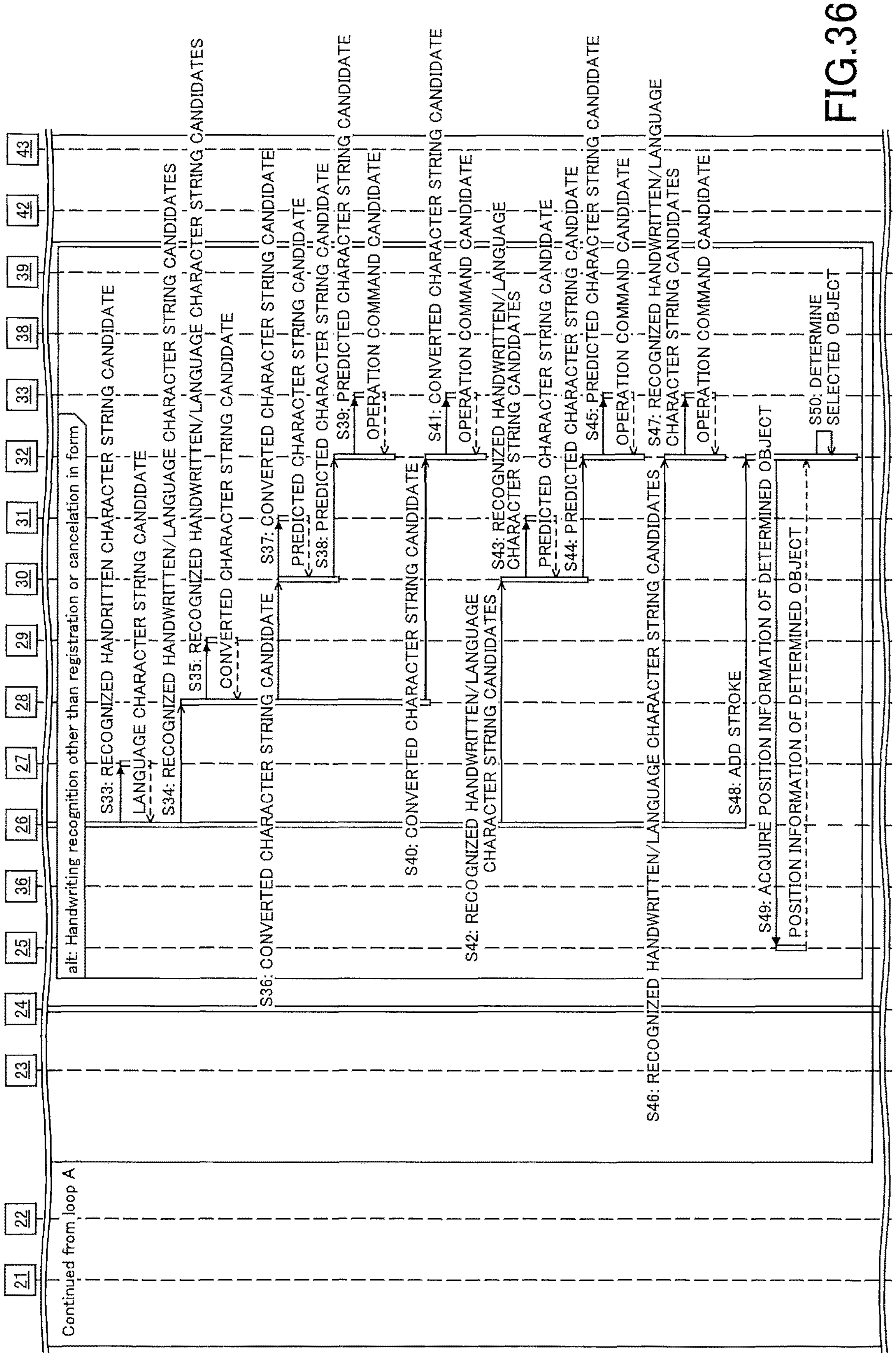
FIG. 36 is a sequence diagram (part 4) for explaining the example of the process in which the display device displays the character string candidates and the operation command candidates.

In step S33 illustrated in FIG. 36, if the form is not processed, the handwriting recognition control part 26 transmits, as the processed result, the recognized handwritten character string candidates to the handwriting recognition dictionary part 27. The handwriting recognition dictionary part 27 transmits the language character string candidates that are linguistically probable to the handwriting recognition control part 26.

In step S34, the handwriting recognition control part 26 transmits the recognized handwritten character string candidates and the received language character string candidates to the character string conversion control part 28.

In step S35, the character string conversion control part 28 transmits the recognized handwritten character string candidates and the language character string candidates to the character string conversion dictionary part 29. The character string conversion dictionary part 29 transmits the converted character string candidates to the character string conversion control part 28.

In step S36, the character string conversion control part 28 transmits the received converted character string candidates to the predictive conversion control part 30.

In step S37, the predictive conversion control part 30 transmits the received converted character string candidates to the predictive conversion dictionary part 31. The predictive conversion dictionary part 31 transmits the predicted character string candidates to the predictive conversion control part 30.

In step S38, the predictive conversion control part 30 transmits the received predicted character string candidates to the operation command recognition control part 32.

In step S39, the operation command recognition control part 32 transmits the received predicted character string candidates to the operation command definition part 33. The operation command definition part 33 transmits the operation command candidates to the operation command recognition control part 32. Accordingly, the operation command recognition control part 32 can acquire the operation command candidate corresponding to the operation command definition data including the character string (String) matching the predicted character string candidate.

Thereafter, the processes up to the transmission of the operation command candidates described in conjunction with steps S40 through S47 are performed similarly.

In step S40, the character string conversion control part 28 transmits the received converted character string candidates to the operation command recognition control part 32.

In step S41, the operation command recognition control part 32 transmits the received converted character string candidates to the operation command definition part 33. The operation command definition part 33 transmits the operation command candidates to the operation command recognition control part 32. Accordingly, the operation command recognition control part 32 can acquire the operation command candidate corresponding to the operation command definition data including the character string (String) matching the converted character string candidate.

In step S42, the handwriting recognition control part 26 transmits the recognized handwritten character string candidates and the language character string candidates to the predictive conversion control part 30.

In step S43, the predictive conversion control part 30 transmits the recognized handwritten character string candidates and the received language character string candidates to the predictive conversion dictionary part 31. The predictive conversion dictionary part 31 transmits the predicted character string candidates to the predictive conversion control part 30.

In step S44, the predictive conversion control part 30 transmits the received predicted character string candidates to the operation command recognition control part 32.

In step S45, the operation command recognition control part 32 transmits the received predicted character string candidates to the operation command definition part 33. The operation command definition part 33 transmits the operation command candidates to the operation command recognition control part 32. Accordingly, the operation command recognition control part 32 can acquire the operation command candidate corresponding to the operation command definition data including the character string (String) matching the predicted character string candidate.

In step S46, the handwriting recognition control part 26 transmits the handwritten identification character string candidates and the received language character string candidates to the operation command recognition control part 32.

In step S47, the operation command recognition control part 32 transmits the recognized handwritten character string candidates and the received language character string candidates to the operation command definition part 33. The operation command definition part 33 transmits the operation command candidates to the operation command recognition control part 32. Accordingly, the operation command recognition control part 32 can acquire the operation command candidate corresponding to the operation command definition data including the character string (String) matching the language character string candidate.

Next, in step S48, the handwriting recognition control part 26 transmits the stroke addition to the operation command recognition control part 32.

In step S49, the operation command recognition control part 32 transmits the position information acquisition of the decided object to the handwritten input storage part 25. The handwritten input storage part 25 transmits the position information of the decided object to the operation command recognition control part 32.

In step S50, the operation command recognition control part 32 determines whether or not the position information of the stroke received from the handwriting recognition control part 26 by the stroke addition in step S48 is in a predetermined relationship with the position information of the decided object received from the handwritten input storage part 25, based on the striding line determination condition 406 and the enclosure line determination condition 407, in order to determine the selected object. The operation command recognition control part 32 stores the decided object that can be determined to be selected, as the selected object. In this case, because the selected object is identified, the operation command candidates of the input and output system are acquired from the operation command definition part 33.

Further, the handwriting recognition control part 26, the character string conversion control part 28, the predictive conversion control part 30, and the operation command recognition control part 32 store the data related to the recognized handwritten character string candidates, the language character string candidates, the converted character string candidates, the predicted character string candidates, the operation command candidates, and the selected object, so that the data can be acquired in steps S55 through S58 at subsequent stages which will be described later, respectively.

In step S18-2, the handwritten input display control part 23 transmits the start of the selectable candidate display timer to the candidate display timer control part 24, immediately after transmitting the stroke addition to the handwriting recognition control part 26 in step S18. The candidate display timer control part 24 starts the selectable candidate display timer in response to receiving the start of the selectable candidate display timer.

Subsequent steps S51 through S53 are performed if the pen down occurs before a predetermined time elapses (before the time out of the timer occurs).

In step S51 illustrated in FIG. 37, if the user causes the pen 2500 to contact the handwritten input part 21 before the time out of the timer occurs, the handwritten input part 21 transmits the pen down (the same event as in step S2) to the handwritten input display control part 23.

In step S52, the handwritten input display control part 23 transmits the start of the stroke (the same as in step S3) to the handwritten input storage part 25. The sequence after step S52 is the same as the sequence after step S3.

In step S53, the handwritten input display control part 23 transmits the selectable candidate display timer stop request to the candidate display timer control part 24. The candidate display timer control part 24 stops the selectable candidate display timer in response to the stop request, because the pen down is detected, thereby eliminating the need for timer.

Steps S54 through S89 are performed if no pen down occurs before a predetermined time elapses (before the timer times out). Accordingly, the operation guide 500 illustrated in FIG. 18 is displayed.

In step S54, the candidate display timer control part 24 transmits the time out to the handwritten input display control part 23 if the user does not cause the pen 2500 to contact the handwritten input part 21 after the selectable candidate display timer is started.

In step S55, the handwritten input display control part 23 transmits the acquisition request of the handwriting recognition character string/language character string candidates to the handwriting recognition control part 26. In response to this acquisition request, the handwriting recognition control part 26 transmits the handwriting recognition character string/language character string candidates currently stored to the handwritten input display control part 23.

In step S56, the handwritten input display control part 23 transmits the acquisition request for the converted character string candidates to the character string conversion control part 28. In response to this acquisition request, the character string conversion control part 28 transmits the currently stored converted character string candidates to the handwritten input display control part 23.

In step S57, the handwritten input display control part 23 transmits the acquisition request for the predicted character candidates to the predictive conversion control part 30. In response to this acquisition request, the predictive conversion control part 30 transmits the predicted character string candidates currently stored to the handwritten input display control part 23.

In step S58, the handwritten input display control part 23 transmits the acquisition request for the operation command candidates to the operation command recognition control part 32. In response to this acquisition request, the operation command recognition control part 32 transmits the currently stored operation command candidates and selected objects to the handwritten input display control part 23.

Next, in step S58-2, the handwritten input display control part 23 specifies the recognized handwritten character string candidates and the language character string candidates acquired from the handwriting recognition control part 26, the converted character string candidates acquired from the character string conversion control part 28, and the predicted character string candidates acquired from the predictive conversion control part 30, and transmits the image acquisition request to the image transformation control part 42.

In step S58-3, the image transformation control part 42 performs the search in the image transformation dictionary part 43 using the handwriting recognition character string candidates, the language character string candidates, the converted character string candidates, and the predicted character string candidates. Accordingly, the image transformation control part 42 receives the image candidates, and transmits the received image candidates to the handwritten input display control part 23. The handwritten input display control part 23 may receive the names in addition to the image candidates.

Further, in step S59, the handwritten input display control part 23 transmits the acquisition request for the estimated writing direction to the handwritten input storage part 25. In response to this acquisition request, the handwritten input storage part 25 determines the estimated writing direction from a stroke addition time, the horizontal distance, and the vertical distance of the handwritten object rectangular region, and transmits the estimated writing direction to the handwritten input display control part 23.

Next, in step S60, the handwritten input display control part 23 specifies the pen ID received from the handwritten input part 21, and acquires the angular information of the current pen ID control data from the pen ID control data storage part 36.

In step S61, the handwritten input display control part 23 acquires the authentication result of the handwritten signature from the handwritten signature authentication control part 38, to enable "SignatureId" of the user to be obtained. Hence, "AccountId" is registered in correspondence with the pen ID when executing the operation command, as will be described later.

In step S62, the handwritten input display control part 23 creates the selectable candidate display data, such as those illustrated in FIG. 18, from the recognized handwritten character string candidates ("ぎ" in FIG. 18), the language character string candidates (not displayed in FIG. 18, but may be "議", for example), the converted character string candidates ("議事録" and "技量試" in FIG. 18), the predicted character string candidates ("技量試を決裁" and "議事録の送付先" in FIG. 18), the operation command candidates ("議事録テンプレートを読み込む" and "議事録フォルダーに保存する" in FIG. 18), each of the probabilities of selection, and the estimated writing direction.

Moreover, the handwritten input display control part 23 creates the selectable candidate display data including the image candidates illustrated in FIG. 19 through FIG. 24. The image candidates and/or the character string candidates of the selectable candidate display data to be displayed depends on the user's settings, and for this reason, if the user's settings selects the display of the image candidates, the selectable candidate display data including only the character string candidates do not need to be created.

Further, the handwritten input display control part 23 rotates the selectable candidate display data (the operation guide 500) counterclockwise based on the angular information acquired in step S60, and displays the rotated selectable candidate display data (the operation guide 500) after rotation to the display part 22.

In step S63, the handwritten input display control part 23 rotates the rectangular area display data (rectangular frame) of the handwritten object and the selected object (handwritten object rectangular area display 503 in FIG. 18) counterclockwise according to the angular information acquired in step S60, and transmits the rotated rectangular area display data to the display part 22 to be displayed thereby.

In step S64, the handwritten input display control part 23 transmits the start of the selectable candidate display deletion timer to the candidate display timer control part 24 in order to delete the selected candidate display data after a predetermined time elapses from the time when the selectable candidate display data are displayed. The candidate display timer control part 24 starts the selectable candidate display deletion timer in response to receiving the start of the selectable candidate display deletion timer.

Steps S65 through S70 are performed when the user deletes the selectable candidate display displayed on the display part 22, or when the change of the handwritten object occurs (that is, the stroke of the handwritten object is added, deleted, moved, deformed, or segmented), or when the candidate is not selected before the time out, after the selectable candidate delete timer is started.

Figure 38:
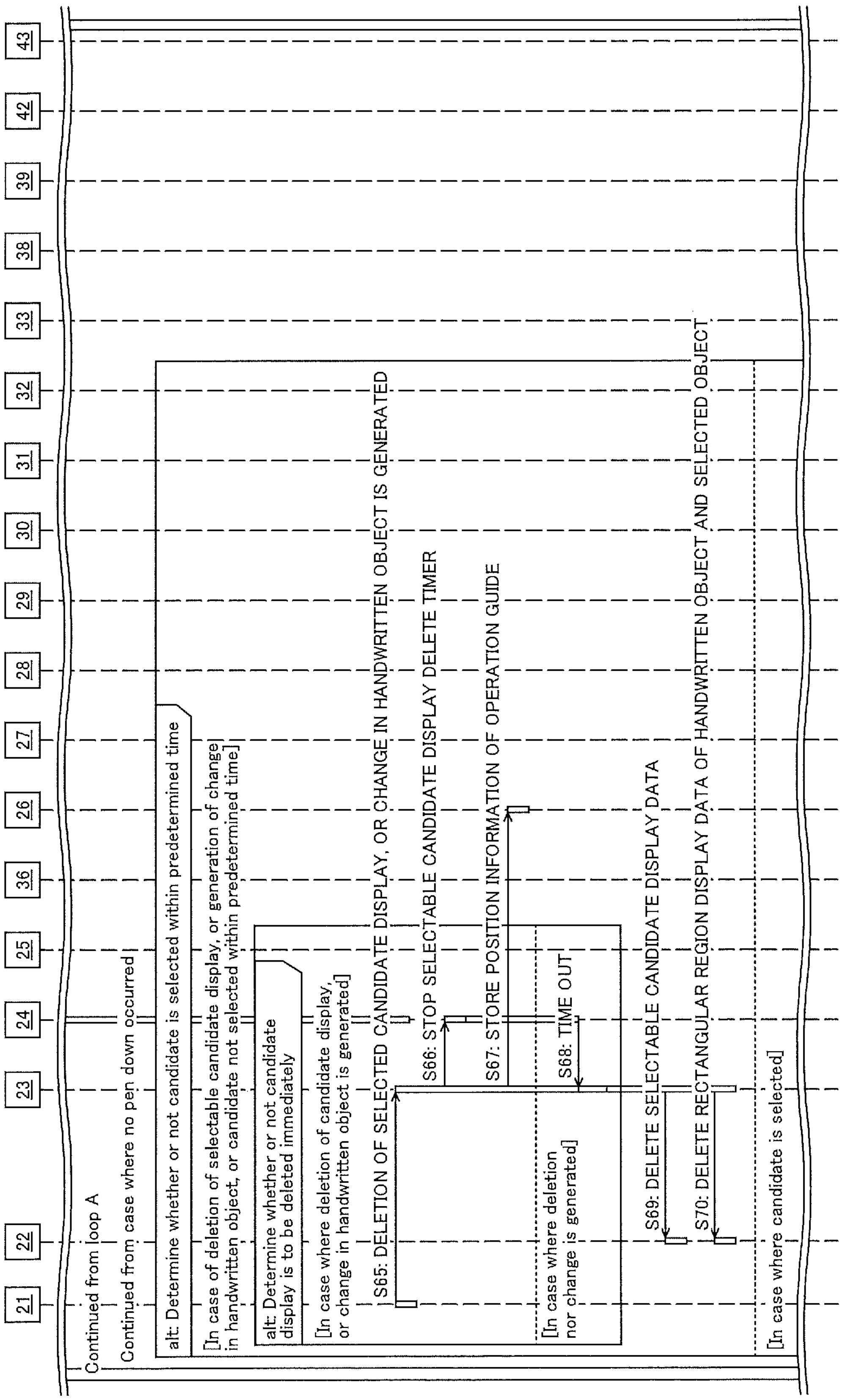
FIG. 38 is a sequence diagram (part 6) for explaining the example of the process in which the display device displays the character string candidates and the operation command candidates.

Further, steps S65 through S67 illustrated in FIG. 38 are performed when the candidate display is deleted or the change in the handwritten object occurs.

In step S65, the handwritten input part 21 transmits the occurrence of the selectable candidate display deletion or the change in the handwritten object to the handwritten input display control part 23.

In step S66, the handwritten input display control part 23 transmits the stop of the selectable candidate deletion timer. The candidate display timer control part 24 stops the selectable candidate deletion timer in response to receiving the stop of the selectable candidate deletion timer, because an operation is performed on the handwritten object within a predetermined time, and the selectable candidate deletion timer is no longer required.

In step S67, the handwritten input display control part 23 stores the position information of the operation guide 500 in the handwriting recognition control part 26 to be used for the gesture determination in the gesture handwriting recognition of step S19. The position information may be the coordinates of the upper left corner and the lower right corner, or similar coordinates, for example. Hence, the handwriting recognition control part 26 can determine whether the straight line used for inputting the angular information is inside the operation guide 500.

In step S69, the handwritten input display control part 23 transmits the deletion request for the selectable candidate display data to the display part 22, to delete the selectable candidate display.

In step S70, the handwritten input display control part 23 transmits the deletion request for the rectangular area display data of the handwritten object and the selected object to the display part 22, to delete the rectangular area display. Accordingly, if the display of the operation command candidates is deleted under conditions other than the selection of the operation command candidate, the display of the handwritten object is maintained as is.

On the other hand, in step S68, if no deletion of the selectable candidate display nor the change in the handwritten object occurs after the selectable candidate deletion timer is started (if the user does not perform the pen operation), the candidate display timer control part 24 transmits the time out to the handwritten input display control part 23.

Similarly, after the time out of the selectable candidate display deletion timer, the handwritten input display control part 23 performs steps S69 and S70, because the display part 22 may delete the selectable candidate display data, and rectangular area display data of the handwritten object and the selected object, after the lapse of the predetermined time.

If the user selects the selectable candidate after the selectable candidate delete timer is started, steps S71 through S89 illustrated in FIG. 39 are performed.

In step S71, if the user selects the selectable candidate after the selectable candidate deletion timer is started, the handwritten input part 21 transmits the selection of the character string candidate or the operation command candidate to the handwritten input display control part 23.

In step S71-2, the handwritten input display control part 23 transmits the stop of the selectable candidate display deletion timer to the candidate display timer control part 24. The candidate display timer control part 24 stops the selectable candidate display deletion timer in response to receiving the stop of the selectable candidate display deletion timer.

Next, in step S72, the handwritten input display control part 23 transmits a stored data clear to the handwriting recognition control part 26.

In step S73, the handwriting recognition control part 26 transmits the stored data clear to the character string conversion control part 28.

In step S74, the handwriting recognition control part 26 transmits the stored data clear to the predictive conversion control part 30.

In step S75, the handwriting recognition control part 26 transmits the stored data clear to the operation command recognition control part 32.

The handwriting recognition control part 26, the character string conversion control part 28, the predictive conversion control part 30, and the operation command recognition control part 32 respectively clear the data related to the character string candidates and the operation command candidates stored up to a point in time immediately before receiving the stored data clear.

Next, in step S76, the handwritten input display control part 23 transmits the deletion of the selectable candidate display data to the display part 22, to delete the selectable candidate display.

In step S77, the handwritten input display control part 23 transmits the deletion of the rectangular area display data of the handwritten object and the selected object to the display part 22, to delete the rectangular area display.

In step S78, the handwritten input display control part 23 deletes the display by transmitting the deletion of the handwritten object display data, and the deletion of the pen coordinate complement display data transmitted in step S6, to the display part 22, to delete the handwritten object display and the pen coordinate complement display. The handwritten object display and the pen coordinate complement display may be deleted, because the character string candidate or the operation command candidate is selected, thereby eliminating the need for the handwritten object, or the like.

In step S79, the handwritten input display control part 23 transmits the deletion of the handwritten object to the handwritten input storage part 25.

If the character string candidate or the image candidate is selected by the user, steps S80 through S82 are performed.

In step S80, when the character string candidate is selected, the handwritten input display control part 23 transmits the addition of the character string object to the handwritten input storage part 25. When the image candidate is selected, the handwritten input display control part 23 transmits the addition of the image object to the handwritten input storage part 25.

In step S81, the handwritten input display control part 23 transmits the acquisition for the character string object font to the handwritten input storage part 25. The handwritten input storage part 25 selects a defined font from an estimated character size of the handwritten object, and transmits the selected font to the handwritten input display control part 23. If image candidate is selected, no particular processing is required because the image data is already acquired.

Next, in step S82, the handwritten input display control part 23 transmits the character string object display data, which is to be displayed at the same position as the handwritten object, to the display part 22 using the defined font received from the handwritten input storage part 25, so as to display the character string object display data. When the image candidate is selected, the handwritten input display control part 23 transmits the image object display data, which is to be displayed at the same position as the handwritten object, to the display part 22, so as to display the image object display data.

If the operation command candidate is selected, steps S83 through S88 are performed. Furthermore, steps S83 through S85 are performed if the selected object is present.

In step S83, when the operation command candidate for the selected object is specified (when the selected object is present), the handwritten input display control part 23 transmits the deletion of the selected object display data to the display part 22, and deletes the selected object display, in order for the handwritten input display control part 23 to delete the original selected object.

Next, in step S84, the handwritten input display control part 23 transmits the operation command for the selected object to the handwritten input storage part 25. The handwritten input storage part 25 transmits the display data (display data after editing or decorating) of the newly selected object to the handwritten input display control part 23.

Next, in step S85, the handwritten input display control part 23 transmits the selected object display data to the display part 22, so that the selected object after executing the operation command is redisplayed.

In step S86, when the character string "手書きサイン登録する" pronounced "tegaki sain touroku suru" ("register handwritten signature" in English) of the operation command definition data 713, or the character string made up of six Kanji and Hiragana characters "設定変更する" pronounced "settei henkou suru" ("change setting" in English) of the operation command definition data 716, which is the operation command of the input and output system, is specified, the handwritten input display control part 23 adds the handwritten signature registration form 561 or the user definition data change form 562 to the handwritten input storage part 25.

In step S87, when other operation commands of the input and output system are selected, the handwritten input display control part 23 executes the operation command character string (Command) of the operation command definition data corresponding to the operation command selected by the user.

When the operation command 512 for signing in is executed, the handwritten input display control part 23 acquires the pen ID received by the handwritten input part 21 upon execution of the operation command 512. The handwritten input display control part 23 identifies the user definition data including "SignatureId" acquired in step S61, and acquires "AccountId" from the user definition data. Further, the handwritten input display control part 23 registers "AccountId" in the pen ID control data in correspondence with the pen ID. As a result, the pen 2500 and the user become linked to each other, and the display device 2 can perform processes using user definition data.

When the operation command is executed after the user has signed in, the handwritten input display control part 23 identifies the user definition data using "AccountId", and sets the identified user definition data into "%~%" of the operation command to execute the same. This "AccountId" in the pen ID control data corresponds to the pen ID received by the handwritten input part 21 upon execution of the operation command.

In step S88, as illustrated in FIG. 29, if the user presses the rotating operation button 5111 of the operation header 520, the handwritten input display control part 23 accepts the angular information according to the number of times the rotating operation button 5111 is pressed. The handwritten input display control part 23 stores the accepted angular information in the pen ID control data storage part 36 in correspondence with the pen ID received from the pen 2500 upon pressing of the rotating operation button 5111.

In step S89, for the next handwritten object, the handwritten input display control part 23 transmits the start of the handwritten object to the handwritten input storage part 25. The handwritten input storage part 25 secures the handwritten object region. Thereafter, the processes of steps S2 through S89 are repeated.

<Display Example of Image Candidates>

Hereinafter, a display example of the image candidates will be described.

Figure 40:
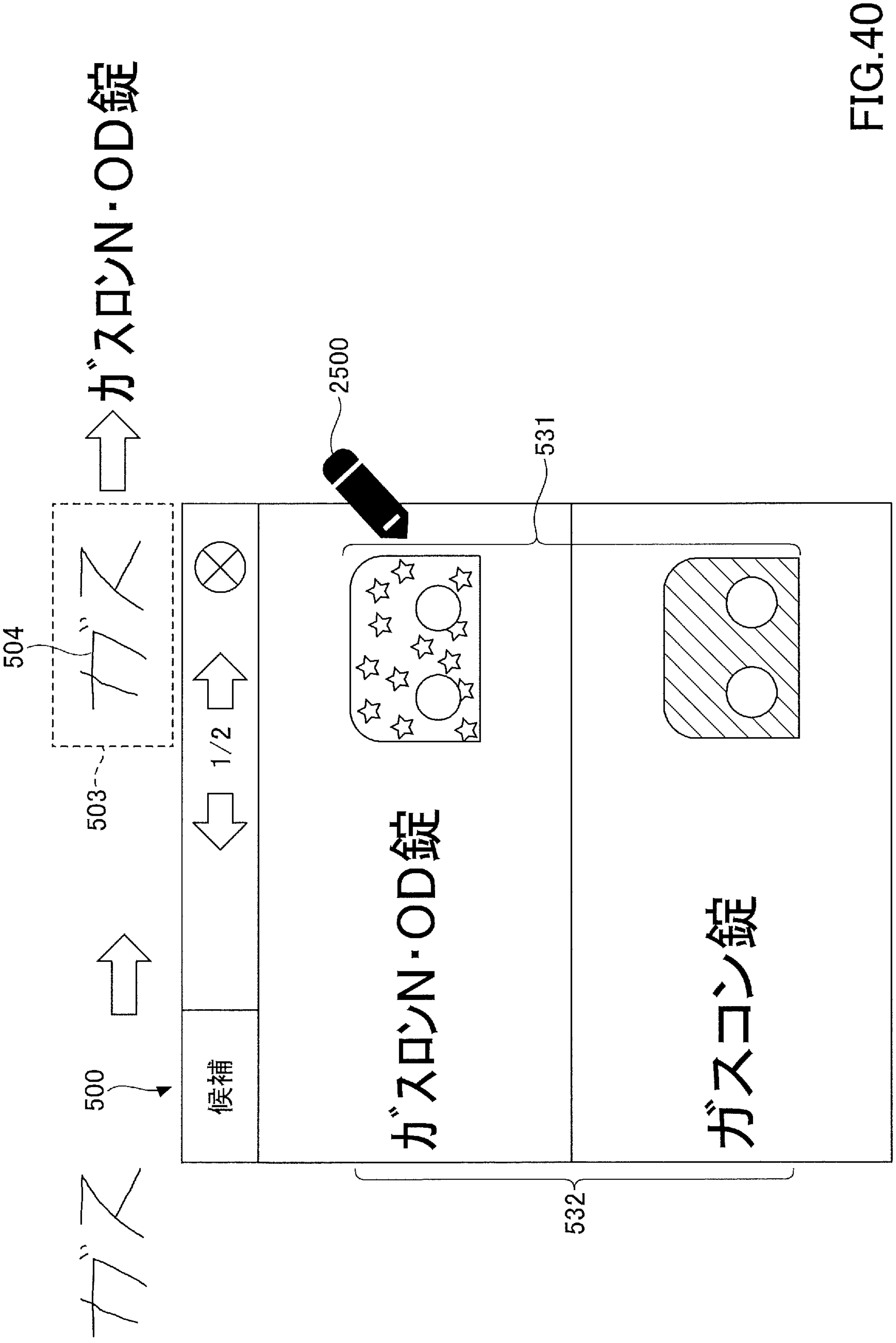
FIG. 40 is a diagram illustrating an example of the operation guide displaying the image candidates of pharmaceutical products.

FIG. 40 illustrates an example of the operation guide 500 for displaying image candidates 531 of pharmaceutical products. In FIG. 40, the user handwrites a character string "ガス" pronounced "gasu" ("gas" in English), in order to display tablets with names beginning with the character string "ガス" on the display device 2. The image transformation control part 42 performs a search in the image transformation dictionary part 43 using the character string "ガス", and displays two image candidates 531 with product names having a forward match with the character string "ガス". In this example, the user intended to write a character string "ガスロン N•OD錠 (登録商標)" pronounced "gasuron enu oodijou (touroku shouhyou)" ("Gaslon N•OD Tablets (registered trademark)" in English). However, because the character string "ガスロン N•OD錠 (登録商標)" is similar to a character string "ガスコン錠 (登録商標)" pronounced "gasukon jou (touroku shouhyou)" ("Gascon Tablets (registered trademark)" in English), there is a risk of erroneously selecting the latter similar tablet. However, because the distinctive packages of the pharmaceutical products are displayed as the image candidates 531, the user can positively select the intended tablet being handwritten by the user. Such a display of the distinctive packages is also useful in cases where the user can remember the package appearance of the product but does not clearly remember the product name. In FIG. 40, only the characters (product name) of the selected image candidate 531 is displayed when the image candidate 531 of the operation guide 500 is selected.

Figure 41:
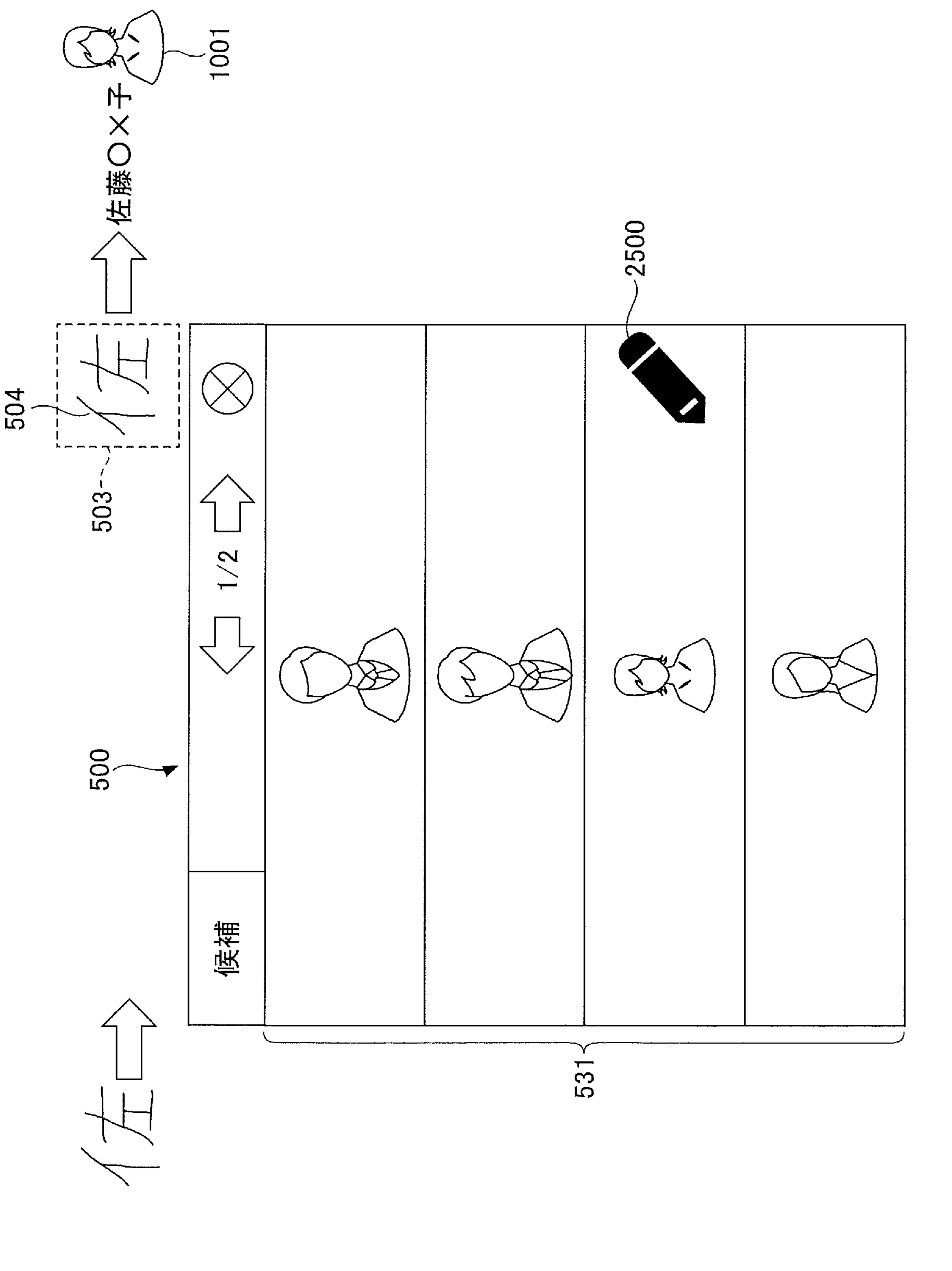
FIG. 41 is a diagram illustrating an example of the operation guide displaying the image candidates of portrait photographs.

FIG. 41 illustrates an example of the operation guide for displaying image candidates of photographs of people. In FIG. 41, the user handwrites a Kanji character "佐" pronounced "Sa", in order to display the names of the people beginning with the Kanji character "佐" on the display device 2. The image transformation control part 42 performs a search in the image transformation dictionary part 43 using the Kanji character "佐", and displays the four image candidates with the names having a forward match with the Kanji character "佐". Even if the names starting with the Kanji character "佐" are similar, the image candidates 531 are photographs of the people, which enable the user to positively select the intended name of the person being handwritten by the user. Such a display of the photographs of the people is also useful in cases where the user can remember the person's face but does not clearly remember the person's name. In FIG. 41, an image 1001 and the characters (person's name) of the selected image candidate 531 are displayed when the image candidate 531 of the operation guide 500 is selected. The image 1001 may be displayed near the characters, such as above, below, on the left, or on the right of the characters (person's name). The image 1001 may be displayed at positions other than near the characters (person's name).

Figure 42:
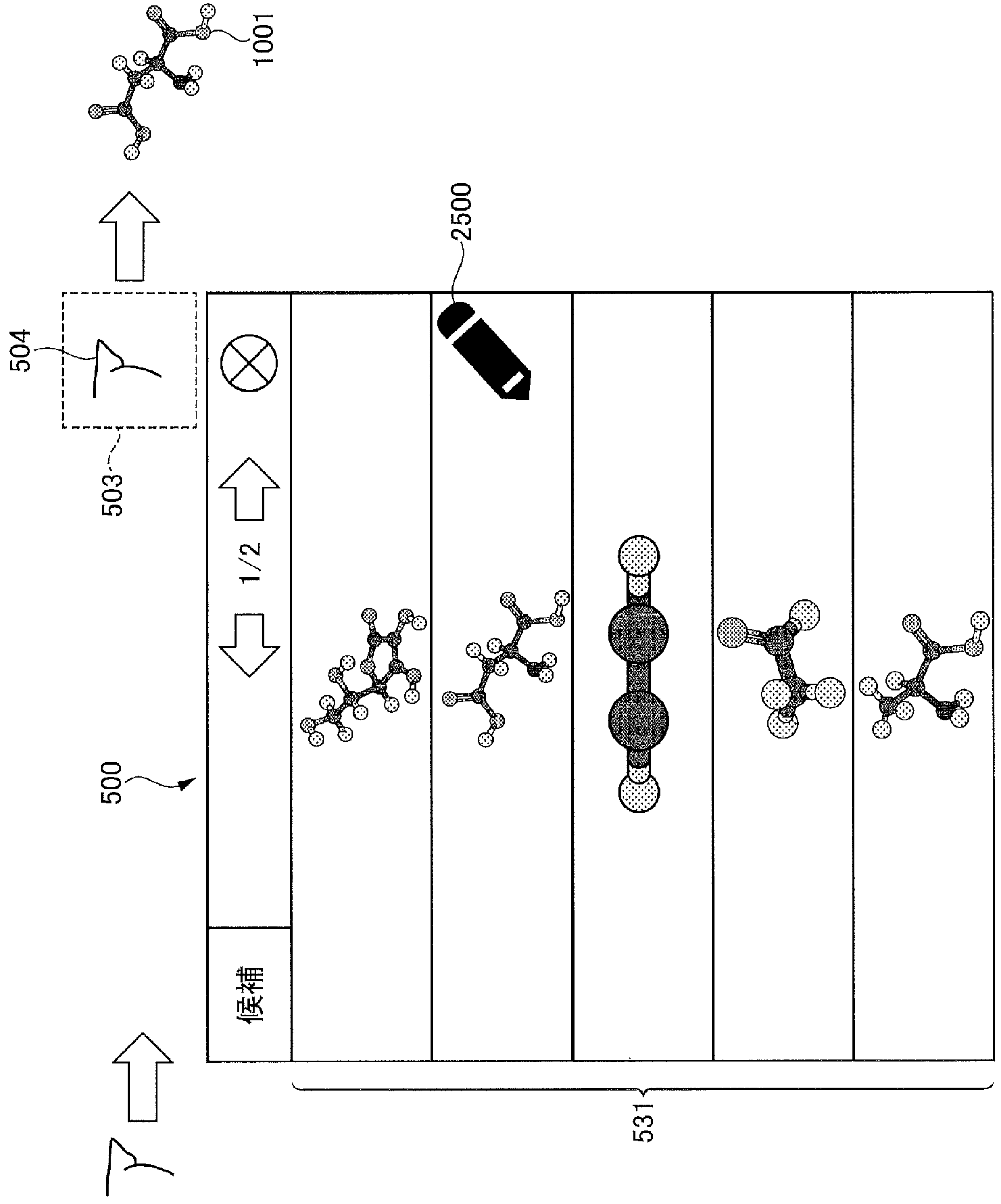
FIG. 42 is a diagram illustrating an example of the operation guide displaying molecular structure models as the image candidates.

FIG. 42 illustrates an example of the operation guide 500 for displaying molecular structure models as the image candidates 531, similar to FIG. 2. In FIG. 42, only the image 1001 (molecular structure model) is displayed when the user selects the image candidate 531. In other words, characters such as names are not displayed in this example. Such a display of only the image 1001 after the selection of image candidate 531 is useful in cases where the structure of the image conveys the meaning of the information more effectively than the characters. For example, in a conference of experts, it may be possible to share not only the name but also the functions by looking at the molecular model. In addition, when a teacher explains the shape or the like of an object in a classroom or the like, it is easier to explain the structure of the object when compared to using only the characters or names to explain the structure.

As illustrated in FIG. 40 through FIG. 42, when the image candidate 531 of the operation guide 500 is selected, the display device 2 can display only the image, the image and the name, or only the name. Because the preferred display method depends on the user and the situation, the user can set the display method from the operation header 520, or from a menu that is displayed in response to the long press of the operation guide 500.

<3DCG Image Candidates>

Figure 43:
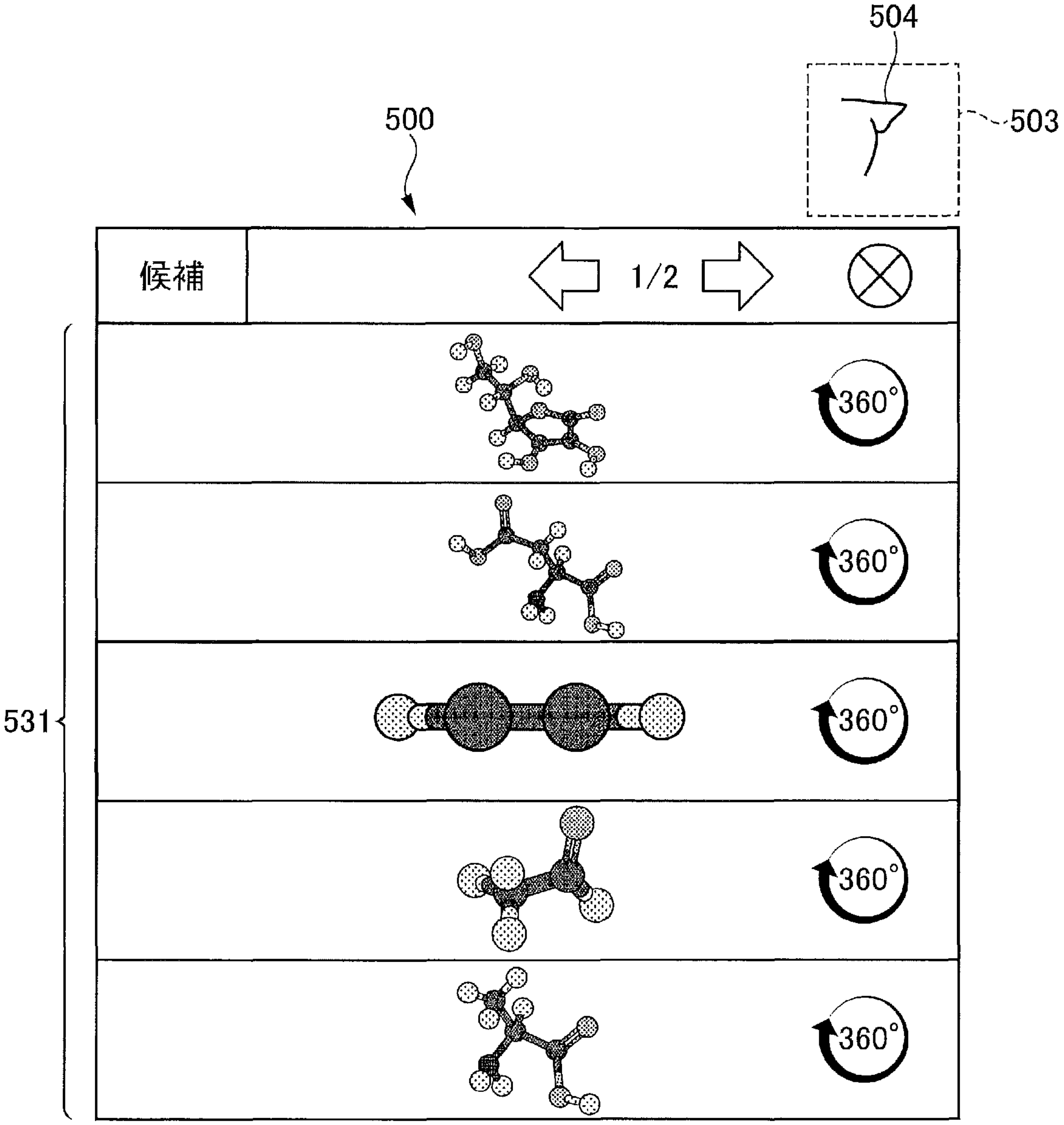
FIG. 43 is a diagram (part 1) illustrating an example of the operation guide displaying the image candidates of the molecular structure model in 3-Dimensional Computer Graphics (3DCG).
Figure 44:
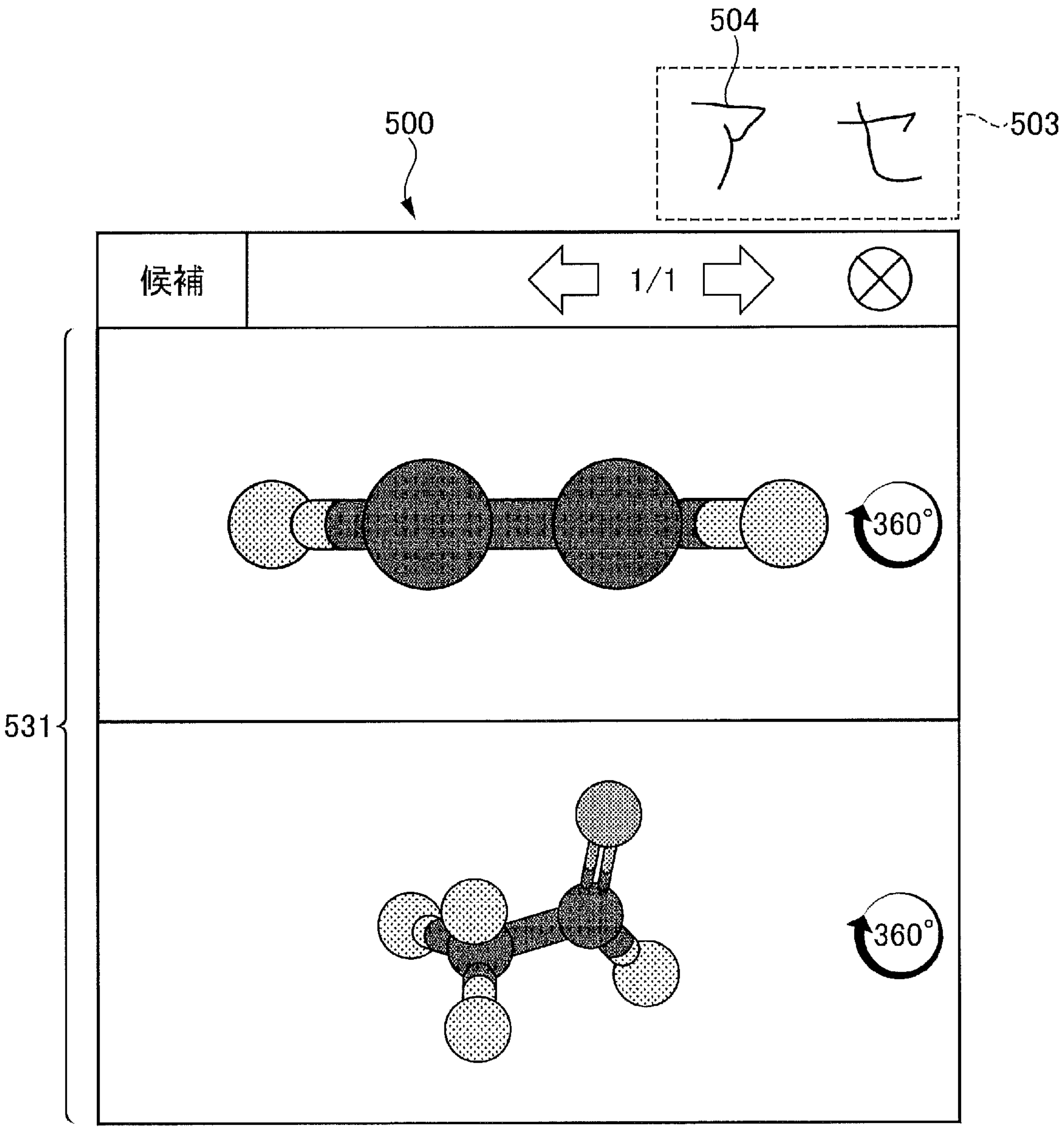
FIG. 44 is a diagram (part 2) illustrating an example of the operation guide displaying the image candidates of the molecular structure model in 3DCG.
Figure 45:
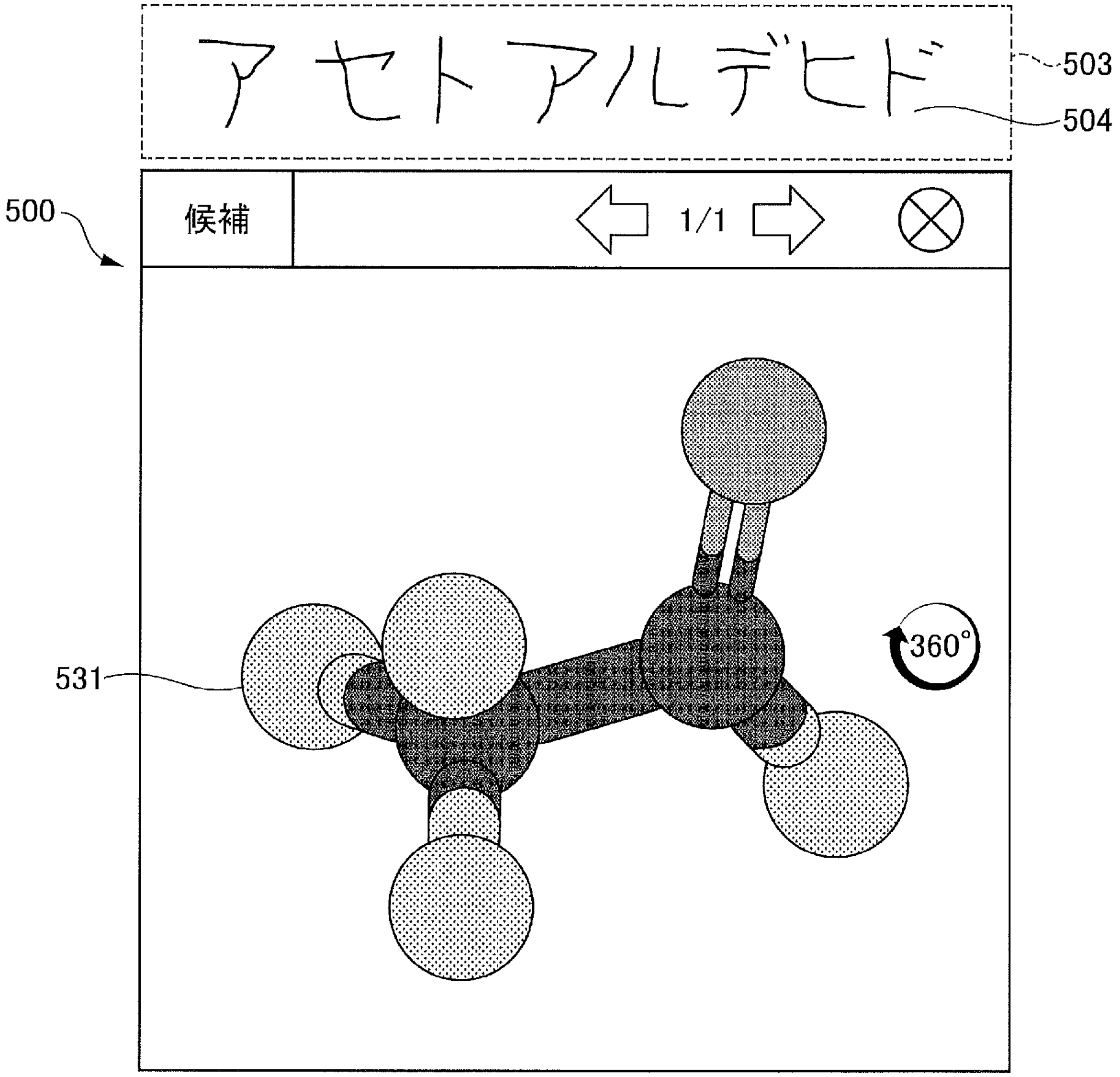
FIG. 45 is a diagram (part 3) illustrating an example of the operation guide displaying the image candidates of the molecular structure model in 3DCG.

FIG. 43 through FIG. 45 illustrate examples of the operation guide 500 that display the 3DCG of the molecular structure models as the image candidates. In other words, the image candidates are generated by the 3DCG. The display method employed in FIG. 43 through FIG. 45 may be similar to that employed in FIG. 19 through FIG. 21. In FIG. 43 through FIG. 45, because the image candidates 531 displayed by the operation guide 500 are the 3DCG, the user can rotate the image candidates 531 up, down, left, and right using the pen 2500 or the like. Hence, the user can confirm the structure that is not visible on the display at first but becomes visible after being rotated on the display, for example, before selecting the image candidate 531.

Because the display of the 3DCG requires a special viewer software, the image candidate 531 may be displayed in a window separate from the operation guide 500. The selected image candidate 531 can be displayed in 3DCG even after the image candidates 531 is selected. Such a display is useful when explaining the structure of the product in a presentation or the like, and when the teacher teaches the structure of the object to students.

<Display of Related Image Candidates>

The image candidate 531 that is displayed is not necessarily the image candidate having the forward match with the recognized character string of the handwritten data input by the user. For example, the display device 2 may display the image candidate 531 that is related to the image candidate having the forward match with the recognized character string of the handwritten data input by the user.

Figure 46:
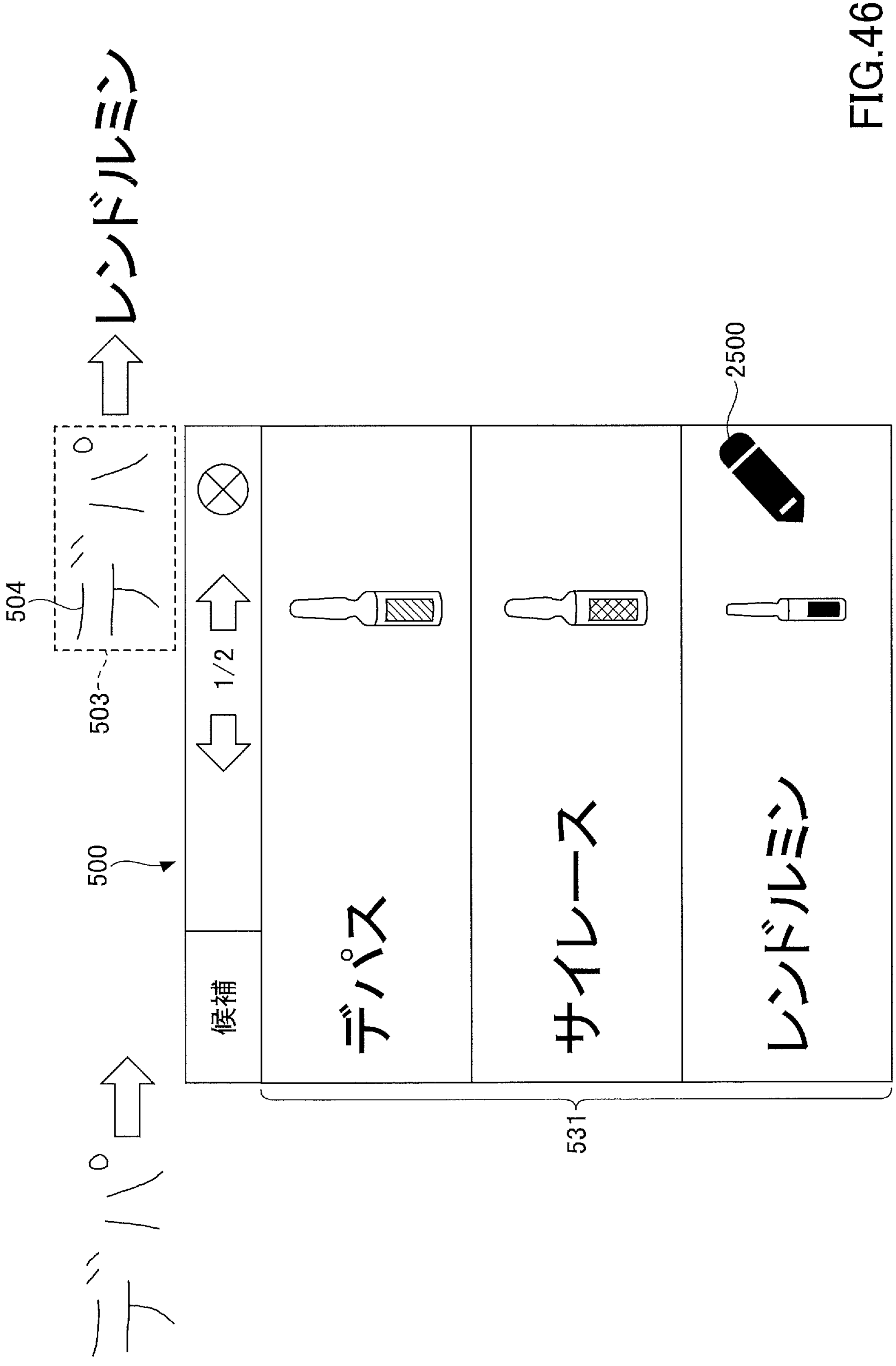
FIG. 46 is a diagram illustrating an example of the operation guide displaying the image candidates of the pharmaceutical products.

FIG. 46 illustrates an example of the operation guide 500 for displaying image candidates 531 of the pharmaceutical products. In FIG. 46, the user handwrites Katakana characters "デパ" pronounced "Depa", in order to display drugs having similar utility or effect as the drug having the name beginning with the character string "デパ" on the display device 2. The image transformation control part 42 performs a search in the image transformation dictionary part 43 using the character string "デパ", and identifies the image candidate 531 with product name "デパス(登録商標)" pronounced "Depasu" ("Depas (registered trademark" in English) having a forward match with the character string "デパ". In addition, the image transformation control part 42 identifies the image candidates 531 having the name "サイレース(登録商標)" pronounced "saireisu" ("Silece or Flunitrazepam (registered trademark)" in English) and the name "レンドルミン(登録商標)" pronounced "renndorumin" ("Lendormin (registered trademark)" in English) related to the product name "デパス(登録商標)" pronounced "Depasu". The user can view the image candidates and select the intended or appropriate drug. For example, the user can select the drug even when the user does not fully remember the name of the drug, and can select the most appropriate drug from among the drugs having similar utility or effect. Further, the image candidates 531 having names beginning with different characters can be displayed.

In order to display the related image candidates 531 described above, the images of the image transformation dictionary part 43 may be related as illustrated in FIG. 47. In FIG. 47, the image transformation dictionary part 43 includes the item of the group ID, and the group ID is set with respect to the image. The same group ID is assigned to the images belonging to the same group. The group ID having the same value may be assigned when there is similarity from a predetermined viewpoint, such as the shape, the properties, the usages, or the like. Accordingly, the related image candidates 531 can be displayed, as illustrated in FIG. 46.

<Search By Handwritten Data>

This embodiment describes the case where the search is performed in the image transformation dictionary part 43 using the character string converted from the handwritten data. However, the image transformation control part 42 may perform the search in the image transformation dictionary part 43 directly using the handwritten data. In this case, the handwritten data may be related to the images of the image transformation dictionary part 43, as illustrated in FIG. 48. In FIG. 48, the image transformation dictionary part 43 includes the item of the handwritten data, and handwritten data of the names correspond to the images. The image transformation control part 42 performs the search in the image transformation dictionary part 43 using the handwritten data in real time, from the beginning of the handwritten data. For example, a designer may segment the handwritten data of the image transformation dictionary part 43 in units of characters beforehand. The image transformation control part 42 can determine a search range of the handwritten data of the image transformation dictionary part 43 according to the ratio of the horizontal distance and the vertical distance used for detecting the estimated character size. In other words, the units of characters can be 1 character if the ratio of the horizontal distance and the vertical distance is 1:1, and can be 2 if the ratio of the horizontal distance and the vertical distance is 1:2, and so on.

In this case, the search can be performed by pattern matching, for example. Further, because the handwritten data has a characteristic feature for each individual user, the image transformation dictionary part 43 may register the handwritten data of different users.

<Notable Advantageous Features>

As described above, because the display device 2 according to this embodiment displays the images of the selectable candidates, it becomes easier for the user to select the intended person or object, and reduce the possibility of presenting incorrect information. In addition, because the selected image can also be displayed, the information can be presented in a visually understandable manner.

The user may handwrite without distinguishing between inputting characters or the like, and inputting handwritten signature, and the user may call and make access to the various operation commands and the operation command 512 for signing in, without distinguishing between various operation commands and the operation commands 512.

Further, the display device 2 according to this embodiment does not require the selection of the operation menu and the selection of the operation from the list of buttons, and can input the operation command similar to handwriting the characters or the like. Because the operation command and the selectable candidate 530 are displayed simultaneously in the operation guide, the user can use the display device 2 without distinguishing between the input of the characters or the like and the selection of the operation command. The user can handwrite the handwritten object or enclose the decided object with the enclosure line, to display arbitrary operation command candidates. Accordingly, it is possible to call and make access to an arbitrary function (such as the editing function, the input and output function, the pen function, or the like) from the handwritten state. Consequently, step-by-step operations are no longer required to call and make access to a desired function by pressing the menu button, thereby reducing the operating procedure from the state where the user is handwriting to the calling and making access to the arbitrary function.

Second Embodiment

In this embodiment, the display device 2 converts English handwritten data into the image candidates. The configuration of the display device 2 in this embodiment is the same as that of the first embodiment, except that the conversion dictionary and the operation command definition data correspond to the English language. For this reason, the features of the display device 2 that are different from those of the first embodiment will be described, based on the conversion of the handwritten data into English (hereinafter, referred to as "English conversion") will be described.

Figure 49:
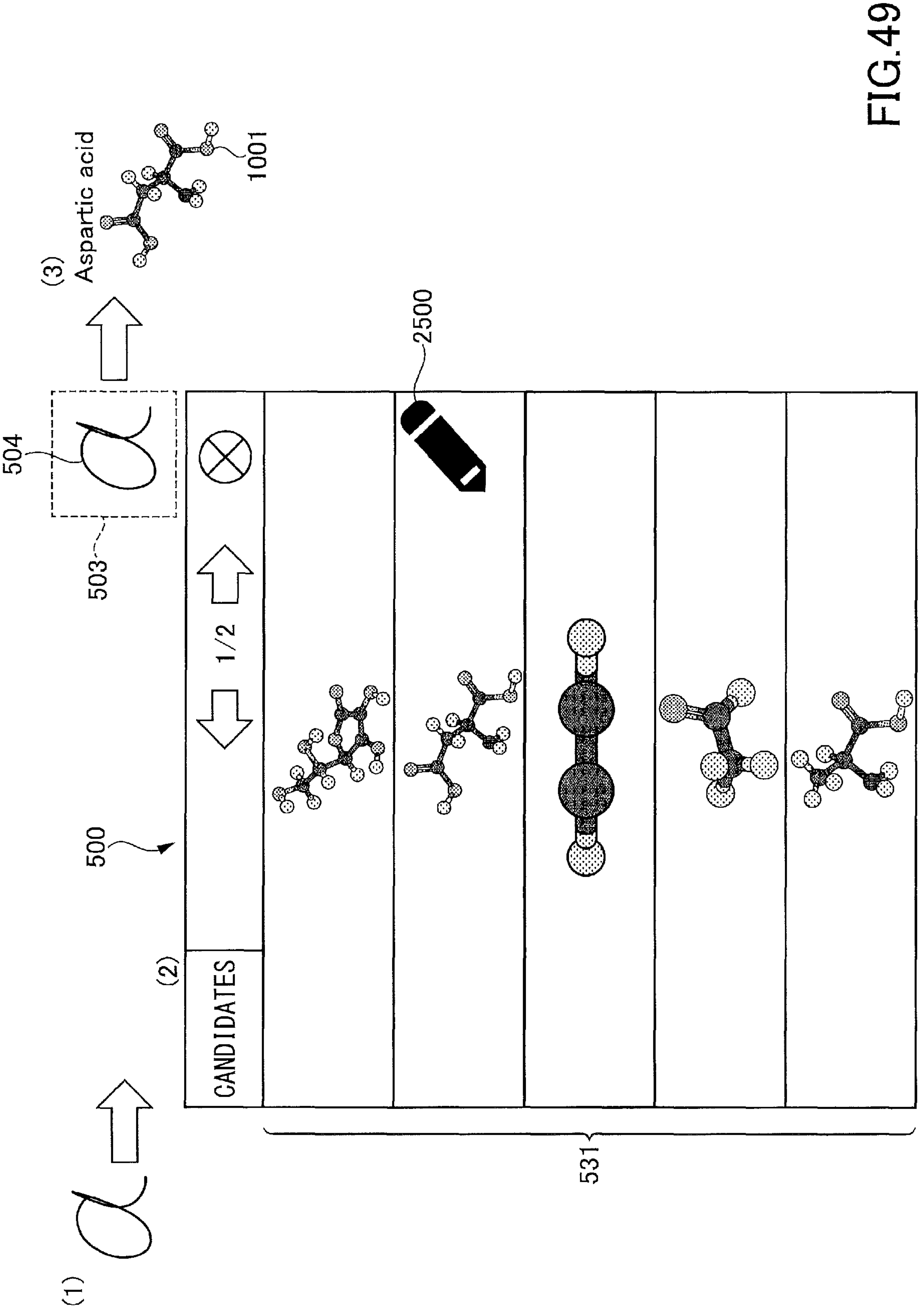
FIG. 49 is a diagram illustrating an example of a plurality of image candidates displayed by the display device when making an English conversion.

FIG. 49 is a diagram illustrating an example of a plurality of image candidates displayed by the display device 2 in the case of the English conversion. In the description of FIG. 49, only the differences from FIG. 2 will mainly be described.

(1) The user handwrites a character "a" to input the term "Aspartic acid".

(2) The display device 2 displays the image candidates 531 starting with the character "a". In other words, even while the user is handwriting, the image candidates 531, such as graphics, illustrations, photographs, or the like matching the character string that is being handwritten, are displayed. In FIG. 49, the molecular structure models of ascorbic acid, aspartic acid, acetylene, acetaldehyde, and alanine are displayed.

(3) When the user selects one of the image candidates 531, the display device 2 displays the selected image together with the characters representing the selected image. The display device 2 may display only the characters or only the images.

Accordingly, even in the case of the English conversion, because the display device 2 according to this embodiment displays the images of the selectable candidates, it becomes easier for the user to select the intended person or object, and reduce the possibility of presenting incorrect information. In addition, because the selected image can also be displayed, the information can be presented in a visually understandable manner.

<Example of Dictionary Data>

The dictionary data in the case of the English conversion will be described, with reference to FIG. 50 through FIG. 52. In the description of FIG. 50 through FIG. 52, the differences from FIG. 8 through FIG. 10 will mainly be described.

FIG. 50 illustrates an example of the dictionary data of the handwriting recognition dictionary part 27 used for the English conversion. The dictionary data of the handwriting recognition dictionary part 27 illustrated in FIG. 50 indicates that the handwritten character "a (state of the stroke data)" has a 0.90 probability of being converted into the character "a", and a 0.10 probability of being converted into a character "o".

FIG. 51 illustrates an example of the dictionary data of the character string conversion dictionary part 29 used for the English conversion. In the dictionary data of the character string conversion dictionary part 29 illustrated in FIG. 51, the character "a" has a 0.55 probability of being converted into the character string "ab", and has a 0.45 probability of being converted into the character string "AI". Similar probabilities apply to other character strings before conversion.

FIG. 52 illustrates an example of the dictionary data of the predictive conversion dictionary part 31 used for the English conversion. In the dictionary data of the predictive conversion dictionary part 31 illustrated in FIG. 52, the character string "agenda" has a 0.55 probability of being converted into the character string "agenda list", and has a 0.30 probability of being converted into the character string "agenda template". Similar probabilities apply to other character and character strings before conversion.

The dictionary data has no language dependency, and any character or character string may be registered before and after conversion.

FIG. 53 illustrates an example of the image dictionary data of the image transformation dictionary part 43 used for the English conversion. In the description of FIG. 53, the differences from FIG. 11 will mainly be described. In the case of English conversion, the English name of the image is registered in the index. Accordingly, if the user handwrites in English, the display device 2 can display images corresponding to the English language.

<Example of Operation Command Definition Data>

FIG. 54A and FIG. 54B illustrate an example of operation command definition data when no selected object is present. In the description of FIG. 54A and FIG. 54B, the differences from FIG. 12A will mainly be described. The contents of each of the operation commands are the same as in FIG. 12A, but English expressions are made to correspond to the operation command name (Name) and the character string (String). Accordingly, the user can handwrite the operation command in English, and select the operations command in English.

FIG. 55 illustrates an example of the operation command definition data when the selected object is present. In the description of FIG. 55, the differences from FIG. 13 will mainly be described. The contents of each of the operation commands are the same as in FIG. 13, but English expressions are made to correspond to "Name". Accordingly, the user can select the operation command in English.

FIG. 56 illustrates an example of the user definition data. In the description of FIG. 56, the differences from FIG. 14 will mainly be described. The contents of user definition data are the same as in FIG. 14, but "AccountUsername" is "Bob" in this example. In addition, English expressions are made to correspond to "Name". Accordingly, the user can select the user definition data in English.

The handwritten signature data stored by the handwritten signature data storage part 39 may be similar to those illustrated in FIG. 15, and the handwritten input storage data may be similar to those illustrated in FIG. 16. The pen ID control data may be similar to those illustrated in FIG. 17A and FIG. 17B.

<Display Example of Selectable Candidates>

Figure 57:
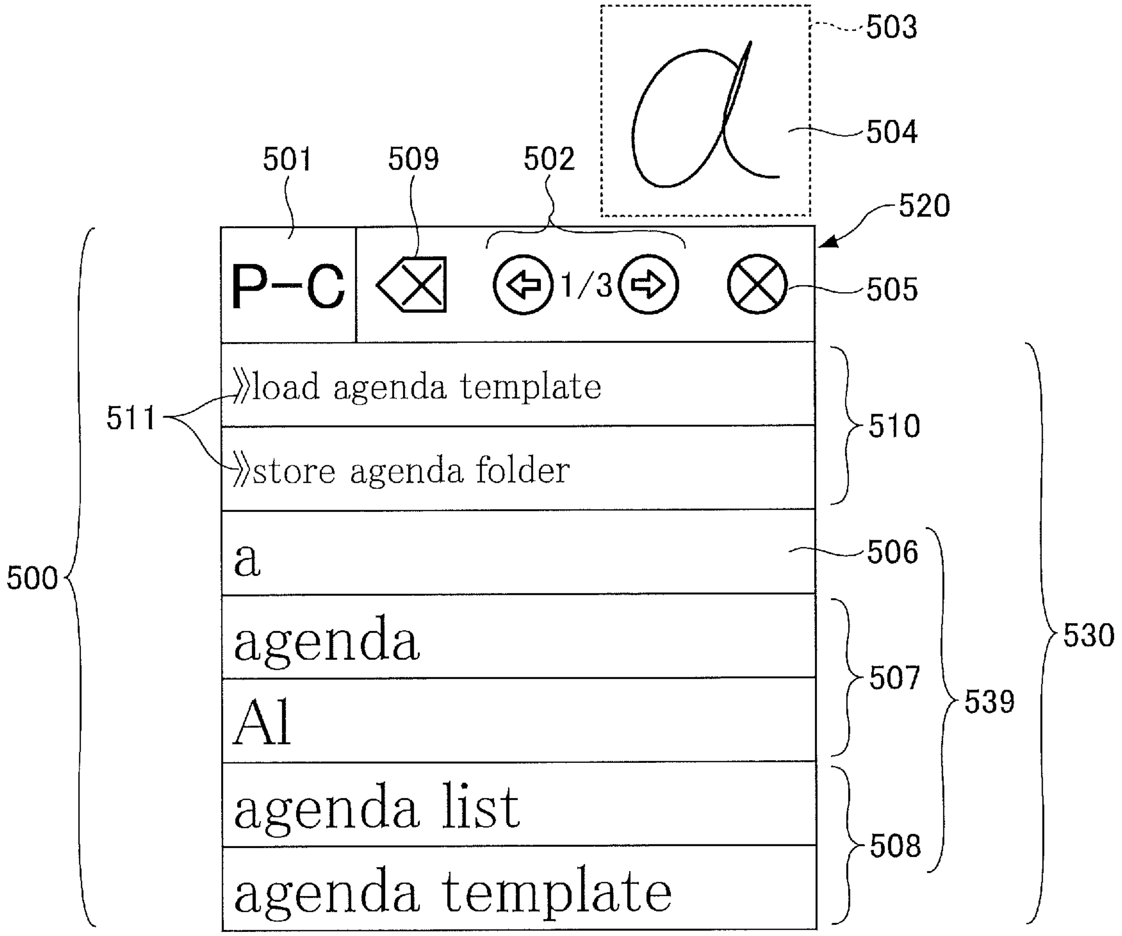
FIG. 57 is a diagram illustrating an example of the operation guide and the selectable candidates displayed by the operation guide when performing the English conversion.

FIG. 57 illustrates an example of the operation guide 500, and the selectable candidate 530 displayed by the operation guide 500, in the case of English conversion. In the description of FIG. 57, the differences from FIG. 18 will mainly be described. In FIG. 57, the user handwrites the character "a" as the handwritten object 504. The operation command candidate 510, the handwriting recognition character string candidate 506, the converted character string candidate 507, and the character string/predictive conversion candidate 508 are displayed, based on the character "a". Accordingly, the display is similar to that of FIG. 18, except that the Japanese expressions in FIG. 18 are converted into English in FIG. 57. The button 501 is labeled "P-C" which is an abbreviation for "Predictive Conversion".

The operation command candidate 510 include the operation command definition data 701 and 702 having "agenda" in "string" of the operation command definition data illustrated in FIG. 54A, for example.

Accordingly, the user can similarly cause the display of the operation guide 500, also in the case of the English conversion.

Figure 58:
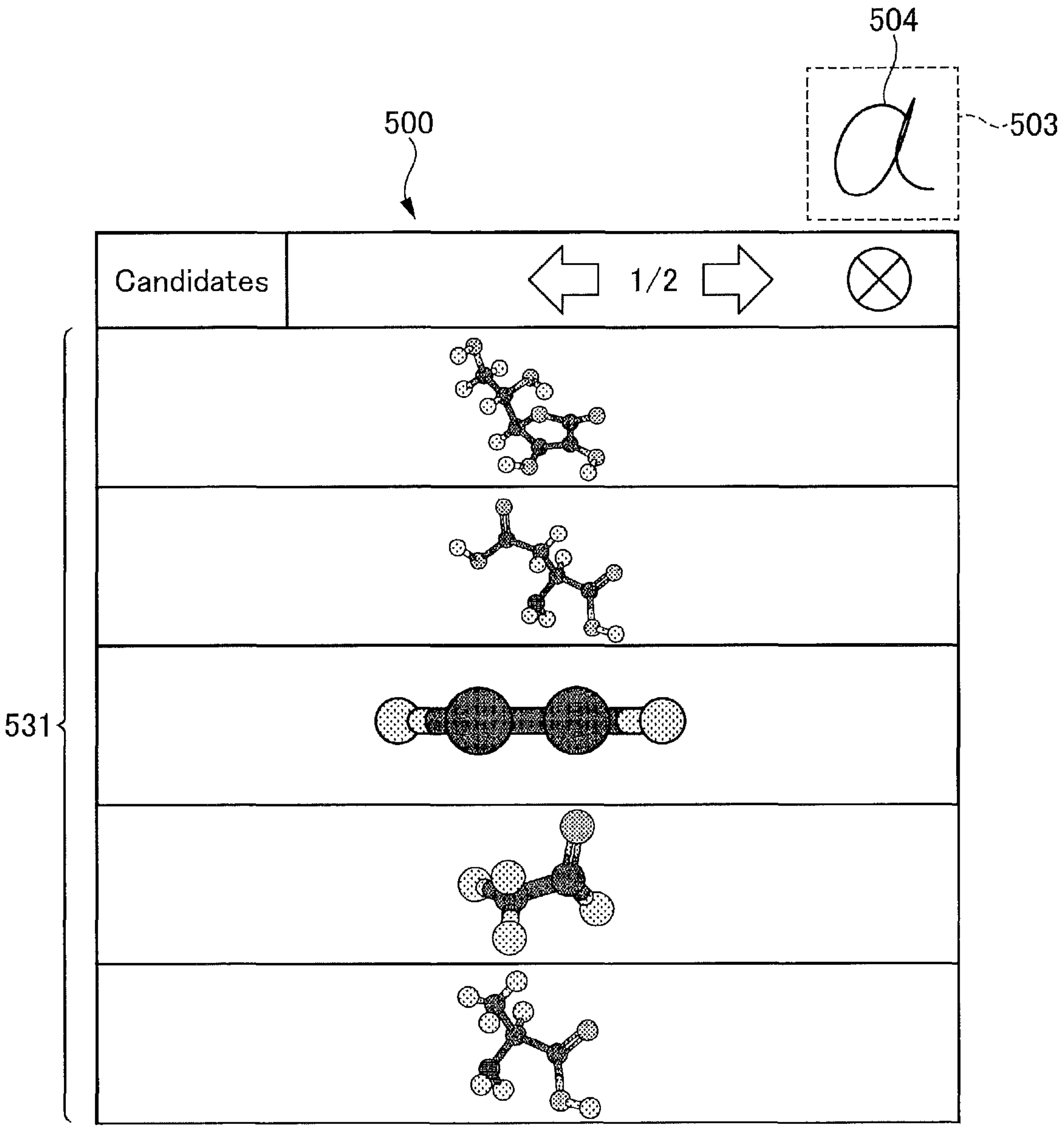
FIG. 58 is a diagram illustrating an example of a transition state in which the image candidates are gradually narrowed down according to the user's handwriting when performing the English conversion.
Figure 59:
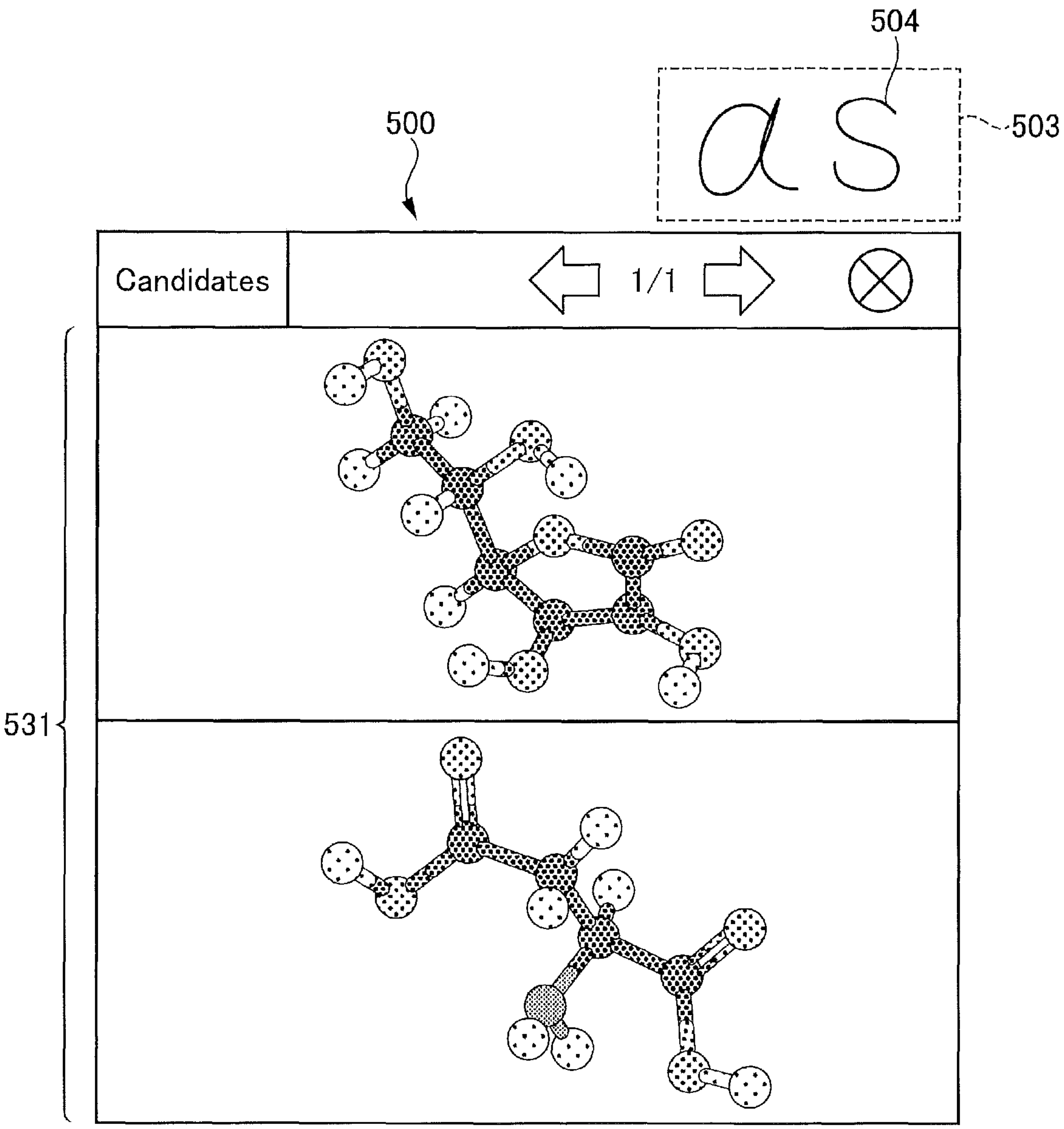
FIG. 59 is a diagram illustrating an example of the transition state in which the image candidates are gradually narrowed down according to the user's handwriting when performing the English conversion.
Figure 60:
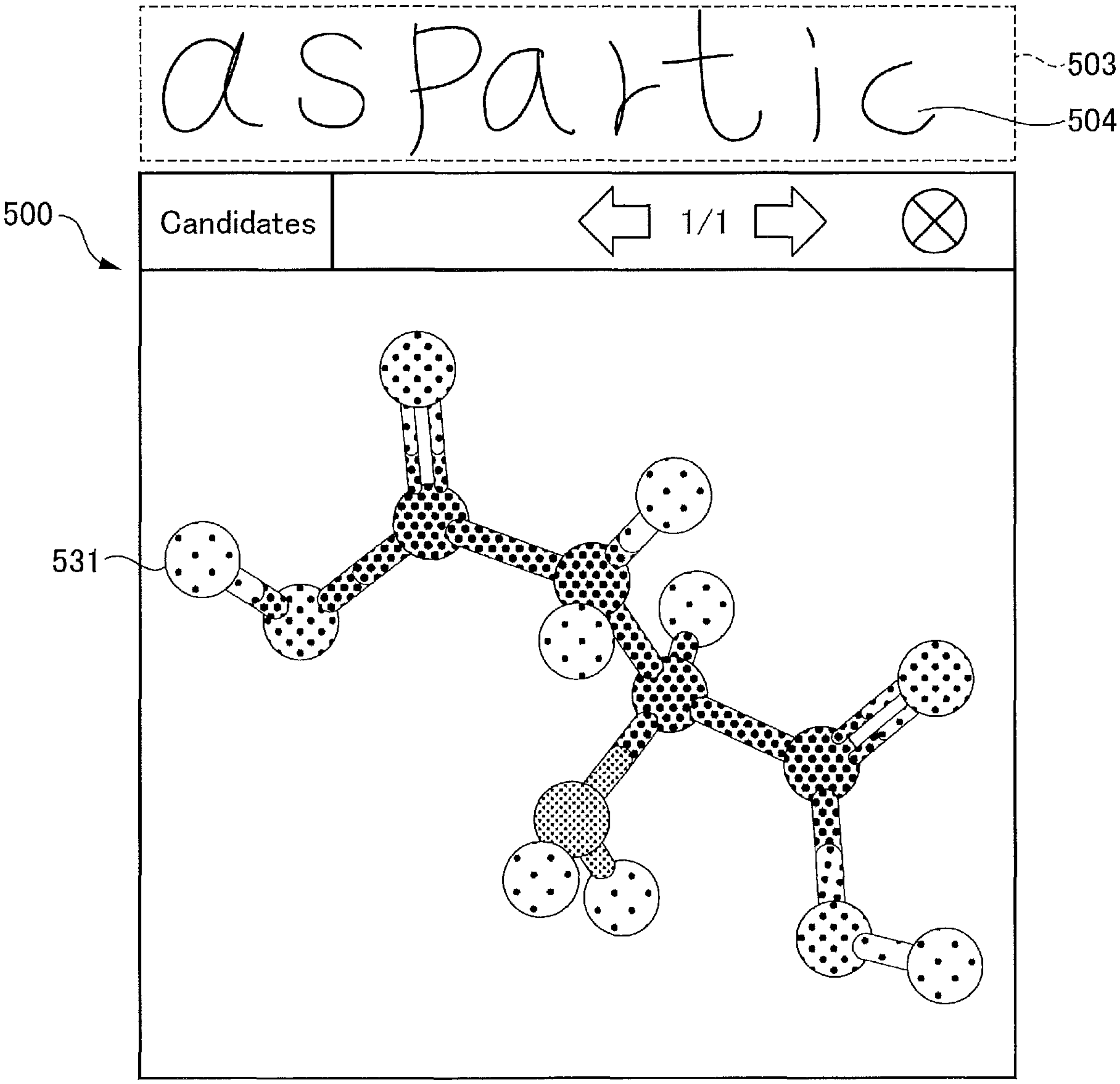
FIG. 60 is a diagram illustrating an example of the transition state in which the image candidates are gradually narrowed down according to the user's handwriting when performing the English conversion.

FIG. 58 through FIG. 60 illustrate transitions in which image candidates 531 are gradually narrowed down according to the user's handwriting. In the description of FIG. 58 through FIG. 60, the differences from FIG. 19 through FIG. 21 will mainly be described. Similar to the case of the Japanese language conversion, the handwriting recognition control part 26 successively converts the handwritten data from the beginning into a character or character string. The image transformation control part 42 performs the search in the image transformation dictionary part 43 by the forward match, while increasing the number of converted characters every time the character is converted. The display part 22 displays a number of image candidates, which decreases as the number of characters used for the search increases.

In FIG. 58, the user handwrites the character "a" as the handwritten object 504. When the character "a" is recognized, and "a" is obtained as the handwriting recognition character string, the handwritten input display control part 23 transmits the character "a" to the image transformation control part 42. The image transformation control part 42 performs the search in the image transformation dictionary part 43 illustrated in FIG. 53, and transmits the image candidate corresponding to the index field including the name having a forward match with the character "a" to the image transformation dictionary part 43. As a result, in FIG. 58, five image candidates 531 having the names beginning with the character "a" are displayed in the operation guide 500.

Next, FIG. 59 illustrates the image candidate 531 displayed when the user handwrites the character "a", and thereafter handwrites the character "s" without selecting the image candidate 531. In this case, because the user handwrites the character string "as", the handwritten input display control part 23 transmits the character string "as" to the image transformation control part 42. The image transformation control part 42 performs the search in the image transformation dictionary part 43 illustrated in FIG. 53, and transmits the image candidate corresponding to the index field including the name having a forward match with the character string "as" to the handwritten input display control part 23. As a result, in FIG. 59, two image candidates 531 having the names ("aspartic acid" and "ascorbic acid") beginning with the character string "as" are displayed in the operation guide 500.

As described above, the image transformation control part performs the search in the image transformation dictionary part by the forward match, while increasing the number of converted characters every time the character is converted.

Next, FIG. 60 illustrates the image candidate 531 that is displayed when the user handwrites entire the character string "Aspartic". The handwritten input display control part 23 transmits the character string "Aspartic" to the image transformation control part 42. The image transformation control part 42 performs the search in the image transformation dictionary part 43 illustrated in FIG. 53, and transmits the image candidate corresponding to the index field including the name having a forward match with the character string "Aspartic" to the handwritten input display control part 23. As a result, in FIG. 60, the image candidate 531 having the name "Aspartic acid" is displayed in the operation guide 500.

Figure 61:
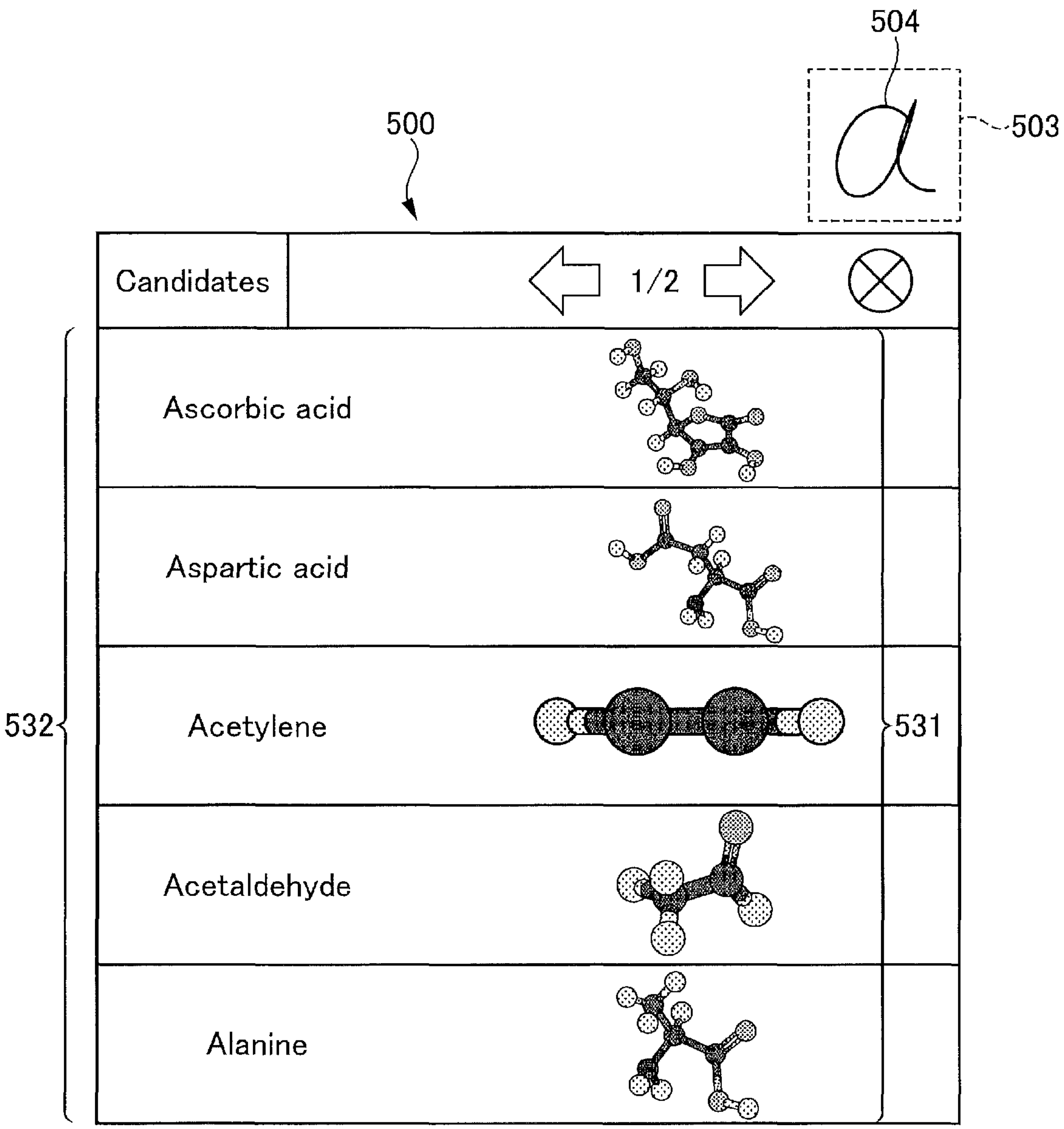
FIG. 61 is a diagram illustrating a display example of the image candidates and the operation guide displaying names of the image candidates when performing the English conversion.
Figure 62:
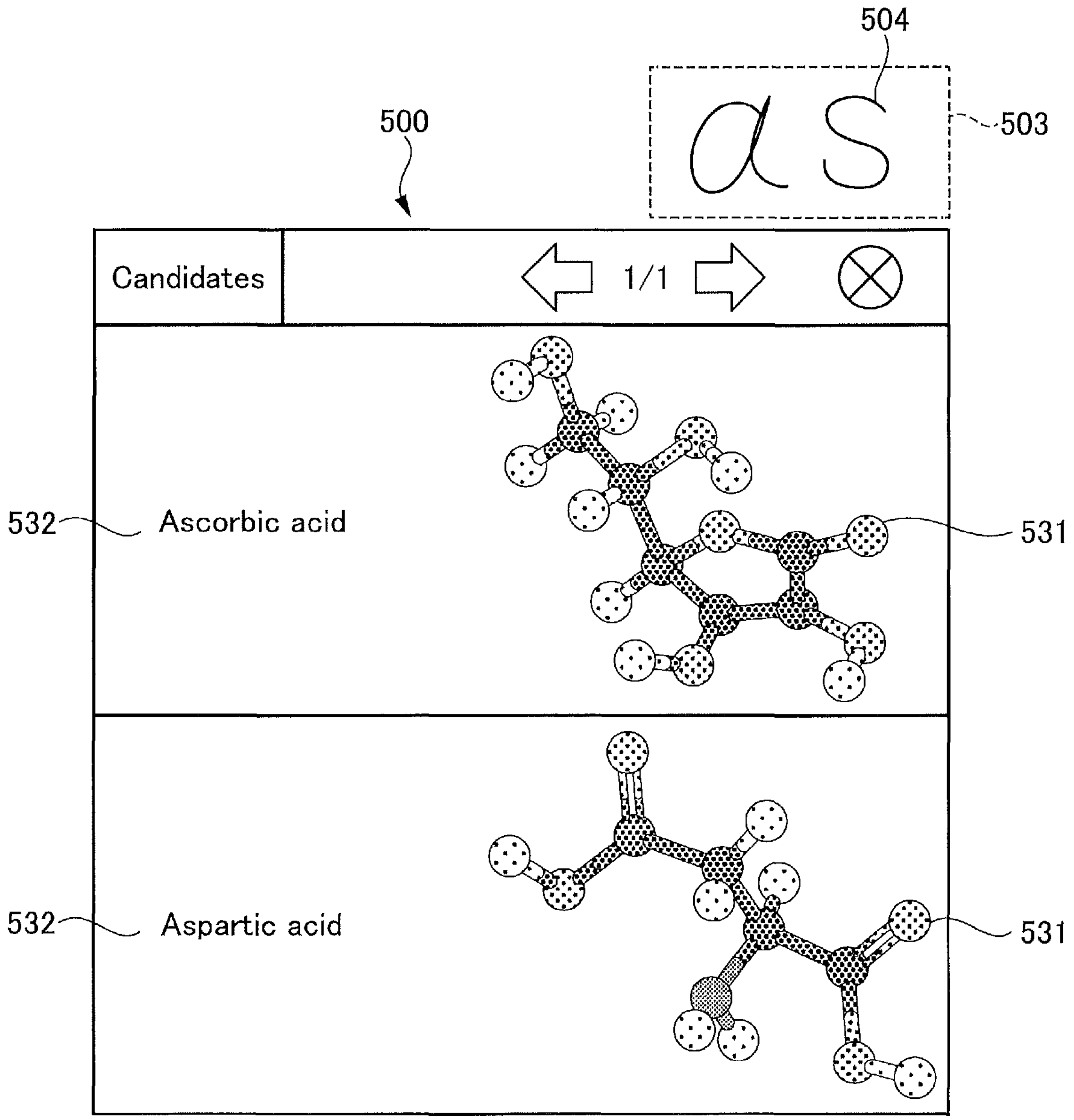
FIG. 62 is a diagram illustrating a display example of the image candidates and the operation guide displaying the names of the image candidates when performing the English conversion.
Figure 63:
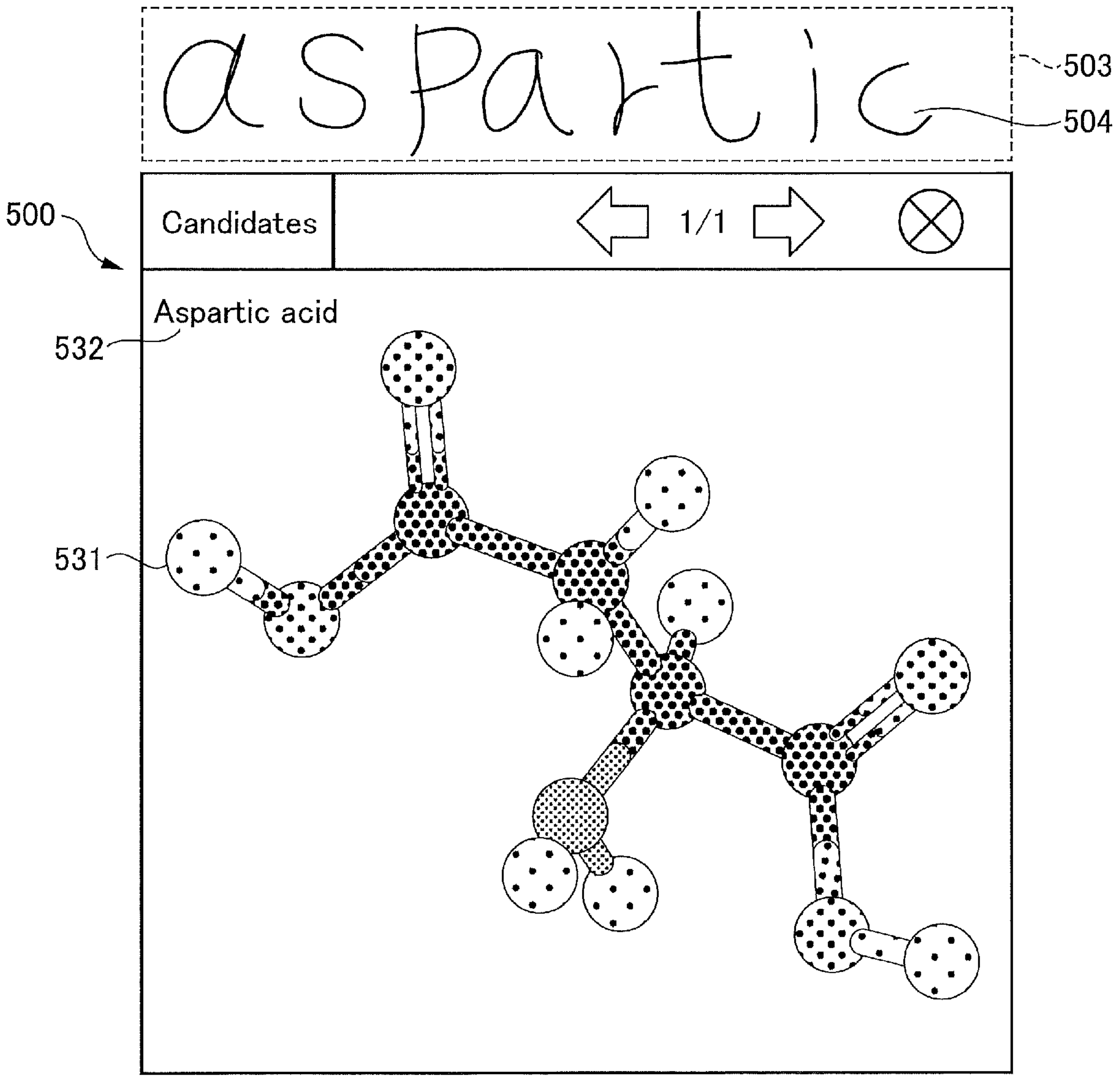
FIG. 63 is a diagram illustrating a display example of the image candidates and the operation guide displaying the names of the image candidates when performing the English conversion.

FIG. 61 through FIG. 63 illustrate an example of display of the image candidate 531, and the operation guide 500 for displaying the image candidate name 532. FIG. 61 corresponds to FIG. 58, FIG. 62 corresponds to FIG. 59, and FIG. 63 corresponds to FIG. 60, and the display method illustrated in FIG. 61 through FIG. 63 may be the same as that illustrated in FIG. 58 through FIG. 60. In the case of FIG. 61 through FIG. 63, the image transformation control part 42 also receives the name of the index field together with the image from the image transformation dictionary part 43, and transmits the received name and image to the handwritten input display control part 23. Accordingly, the operation guide 500 can display the name of the image candidate.

<Example of Specifying Selected Object>

Figure 64A:
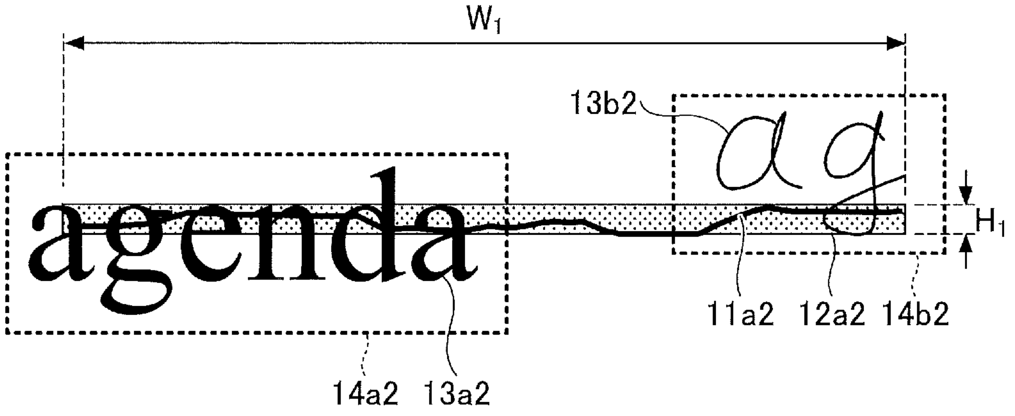
FIG. 64A and FIG. 64B are diagrams for explaining a specifying example of the selected object when performing the English conversion.
Figure 64B:
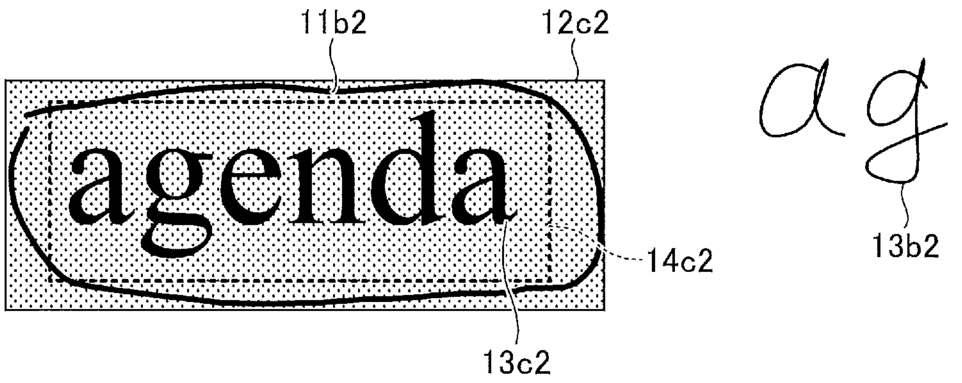

FIG. 64A and FIG. 64B illustrate an example of a diagram illustrating a specification example of a selected object in the case of an English conversion. In the description of FIG. 64A and FIG. 64B, the differences from FIG. 25A through FIG. 25D will mainly be described.

FIG. 64A illustrates an example in which two decided objects 13*a*2 and 13*b*2 written horizontally are specified by the user using the striding line (handwritten object 11*a*2). In this example, the length H1 of the shorter side and the length W1 of the longer side of the handwritten object rectangular region 12*a*2 satisfy the striding line determination condition 406, and the overlap rate of the handwritten object rectangular region 12*a*2 with respect to the decided objects 13*a*2 and 13*b*2 satisfies the striding line determination condition 406. For this reason, the decided objects 13*a*2 and 13*b*2 of both “agenda” and “ag” are specified as the selected objects.

FIG. 64B illustrates an example in which the decided object 13*c*2 written horizontally is specified by the user using the enclosure line (handwritten object 11*b*2). In this example, only the decided object 13*c*2 “agenda”, which satisfies the enclosure line determination condition 407, is specified as the selected object.

Accordingly, in the case of English conversion, the user can similarly select the decided object.

<Display Example of Operating Command Candidates>

Figure 65A:
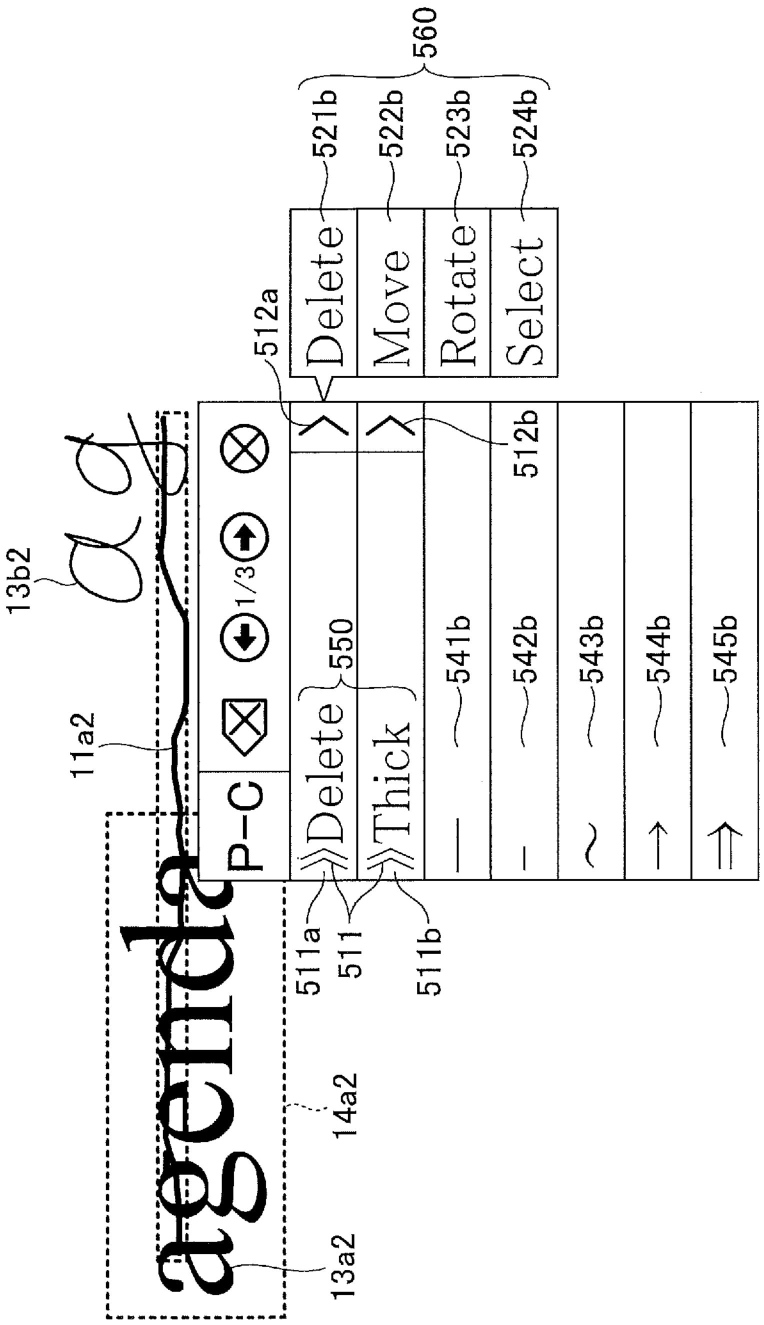
FIG. 65A and FIG. 65B are diagrams illustrating a display example of the operation command candidates based on the operation command definition data when the handwritten object illustrated in FIG. 64A
Figure 65B:
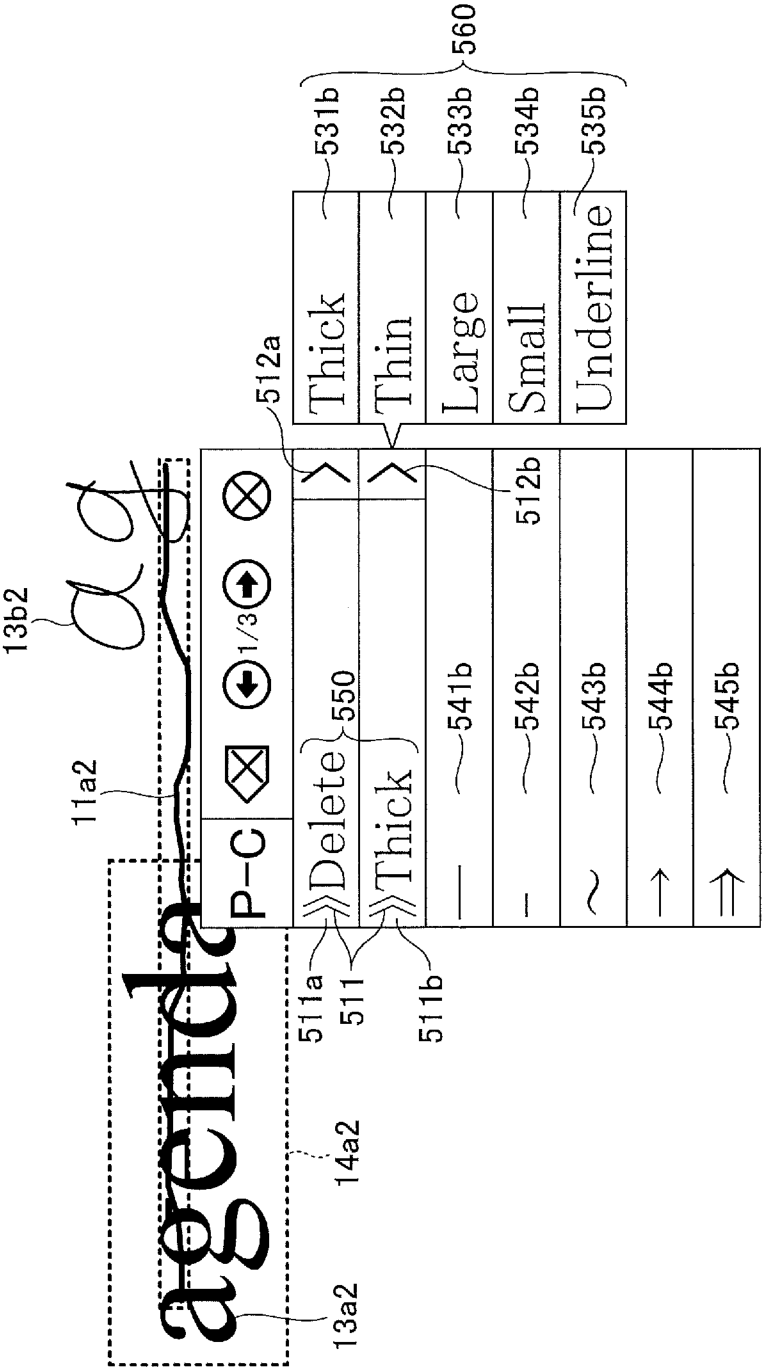

FIG. 65A and FIG. 65B illustrate a display example of the operation command candidates based on the operation command definition data in the presence of the handwritten object illustrated in FIG. 64A and FIG. 64B. In the description of FIG. 65A and FIG. 65B, the differences from FIG. 26A and FIG. 26B will mainly be described.

FIG. 65A illustrates the operation command candidate for the editing system, and FIG. 65B illustrates the operation command candidate for the decorating system. FIG. 65A illustrates an example in which the decided object is specified in the handwritten object 11*a*2 illustrated in FIG. 64A. As illustrated in FIG. 65A and FIG. 65B, the main menu 550 includes the operation command candidate displayed after the bullet character “>>” 511.

In FIG. 65A, the sub menu 560 illustrated in FIG. 65A is displayed by pressing the end-of-line character “>” 512*a* of the first line. When the user presses any of the operation command names by the pen, the handwritten input display control part 23 executes the “Command” of the operation command definition data corresponding to the operation command name with respect to the selected object. In other words, “Delete” is executed when a “Delete” button 521*b* is selected, “Move” is executed when a “Move” button 522*b* is selected, “Rotate” is executed when a “Rotate” button 523*b* is selected, and “Select” is executed when a “Select” button 524*b* is selected.

When the user presses the “Delete” button 521*b* with the pen, the handwritten input display control part 23 deletes the decided objects 13*a*2 and 13*b*2 “agenda” and “ag”. When the user presses the “Move” button 522*b* with the pen, the handwritten input display control part 23 accepts the movement of the decided objects 13*a*2 and 13*b*2 “agenda” and “ag”. When the user presses the “Rotate” button 523*b* with the pen, the handwritten input display control part 23 rotates the decided objects 13*a*2 and 13*b*2 “agenda” and “ag” by a predetermined angle. When the user presses the “Select” button 524*b* with the pen, the handwritten input display control part 23 accepts the selection of the decided objects 13*a*2 and 13*b*2 “agenda” and “ag”.

Character string candidates other than the operation command candidates, such as “-” 541*b*, “-,” 542*b*, “~” 543*b*, “→” 544*b*, and “⇒” 545*b*, are the recognition results of the striding line (handwritten object 11*a*2). Hence, if the user intends to input the character string and not the operation command, the character string candidate can be selected.

In FIG. 65B, when the user presses the end-of-line character “>” 512*b* of the second line, the sub menu 560 is displayed on the right side thereof. Similar to FIG. 65A, FIG. 65B illustrates the example in which both the main menu 550 and the sub menu 560 are displayed. When “Thick” 531*b* is selected based on the operation command definition data illustrated in FIG. 55, the handwritten input display control part 23 executes “Thick” on the selected object to make the selected object thick. When “Thin” 532*b* is selected, the handwritten input display control part 23 executes “Thin” with respect to the selected object to make the selected object thin. When “Large” 533*b* is selected, the handwritten input display control part 23 executes “Large” with respect to the selected object to make the selected object large. When “Small” 534*b* is selected, the handwritten input display control part 23 executes “Small” with respect to the selected object to make the selected object small. When “Underline” 535*b* is selected, the handwritten input display control part 23 executes “Underline” with respect to the selected object to underline the selected object.

When the user presses “Thick” 531*b* with the pen, the handwritten input display control part 23 thickens the lines forming the decided objects 13*a*2 and 13*b*2 “agenda” and “ag”. When the user presses “Thin” 532*b* with the pen, the handwritten input display control part 23 narrows the lines forming “agenda” and “ag”. When the user presses “Large” 533*b* with the pen, the handwritten input display control part 23 enlarges the characters. When the user presses “Small” 534*b* with the pen, the handwritten input display control part 23 reduces the characters. When the user presses “Underline” 535*b* with the pen, the handwritten input display control part 23 can add underlines to the characters.

Accordingly, the user can cause the operation commands to be displayed when the handwritten object is present, even in the case of the English conversion.

<Input Example of Angular Information>

Figure 66A:
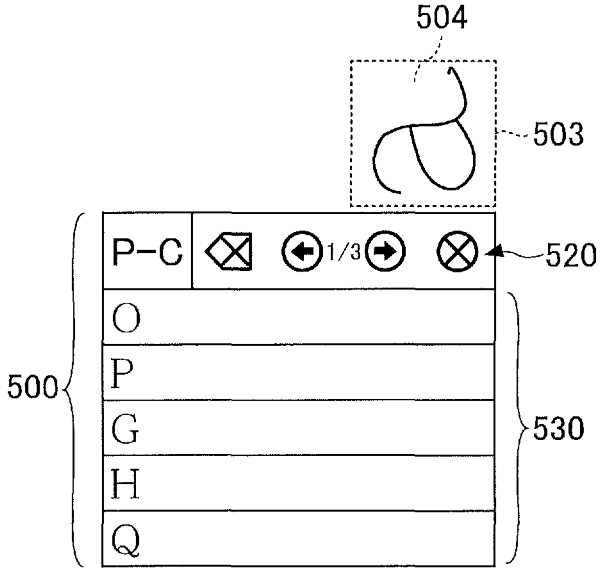
FIG. 66A, FIG. 66B, and FIG. 66C are diagrams for explaining an example of a method of inputting the angular information when performing the English conversion.
Figure 66B:
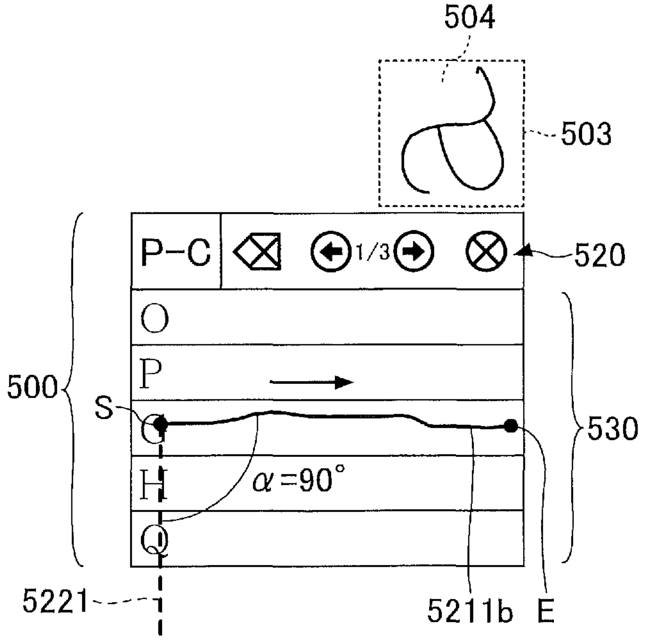
Figure 66C:
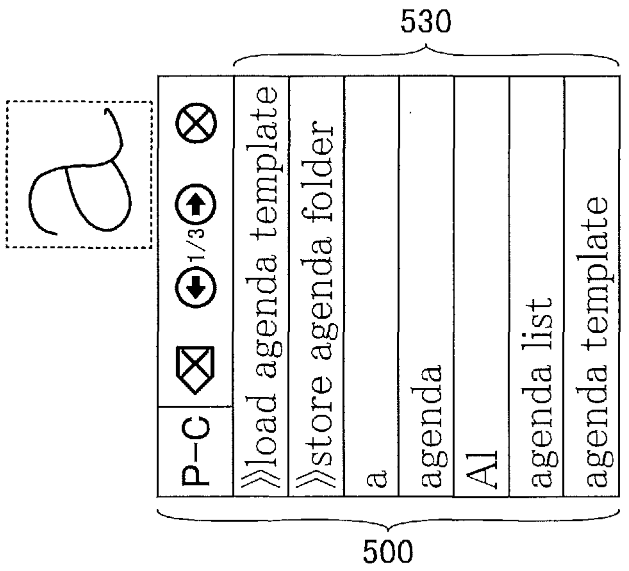

Next, FIG. 66A through FIG. 66C are diagrams illustrating an example of the input method of angular information. In the case of the English conversion, the input method of the angular information is the same as that of the Japanese conversion. In the description of FIG. 66A through FIG. 66C, the differences from FIG. 28A through FIG. 28C are mainly described.

FIG. 66A illustrates a state where the operation guide 500 is displayed because the user positioned in the 3 o'clock direction from the display device 2 handwrites the character “a” in the state where the angular information of the pen ID control data is 0 degrees (initial value). Because the display device 2 recognizes the character “a” handwritten from the 3 o'clock direction with the angular information maintained at 0 degrees, the selectable candidate 530 that is different from the anticipated selectable candidate is displayed.

When inputting the angular information, the user handwrites the straight line from the top to bottom when viewed from the user. FIG. 66B illustrates an example of a straight line 5211*b*. The angular information is the angle α formed in the counterclockwise direction between the straight line 5211*b* and the 6 o'clock direction which is the angular information of 0 degrees.

FIG. 66C illustrates the operation guide 500 immediately after the operation illustrated in FIG. 66B is performed. Because 90 degrees is set as the angular information (“Angle”) in the pen ID control data, the handwritten object (stroke data) is internally rotated clockwise by 90 degrees to be subject to the handwriting recognition, and the operation guide 500 is rotated counterclockwise by 90 degrees and displayed. The angular information may be input manually by the user from the menu.

Accordingly, the user can input the angular information also in the case of English conversion.

<Registration Example of Handwritten Signature Data>

Figure 67A:
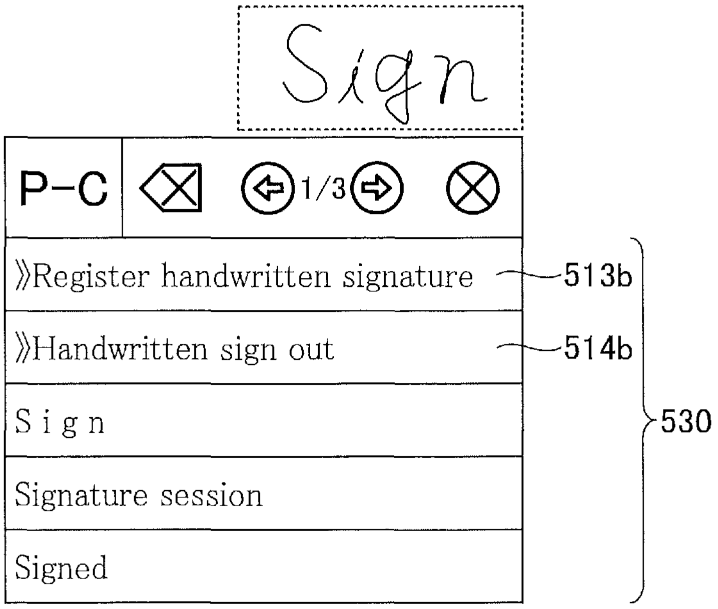
FIG. 67A, FIG. 67B, and FIG. 67C are diagrams illustrating a method of registering a handwritten signature data in the case of an English conversion.
Figure 67B:
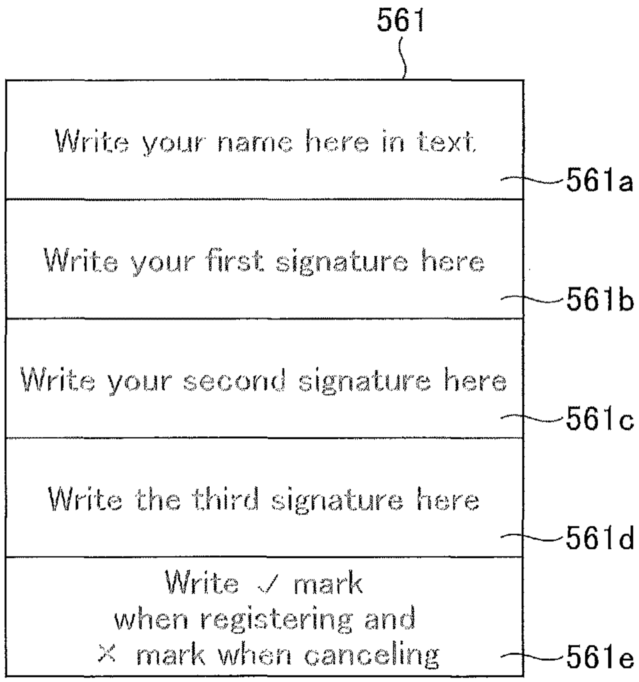
Figure 67C:
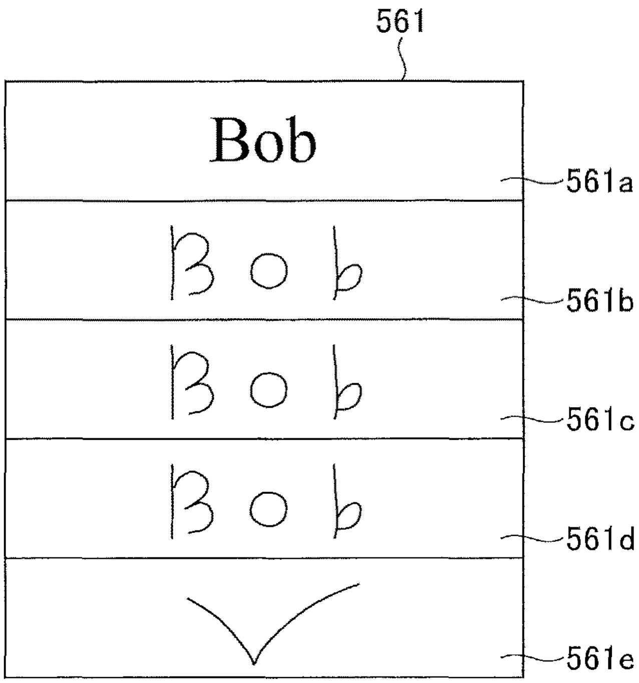

Next, FIG. 67A through FIG. 67C are diagrams illustrating a method of registering handwritten signature data. In the description of FIG. 67A through FIG. 67C, the differences from FIG. 30A through FIG. 30C are mainly described. First, FIG. 67A illustrates an example of the selectable candidate 530 displayed when the user handwrites the character string "Sign". The two operation commands 513*b* and 514*b* "Register handwritten signature" and "Hand sign out" based on the operation command definition data 713 and 715, and the character string candidates "Sign", "Signature session", and "Signed", which partial match the character string "Sign", are displayed.

When the user presses "Register handwritten signature" with the pen 2500, the handwritten signature registration form 561 illustrated in FIG. 67B is added to the handwritten input storage part 25, and is displayed on the operation screen 101. For example, the operation guide 500 illustrated in FIG. 67A is deleted, and the handwritten signature registration form 561 is displayed at the same position as the operation guide 500.

The user inputs the text of the name in the name input field 561*a*, the first-time handwritten signature in the signature input field 561*b*, the second-time handwritten signature in the signature input field 561*c*, and the third-time handwritten signature in the signature input field 561*d*, and the check mark or cancellation mark in the registration confirmation field 561*e*.

Accordingly, when the user writes the handwritten signature registration form 561 as directed, the handwritten signature registration form 561 becomes the handwritten signature registration form 561 illustrated in FIG. 67C.

As described above, the handwritten input display control part 23 can accept the handwritten input without distinguishing between the handwritten input to the form and the handwritten input to other than the form. The user can register the handwritten signature data using English.

<Example of Handwritten Sign In>

Figure 68:
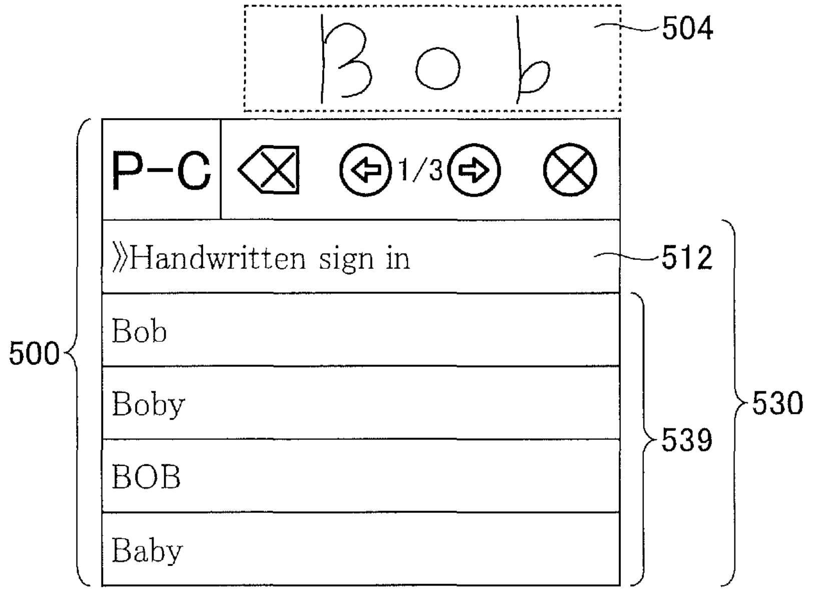
FIG. 68 is a diagram illustrating an example of the operation guide displayed in a case where "Bob", which is the registered handwritten signature data, is handwritten by the user when performing the English conversion.

FIG. 68 illustrates an example of the operation guide 500 that is displayed in the case of the English conversion, when the user handwrites the character string "Bob", which is the registered handwritten signature data. In the description of FIG. 68, the differences from FIG. 31 will mainly be described.

Because the character string "Bob" is registered in the handwritten signature data storage part 39 as the handwritten signature data, the character string "Bob" matches the registered handwritten signature data. Hence, the operation command 512 "Hand Sign in", which is an abbreviation for "Handwritten sign in", is displayed.

In addition, because the handwritten signature data matches the registered handwritten signature data, "SignatureId" representing "Bob" is identified, and user definition data including "AccountId" corresponding to "SignatureId" is identified.

When the user selects the operation command 512 "Hand Sign in", "AccountID" of "Bob" is added to the pen ID control data in correspondence with the pen ID of the pen 2500 that is being used by the user, so that the user definition data of the character string "Bob" is used when utilizing the operation command.

Accordingly, the user can sign in using English.

<Example of User Definition Data Changing Operation>

Figures 69A, 69B:
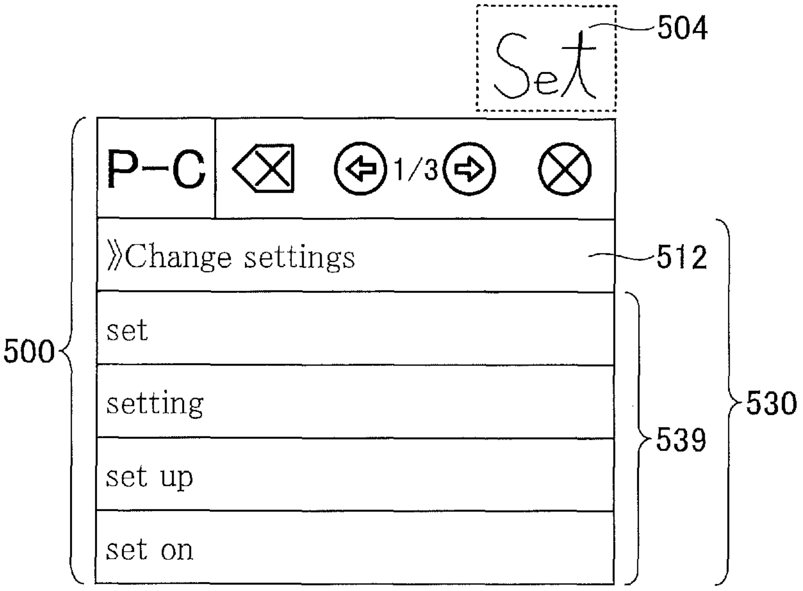
FIG. 69A and FIG. 69B are diagrams for explaining a method of changing the user definition data when performing the English conversion.

FIG. 69A and FIG. 69B are diagrams illustrating a method of changing the user definition data in the case of the English conversion. In the description of FIG. 69A and FIG. 69B, the differences from FIG. 32A and FIG. 32B will mainly be described. FIG. 69A illustrates an example of the operation guide 500 that is displayed when the user handwrites the character string "set". The operation command definition data 716 defines the character string "set" in "String", and the operation command "Change settings" is displayed.

If the user selects "Change setting" with the pen 2500 that was used for the handwritten sign in, "AccountId" corresponding to the pen ID of this pen 2500 is identified from the pen ID control data. Hence, the user definition data of the user who signed is identified, and the user definition data change form 562 illustrated in FIG. 69B is added to the handwritten input storage part 25 and displayed on the operation screen 101. Each of the items of the user definition data change form 562 is similar to that in FIG. 32B.

Accordingly, the user can change the user definition data in the case of English conversion, similar to the Japanese conversion.

<Display Example of Image Candidates>

Hereinafter, a display example of the image candidates in the case of English conversion will be described.

Figure 70:
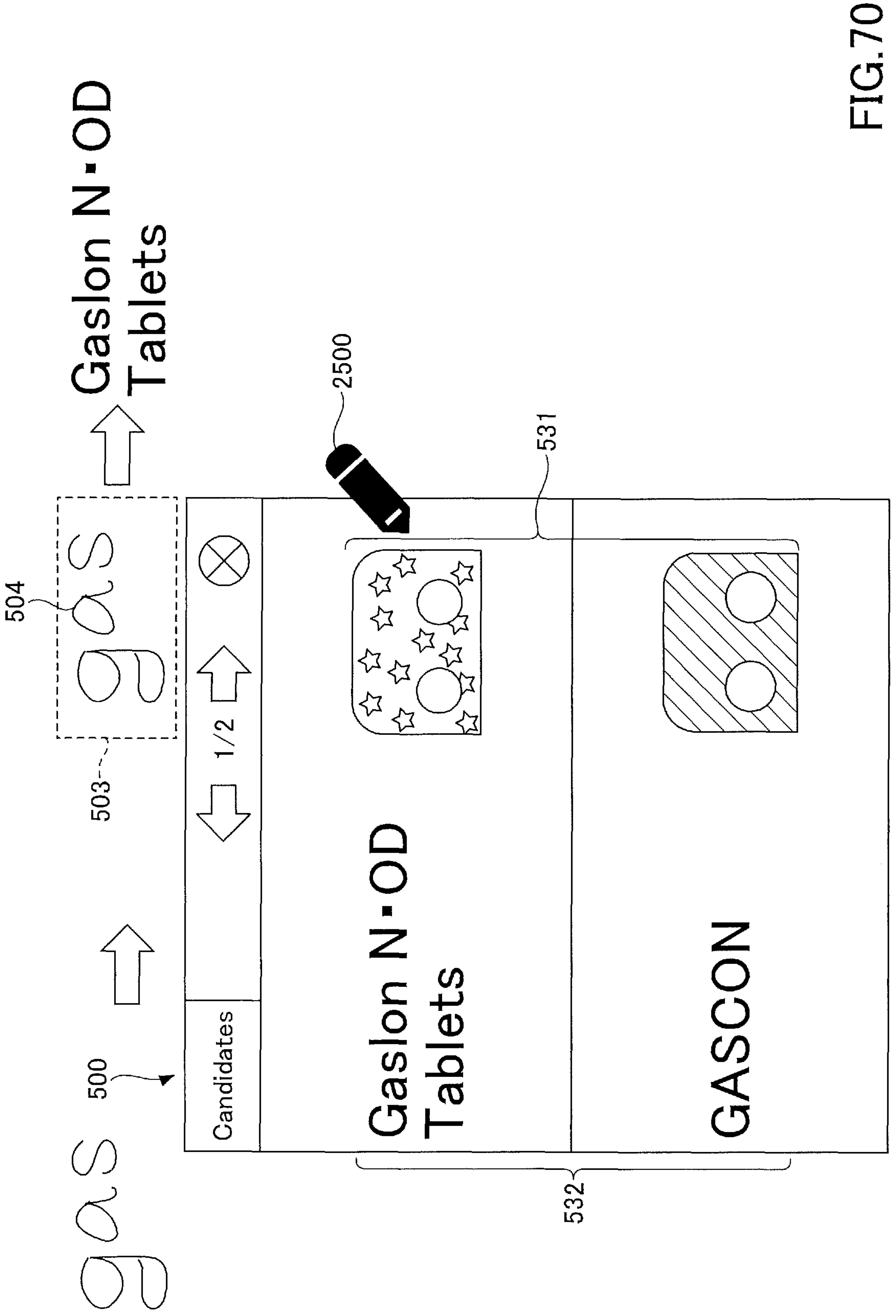
FIG. 70 is a diagram illustrating an example of the operation guide displaying the image candidates of the pharmaceutical products.

FIG. 70 illustrates an example of the operation guide 500 for displaying image candidates 531 of pharmaceutical products. In the description of FIG. 70, the differences from FIG. 40 will mainly be described. In FIG. 70, the user handwrites the character string "gas", in order to display tablets having names beginning with the character string "gas" on the display device 2. The image transformation control part 42 performs the search in the image transformation dictionary part 43 using the character string "gas", and displays two image candidates 531 having a forward match with the character string "gas". In this example, the user intended to display "Gaslon N•OD Tablets (registered trademark". However, because "Gaslon N•OD Tablets (registered trademark)" is similar to "GASCON (registered trademark)", there is a possibility of erroneously selecting "GASCON (registered trademark)". Even in such a case, because the distinctive packages of the pharmaceutical products are displayed as the image candidates 531, the user can positively select the intended tablet being handwritten by the user.

Such a display of the distinctive packages is also useful in cases where the user can remember the package appearance of the product but does not clearly remember the product name. In FIG. 70, only the characters (product name) of the selected image candidate 531 is displayed when the image candidate 531 of the operation guide 500 is selected.

Figure 71:
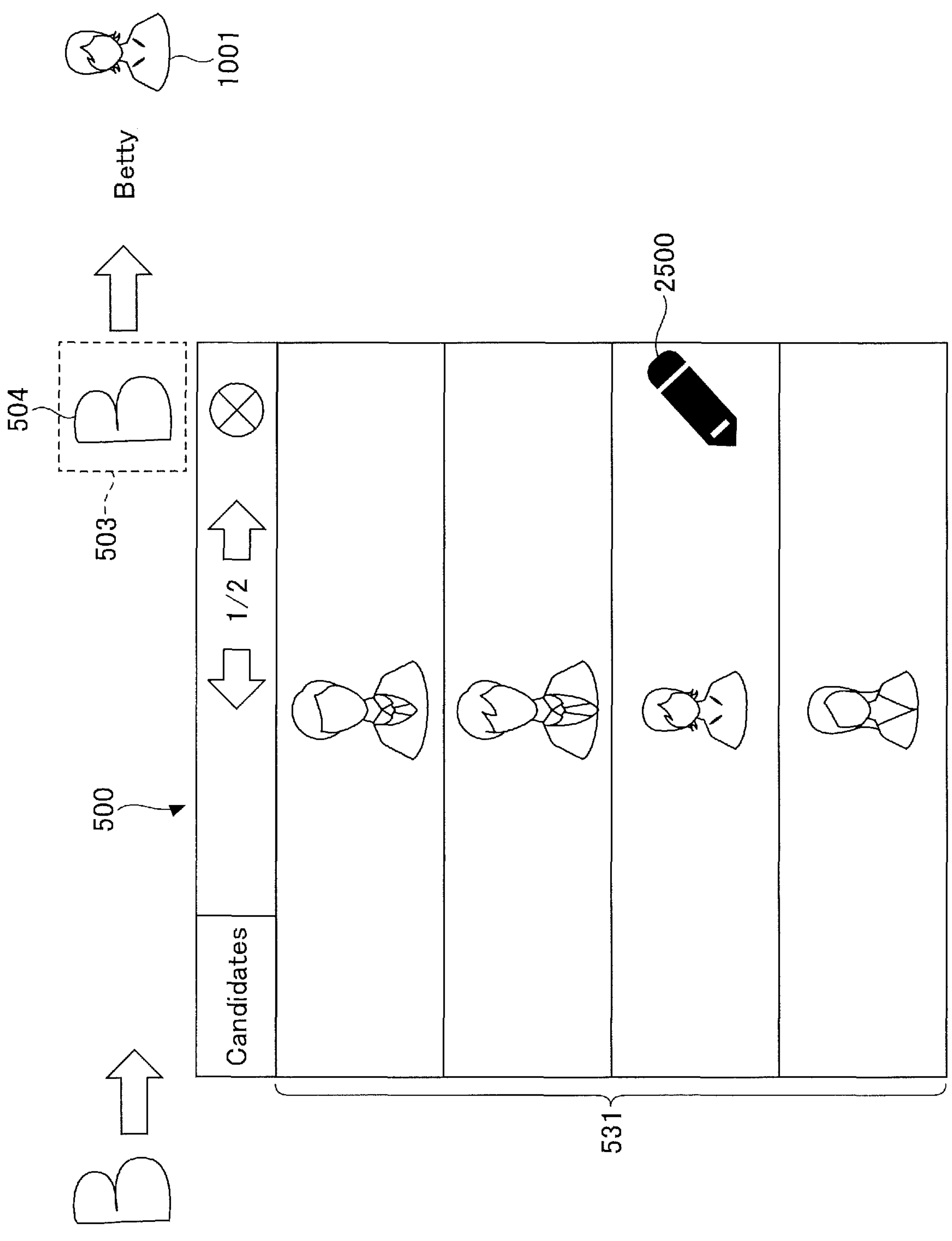
FIG. 71 is a diagram illustrating an example of the operation guide displaying the image candidates of portrait photographs when performing the English conversion.

FIG. 71 illustrates an example of the operation guide for displaying the image candidates of photographs of people. In the description of FIG. 71, the differences from FIG. 41 will mainly be described. In FIG. 71, the user handwrites the character "B", in order to display the names of the people beginning with the character "B" on the display device 2. The image transformation control part 42 performs the search in the image transformation dictionary part 43 using the character "B", and displays the four image candidates with the names having a forward match with the character "B". Even if the names starting with the character "B" are similar, the image candidates 531 are photographs of the people, which enable the user to positively select the intended name of the person being handwritten by the user. Such a display of the photographs of the people is also useful in cases where the user can remember the person's face but does not clearly remember the person's name. In FIG. 71, the image 1001 and the characters (person's name) of the selected image candidate 531 are displayed when the image candidate 531 of the operation guide 500 is selected. The image 1001 may be displayed near the characters, such as above, below, on the left, or on the right of the characters (person's name). The image 1001 may be displayed at positions other than near the characters (person's name).

Figure 72:
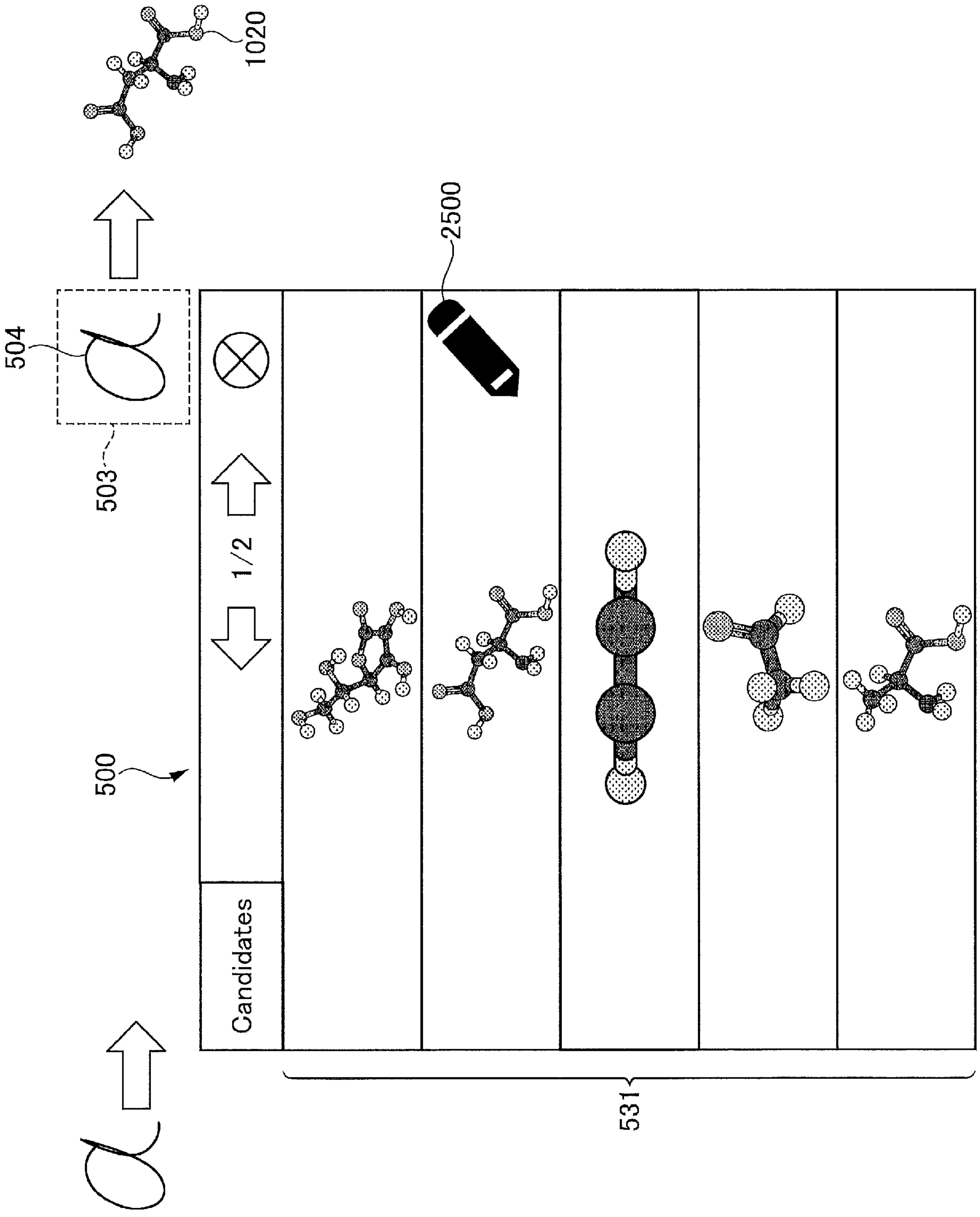
FIG. 72 is a diagram illustrating an example of the operation guide displaying the image candidates of the molecular structure models when performing the English conversion.

FIG. 72 illustrates an example of the operation guide 500 for displaying molecular structure models as the image candidates 531, similar to FIG. 2. In the description of FIG. 72, the differences from FIG. 42 will mainly be described. In FIG. 72, only the image 1001 (molecular structure model) is displayed when the user selects the image candidate 531. In other words, characters such as the names are not displayed in this example. Such a display of only the image 1001 after the selection of image candidate 531 is useful in cases where the structure of the image conveys the meaning of the information more effectively than the characters. For example, in a conference of experts, it may be possible to share not only the name but also the functions by looking at the molecular model. In addition, when a teacher explains the shape or the like of an object in a classroom or the like, it is easier to explain the structure of the object when compared to using only the characters or names to explain the structure.

As illustrated in FIG. 70 through FIG. 72, when the image candidate 531 of the operation guide 500 is selected, the display device 2 can display only the image, the image and the name, or only the name, also in the case of the English conversion. Because the preferred display method depends on the user and the situation, the user can set the display method from the operation header 520, or from a menu that is displayed in response to the long press of the operation guide 500.

<3DCG Image Candidates>

Figure 73:
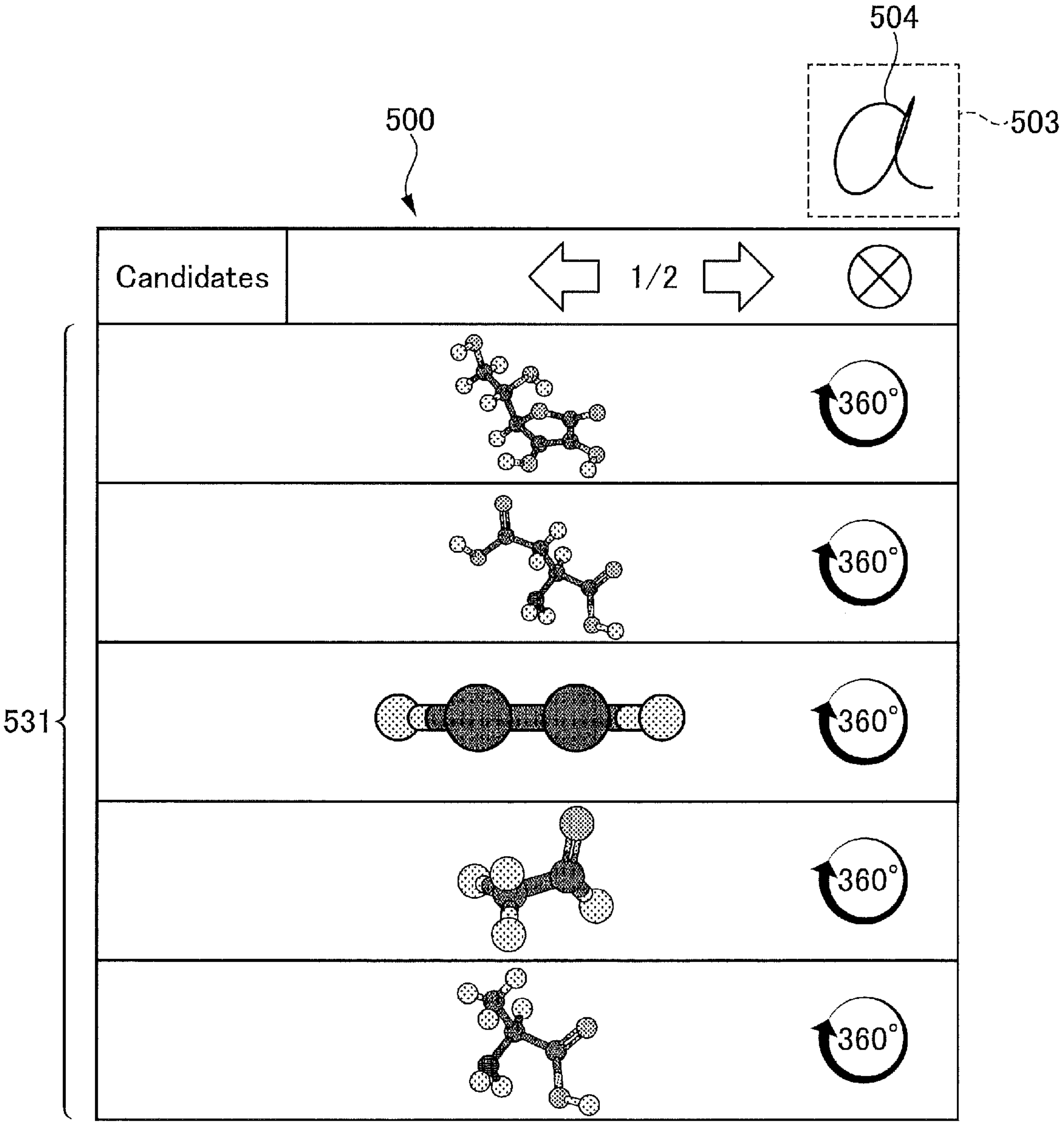
FIG. 73 is a diagram illustrating an example of the operation guide displaying the image candidates of the molecular structure models in 3DCG when performing the English conversion.
Figure 74:
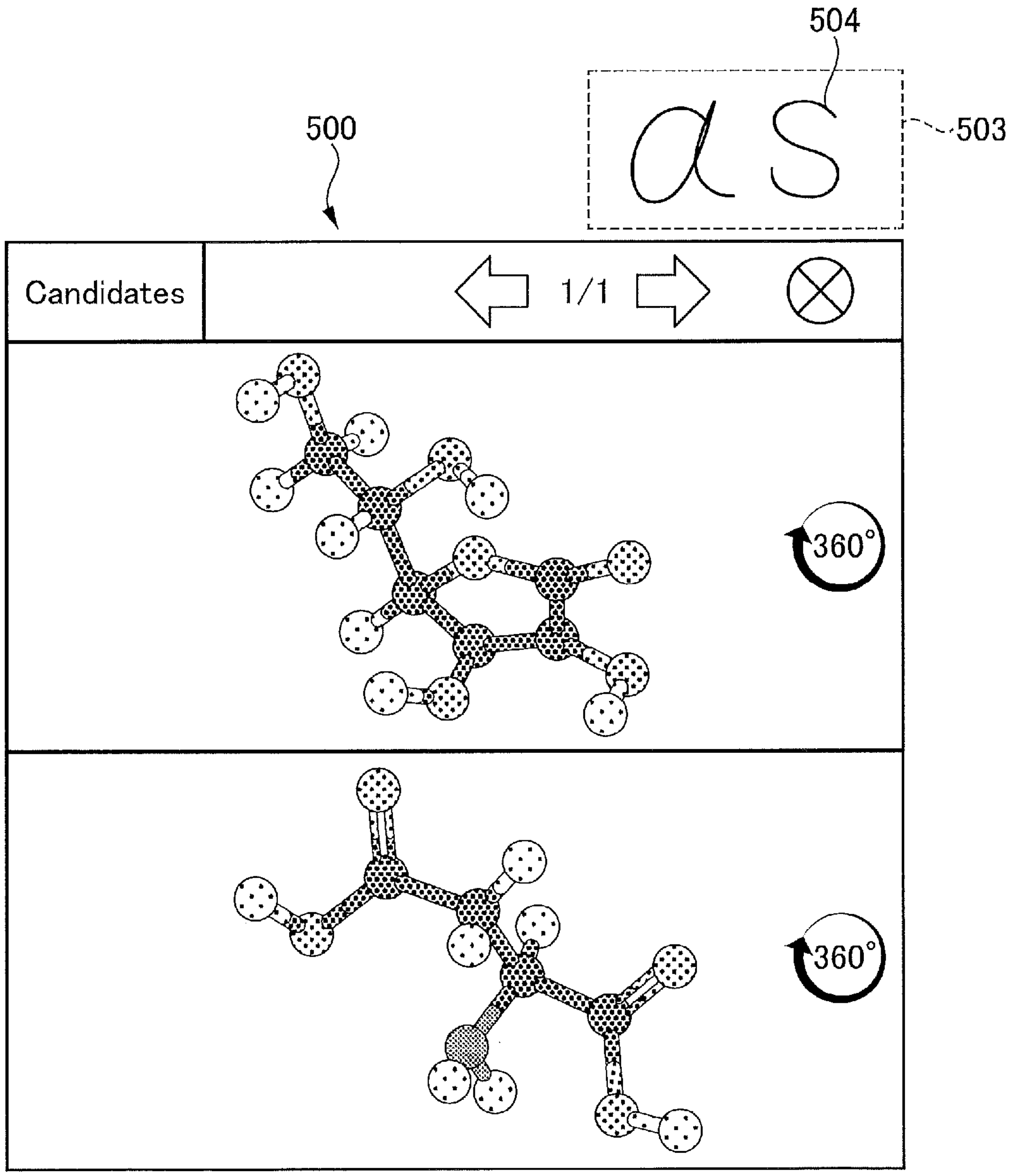
FIG. 74 is a diagram illustrating an example of the operation guide displaying the image candidates of the molecular structure models in 3DCG when performing the English conversion.
Figure 75:
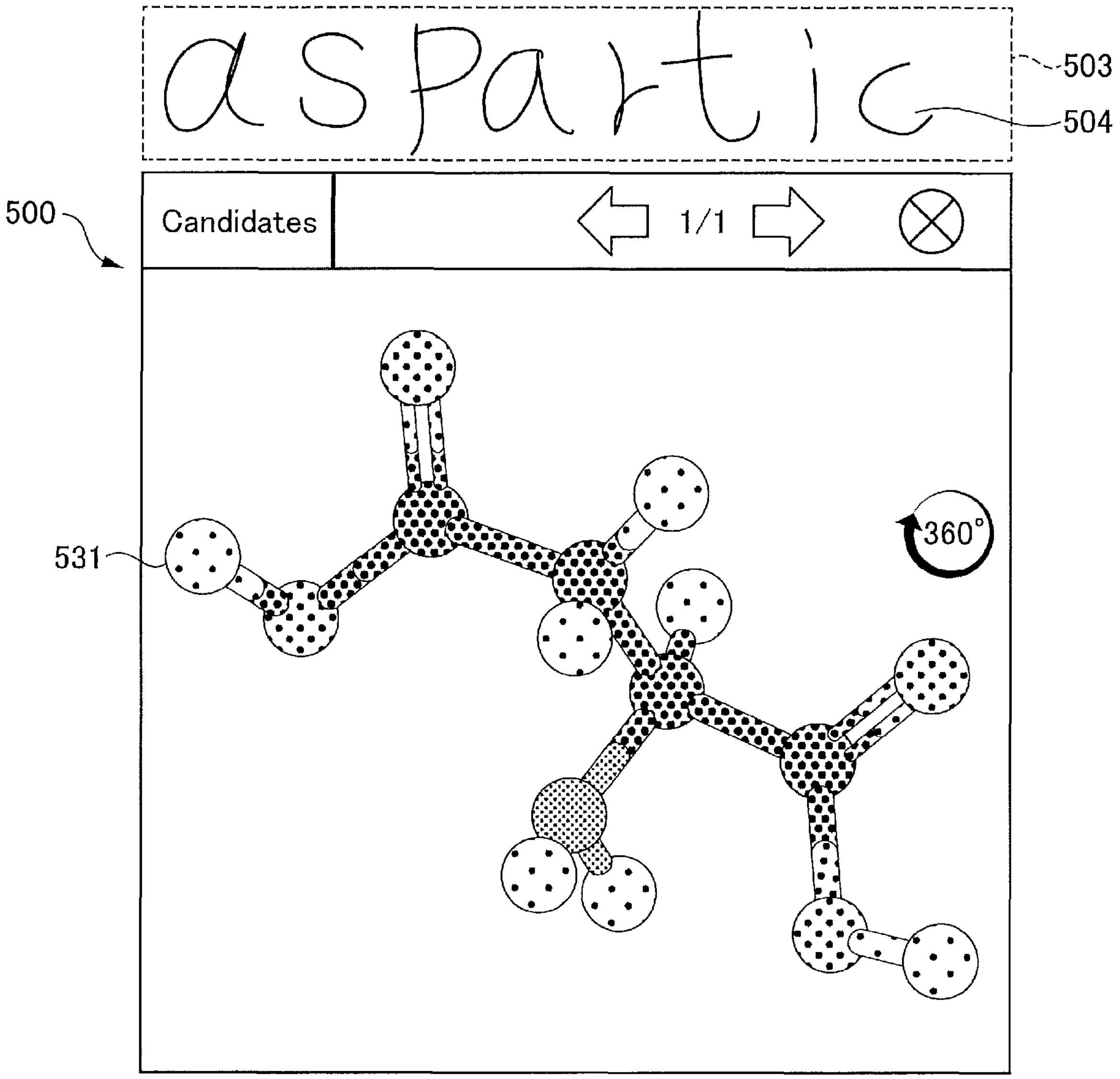
FIG. 75 is a diagram illustrating an example of the operation guide displaying the image candidates of the molecular structure models in 3DCG when performing the English conversion.

FIG. 73 through FIG. 75 illustrate examples of the operation guide 500 that display the 3DCG of the molecular structure models as the image candidates, in the case of the English conversion. In the description of FIG. 73 through FIG. 75, the differences from FIG. 43 through FIG. 45 will mainly be described. In FIG. 73 through FIG. 75, the image candidates are generated by the 3DCG. The display method employed in FIG. 73 through FIG. 75 may be similar to that employed in FIG. 19 through FIG. 21. In FIG. 73 through FIG. 75, because the image candidates 531 displayed by the operation guide 500 are the 3DCG, the user can rotate the image candidates 531 up, down, left, and right using the pen 2500 or the like. Hence, the user can confirm the structure that is not visible on the display at first but becomes visible after being rotated on the display, for example, before selecting the image candidate 531.

<Display of Related Image Candidates>

Figure 76:
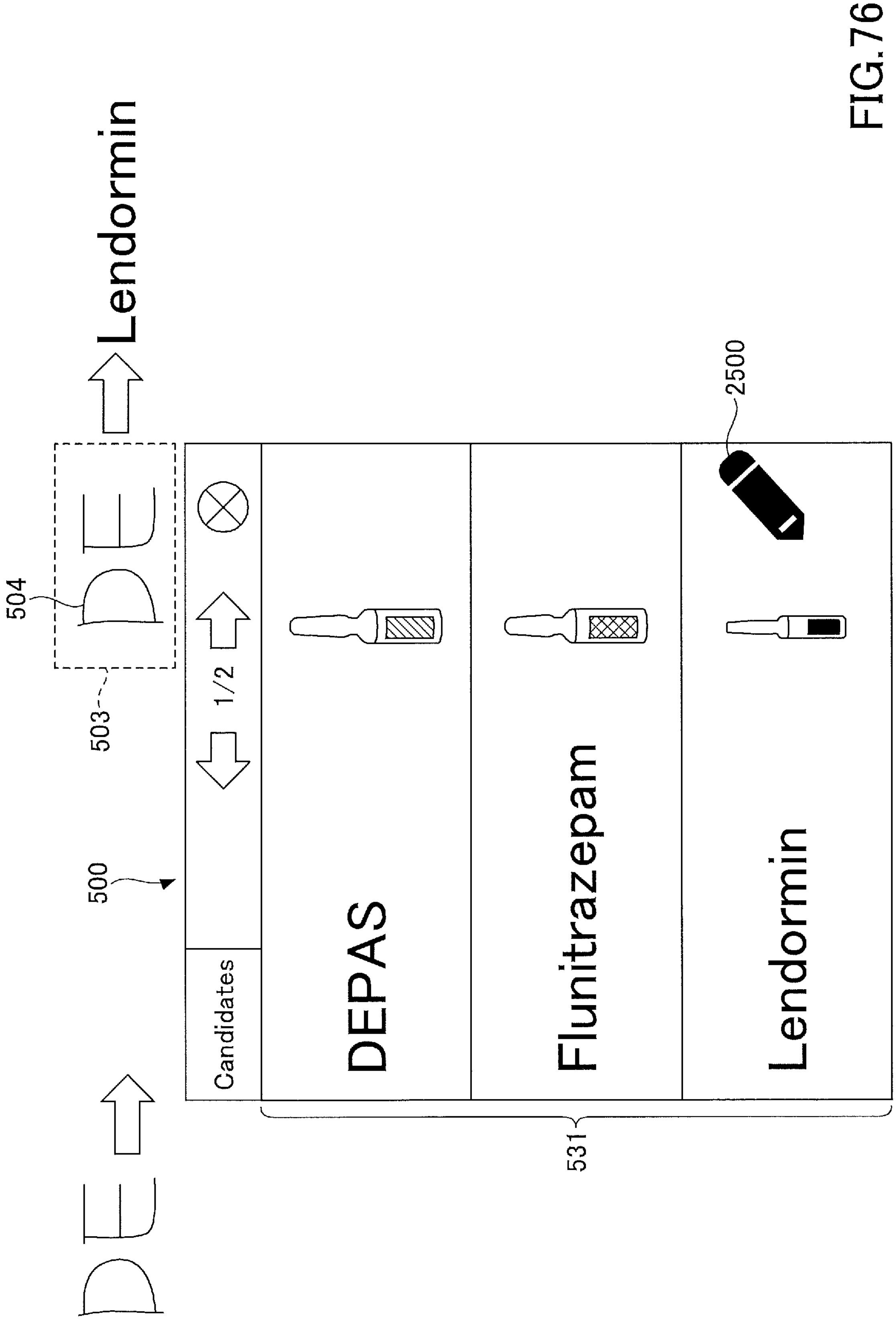
FIG. 76 is a diagram illustrating an example of the operation guide displaying the image candidates of pharmaceutical products when performing the English conversion.

FIG. 76 illustrates an example of the operation guide 500 for displaying image candidates 531 of the pharmaceutical products in the case of the English conversion. In the description of FIG. 76, the differences from FIG. 46 will mainly be described. In FIG. 76, the user handwrites a character string "DE", in order to display drugs having similar utility or effect as the drug having the name beginning with the character string "DE" on the display device 2. The image transformation control part 42 performs the search in the image transformation dictionary part 43 using the character string "DE", and identifies the image candidate 531 with product name "DEPAS (registered trademark)" having a forward match with the character string "DE". In addition, the image transformation control part 42 identifies the image candidates 531 having the name "Flunitrazepam (registered trademark)" and the name "Lendormin (registered trademark)" related to the product name "DEPAS (registered trademark)". The user can view the image candidates 531 and select the intended or appropriate drug. For example, the user can select the drug even when the user does not fully remember the name of the drug, and can select the most appropriate drug from among the drugs having similar utility or effect. Further, the image candidates 531 having names beginning with different characters can be displayed.

In order to display the related image candidates 531 described above, the images of the image transformation dictionary part 43 may be related as illustrated in FIG. 77. In FIG. 77, the image transformation dictionary part 43 includes the item of the group ID, and the group ID is set with respect to the image. The same group ID is assigned to the images belonging to the same group. The group ID having the same value may be assigned when there is similarity from a predetermined viewpoint, such as the shape, the properties, the usages, or the like. Accordingly, the related image candidates 531 can be displayed, as illustrated in FIG. 76.

<Search By Handwritten Data>

The image transformation control part 42 may perform the search in the image transformation dictionary part 43 directly using the handwritten data, also in the case of the English conversion. In this case, the handwritten data may be related to the images of the image transformation dictionary part 43, as illustrated in FIG. 78. In the description of FIG. 78, the differences from FIG. 48 will mainly be described. In FIG. 78, the image transformation dictionary part 43 includes the item of the handwritten data, and handwritten data of the names correspond to the images.

The operating procedure may be similar to that of the first embodiment illustrated in FIG. 33 through FIG. 39.

Third Embodiment

In the first embodiment, it is assumed that the display device 2 includes a large touchscreen panel. However, the display device 2 is not limited to the touchscreen panel. In this embodiment, the display device is a projector type display device.

<First Example of Display Device Configuration>

Figure 79:
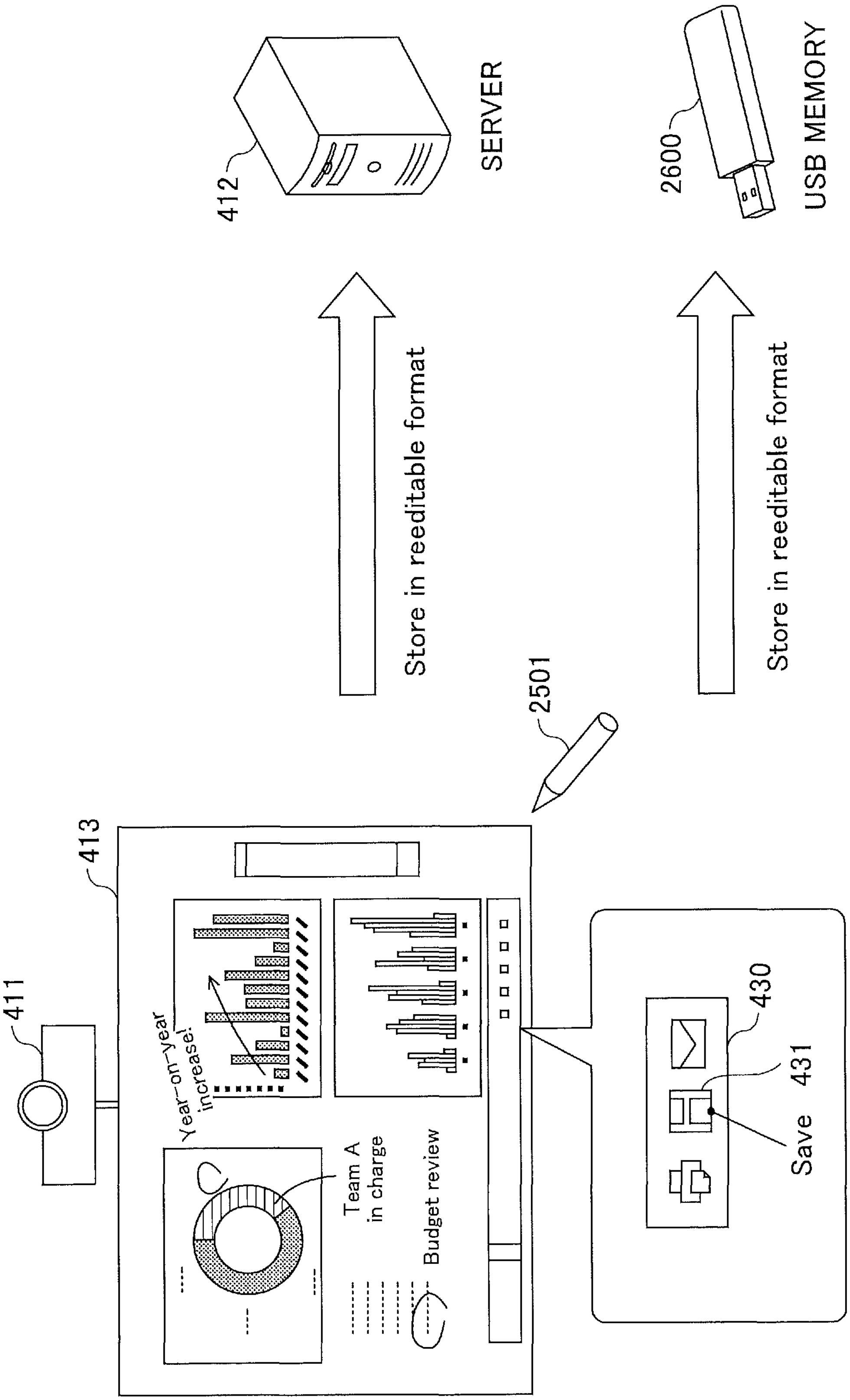
FIG. 79 is a diagram illustrating another configuration example of the display device.

FIG. 79 illustrates another configuration example of a display device. In FIG. 79, a projector 432 is provided above a conventional whiteboard 434. This projector 432 corresponds to the display device. The conventional whiteboard 434 is not a flat panel display integral with the touchscreen panel, but is a whiteboard on which the user writes directly with a marker pen. The whiteboard may be a blackboard, and simply needs to have a sufficiently large flat surface that enables images to be projected thereon.

The projector 432 includes an ultra short focus optical system, so that low-distortion images can be projected onto the whiteboard 434 from a distance of approximately 10 cm. The images may be transmitted from a PC or the like having a wireless or wired connection to the projector 432. Alternatively, the images may be stored in the projector 432.

The user handwrites on the whiteboard 434 using a dedicated electronic pen 2501. The electronic pen 2501 has a light emitting part at a tip portion, for example, and the light emitting part turns on when the user presses the pen tip against the whiteboard 434 for handwriting. The wavelength of light emitted from the light emitting part is near-infrared or infrared, and is invisible to the user's eyes. The projector 432 includes a camera that captures the light emitting part and analyzes the captured image to determine the direction of the electronic pen 2501. The electronic pen 2501 emits a sound wave together with the light, and the projector 432 calculates a distance from the electronic pen 2501 according to the arrival time of the sound wave. The projector 432 can identify the position of the electronic pen 2501 from the determined direction and the calculated distance. A stroke is drawn (projected) at the position of the electronic pen 2501.

Because the projector 432 projects a menu 430, when the user presses a button with the electronic pen 2501, the projector 432 identifies pressed button from the position of the electronic pen 2501 and an on-signal of a switch. For example, when a store button 431 is pressed, a stroke (a set of coordinates) handwritten by the user is stored in the projector 432. The projector 432 stores handwritten information in a predetermined server 433, a USB memory 2600, or the like. The handwritten information may be stored in units of pages. The coordinates are stored instead of the image data, to facilitate reediting thereof by the user. In this embodiment, however, the display of the menu 430 is not essential, because the operation commands can be called and accessed by the handwriting.

<Second Example of Display Device Configuration>

Figure 80:
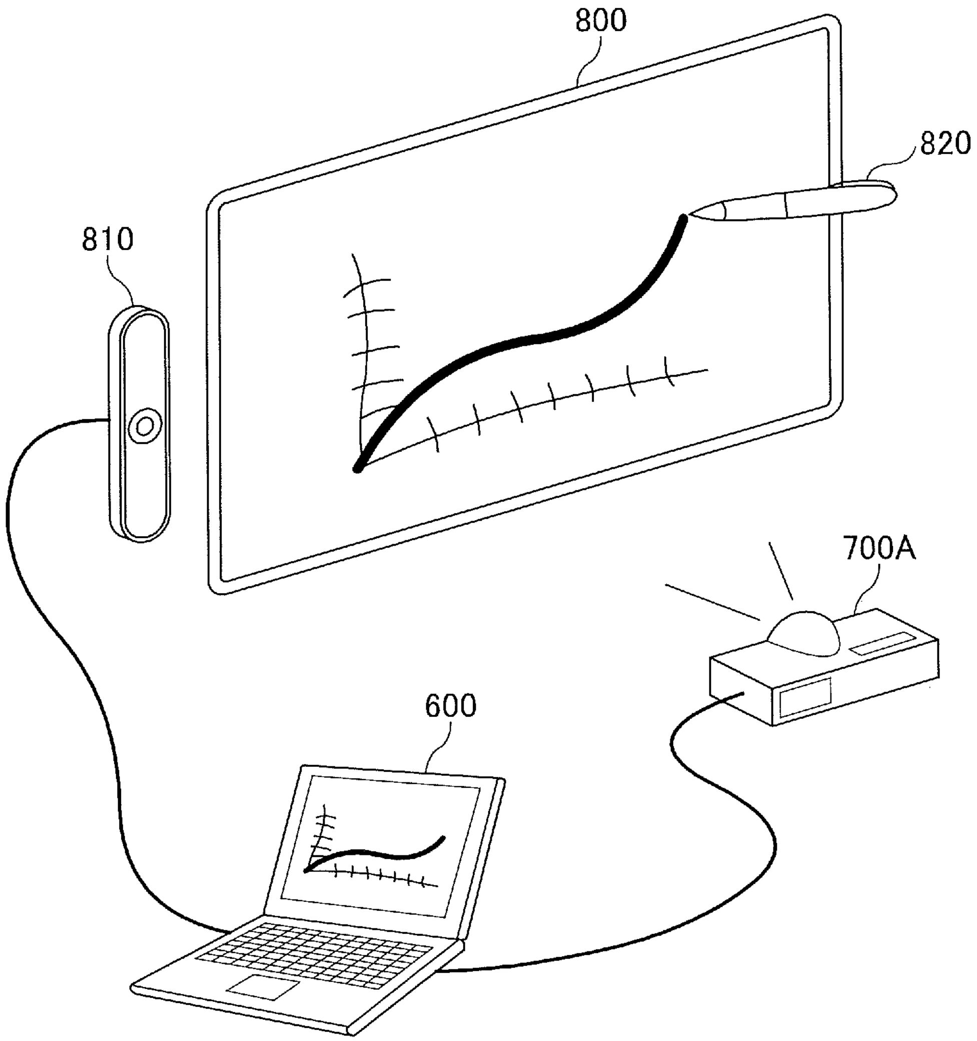
FIG. 80 is a diagram illustrating still another configuration example of the display device.

FIG. 80 is a diagram illustrating another configuration example of the display device 2. In the example illustrated in FIG. 80, the display device 2 includes a terminal device 600, an image projector device 700A, and a pen operation detecting device 810.

The terminal device 600 is wire-connected to the image projector device 700A and the pen operation detecting device 810. The image projector device 700A projects the image data input from the terminal device 600 onto a screen 800.

The pen operation detecting device 810 communicates with an electronic pen 820, and detects the operation (or motion) of the electronic pen 820 in a vicinity of the screen 800. More particularly, the electronic pen 820 detects coordinate information indicating a point on the screen 800 indicated (or pointed)) by the electronic pen 820, and transmits the coordinate information to the terminal device 600.

The terminal device 600 generates image data of a stroke image input by the electronic pen 820, based on the coordinate information received from the pen operation detecting device 810. The terminal device 600 control the image projector device 700A to draw the stroke image on the screen 800.

In addition, the terminal device 600 generates superimposed image data representing a superimposed image composed of a background image projected by the image projector device 700A and the stroke image input by the electronic pen 820.

<Third Example of Display Device Configuration>

Figure 81:
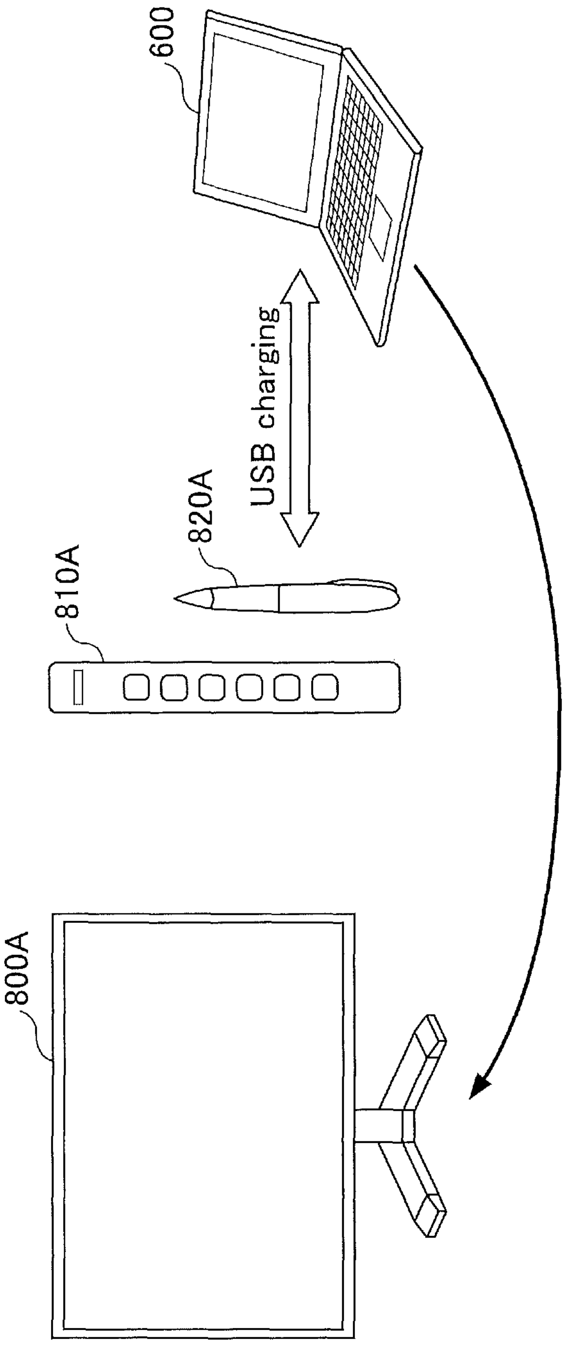
FIG. 81 is a diagram illustrating a further configuration example of the display device.

FIG. 81 is a diagram illustrating another configuration example of the display device. In the example illustrated in FIG. 81, the display device 2 includes a terminal device 600, a display 800A, and a pen operation detecting device 810A.

The pen operation detecting device 810A is arranged near the display 800A, and detects coordinate information indicating a point on the display 800A indicated (or pointed) by an electronic pen 820A, and transmits the coordinate information to the terminal device 600. In the example illustrated in FIG. 81, the electronic pen 820A may be charged by the terminal device 600 via a USB connector.

The terminal device 600 generates image data of a stroke image input by the electronic pen 820A, and displays the image data on the display 800A based on the coordinate information received from the pen operation detecting device 810A.

<Fourth Example of Display Device Configuration>

Figure 82:
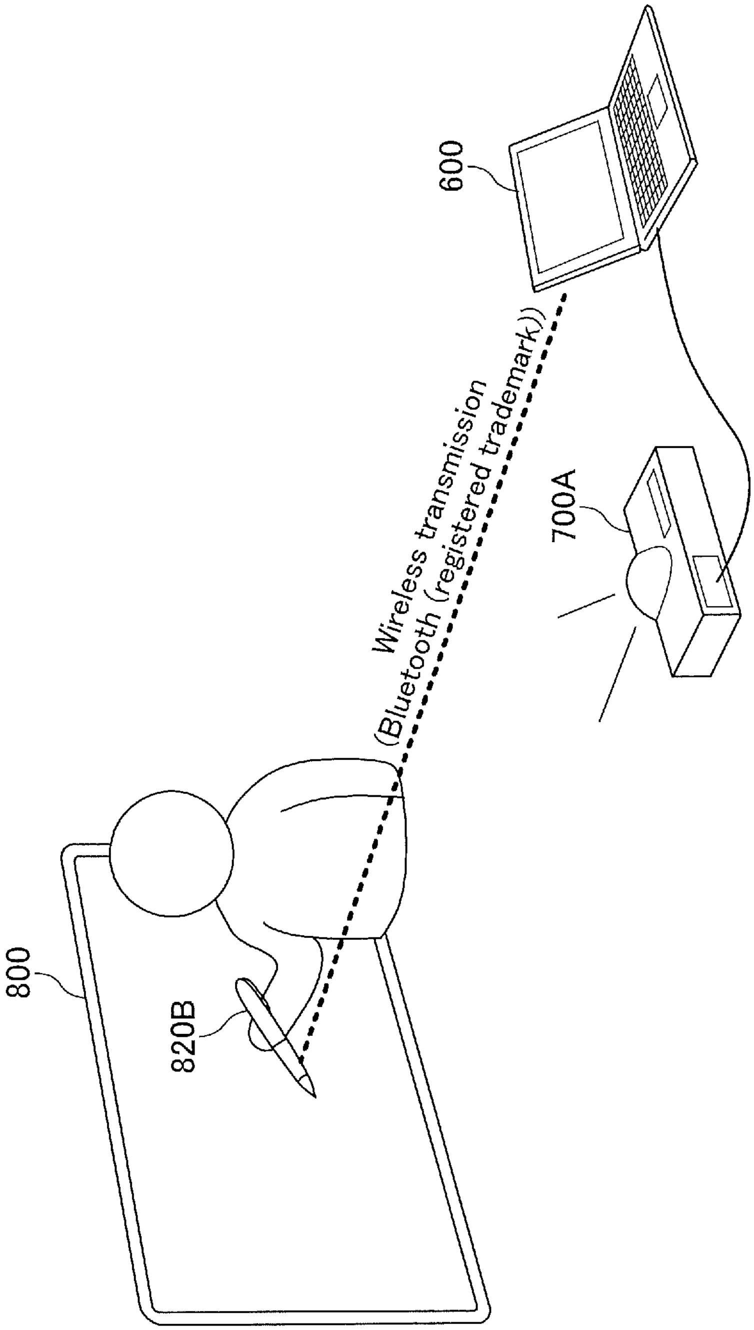
FIG. 82 is a diagram illustrating another configuration example of the display device.

FIG. 82 is a diagram illustrating another configuration example of the display device. In the example illustrated in FIG. 82, the display device 2 includes a terminal device 600 and an image projector device 700A.

The terminal device 600 performs a wireless communication with an electronic pen 820B, via Bluetooth (registered trademark) or the like, and receives coordinate information of a point on the screen 800 indicated (or pointed) by the electronic pen 820B. The terminal device 600 generates the image data of the stroke image input by the electronic pen 820B, based on the received coordinate information, and controls the image projector device 700A to project the stroke image.

The terminal device 600 generates superimposed image data representing a superimposed image composed of a background image projected by the image projector device 700A and the stroke image input by the electronic pen 820B.

As described above, each of the above described embodiments can be applied to various system configurations.

<Other Applications>

While preferred embodiments of the present invention are described above with reference to examples, various variations, modifications, and substitutions may be made thereto without departing from the spirit and scope of the present disclosure.

For example, the display method of the embodiments is suitably applicable to an information processing apparatus having a touchscreen panel. Devices having the same function as the display device are also referred to as electronic chalkboards, electronic whiteboards, electronic information boards, interactive boards, or the like. The information processing apparatus having the touchscreen panel may be an output device such as a projector (PJ), a digital signage, or the like, a Head Up Display (HUD) device, an industrial machine, an imaging device, a sound collector, a medical device, a network home appliance, a lap-top Personal Computer (PC), a cellular phone, a smartphone, a tablet terminal, a game device, a Personal Digital Assistant (PDA), a digital camera, a wearable PC, a desktop PC, or the like, for example.

According to the embodiments, a part of the processes performed by the display device 2 may be performed by the server. For example, the display device may transmit stroke information to the server, acquire information to be displayed in the operation guide 500 from the server, and display the acquired information in the operation guide 500. In this case, the display device 2 may form a display system.

In the embodiments, the coordinates of the pen tip are detected by the method of detecting the coordinates of the pen tip by the touchscreen panel. However, the display device 2 may detect the coordinates of the pen tip using ultrasonic waves. In addition, the pen may emit ultrasonic waves together with light, and the display device 2 may calculate the distance from the pen according to the arrival time of the ultrasonic waves. The display device 2 can locate the position of the pen from the detected direction and the calculated distance. The projector can draws (projects) the pen's trajectory as a stroke.

In the embodiments, the operation command candidates for the editing system and the decorating system are displayed when the selected object is present, however, such operation command candidates may be displayed simultaneously with other operation command candidates.

Further, the configuration example such as that of FIG. 6A is divided according to the main function, in order to facilitate understanding of the processes of the display device 2. The present disclosure is not limited by the method of dividing the processes in units or by names. The processes of the display device 2 can further be divided into smaller processing units depending on the processing contents, for example. Alternatively, one processing unit may be split to include more processes.

According to each of the embodiments described above, it is to provide a display device for displaying information other than characters, as the selectable candidates.

Although the embodiments and the examples are numbered with, for example, "first," "second," "third," etc., the ordinal numbers do not imply priorities of the embodiments and the examples.

Numerous additional modifications and variations are possible in light of the above teachings. It is therefore to be understood that, within the scope of the appended claims, the disclosure of this patent specification may be practiced otherwise than as specifically described herein.

As can be appreciated by those skilled in the computer arts, this invention may be implemented as convenient using a conventional general-purpose digital computer programmed according to the teachings of the present specification. Appropriate software coding can readily be prepared by skilled programmers based on the teachings of the present disclosure, as will be apparent to those skilled in the software arts. The present invention may also be implemented by the preparation of ASICs or by interconnecting an appropriate network of conventional component circuits, as will be readily apparent to those skilled in the relevant art.

Each of the functions of the described embodiments may be implemented by one or more processing circuits. A processing circuit may encompass a programmed processor. A processing circuit may also encompass devices such as an application specific integrated circuit (ASIC) and conventional circuit components arranged to perform the recited functions.

The processing circuitry is implemented as at least a portion of a microprocessor. The processing circuitry may be implemented using one or more circuits, one or more microprocessors, microcontrollers, ASICs, dedicated hardware, DSPs, microcomputers, central processing units, FPGAs, programmable logic devices, state machines, super computers, or any combination thereof. Also, the processing circuitry may encompass one or more software modules executable within one or more processing circuits. The processing circuitry may further encompass a memory configured to store instructions and/or code that causes the processing circuitry to execute functions.

If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, or the like. If embodied in hardware, each block may represent a circuit or a number of interconnected circuits to implement the specified logical function(s).

What is claimed is:

1. A display device comprising:

a circuitry configured to convert a handwriting recognition character string candidate that is obtained by performing a handwriting recognition with respect to handwritten data, into a language character string candidate that is linguistically probable, convert the handwriting recognition character string candidate and the language character string candidate into a converted character string candidate for a character string likely generated to include a handwriting recognition character string or a language character string, convert the handwriting recognition character string candidate, the language character string candidate, and the converted character string candidate into a predicted character string candidate, and search for image candidates matching the converted character string candidate and the predicted character string candidate; and a display configured to display the image candidates, and in response to a selection of one image candidate from among the image candidates, display the one image candidate together with the predicted character string candidate, wherein the image candidates are images including at least one of characters, graphics, illustrations, and photographs.

2. The display device as claimed in claim 1, wherein the circuitry is configured to successively convert the handwritten data from a beginning, to convert the handwritten data into characters, and search for the image candidates by a forward match, while increasing a number of characters every time one character is converted, wherein the display is configured to display a number of image candidates that decreases as the number of characters used for the search increases.

3. The display device as claimed in claim 2, wherein the circuitry is configured to start a deletion timer after a predetermined time elapses from displaying data of selectable candidates including the handwriting recognition character string candidate, the language character string candidate, the converted character string candidate, and the predicted character string candidate, wherein the data of the selectable candidates is deleted from the display while the deletion timer is running when a display of the selectable candidates displayed on the display is deleted by a user, or when a change occurs in the handwritten data, or when a time-out of the deletion timer occurs before a selection from the selectable candidates is made by the user.

4. The display device as claimed in claim 1, wherein the circuitry is configured to start a deletion timer after a predetermined time elapses from displaying data of selectable candidates including the handwriting recognition character string candidate, the language character string candidate, the converted character string candidate, and the predicted character string candidate, wherein the data of the selectable candidates is deleted from the display while the deletion timer is running when a display of the selectable candidates displayed on the display is deleted by a user, or when a change occurs in the handwritten data, or when a time-out of the deletion timer occurs before a selection from the selectable candidates is made by the user.

5. The display device as claimed in claim 1, wherein the circuitry is configured to convert the handwriting recognition character string candidate that is obtained by performing the handwriting recognition with respect to the handwritten data using an engine for performing an on-line handwriting recognition, into the language character string candidate that is linguistically probable using a handwriting recognition dictionary including dictionary data for a language conversion of the handwriting recognition.

6. The display device as claimed in claim 1, wherein the circuitry is configured to convert the handwriting recognition character string candidate and the language character string candidate into the converted character string candidate using a character string conversion dictionary including dictionary data for a character string conversion.

7. The display device as claimed in claim 1, wherein the circuitry is configured to convert the handwriting recognition character string candidate, the language character string candidate, and the converted character string candidate into the predicted character string candidate using a predictive conversion dictionary including dictionary data for a predictive conversion.

8. The display device as claimed in claim 1, further comprising:

an input part configured to accept the selection of the one image candidate by a user from among the image candidates displayed on the display.

9. A display method comprising:

converting a handwriting recognition character string candidate that is obtained by performing a handwriting recognition with respect to handwritten data, into a language character string candidate that is linguistically probable;

converting the handwriting recognition character string candidate and the language character string candidate into a converted character string candidate for a character string likely generated to include a handwriting recognition character string or a language character string;

converting the handwriting recognition character string candidate, the language character string candidate, and the converted character string candidate into a predicted character string candidate;

searching for image candidates matching the converted character string candidate and the predicted character string candidate; and displaying the image candidates, and in response to a selection of one image candidate from among the image candidates, displaying the one image candidate together with the predicted character string candidate, wherein the image candidates are images including at least one of characters, graphics, illustrations, and photographs.

10. A non-transitory computer-readable recording medium having stored therein a program which, when executed by a computer of a display device, causes the computer to perform a process including:

converting a handwriting recognition character string candidate that is obtained by performing a handwriting recognition with respect to handwritten data, into a language character string candidate that is linguistically probable;

converting the handwriting recognition character string candidate and the language character string candidate into a converted character string candidate for a character string likely generated to include a handwriting recognition character string or a language character string;

converting the handwriting recognition character string candidate, the language character string candidate, and the converted character string candidate into a predicted character string candidate;

searching for image candidates matching the converted character string candidate and the predicted character string candidate; and displaying the image candidates on a display, and in response to a selection of one image candidate from among the image candidates, displaying the one image candidate together with the predicted character string candidate, wherein the image candidates are images including at least one of characters, graphics, illustrations, and photographs.

* * * * *